US012739759B2

(12) United States Patent

Zhou et al.

(10) Patent No.: US 12,739,759 B2

(45) Date of Patent: Sep. 15, 2026

(54) POWER HEADROOM REPORT FOR FAST PRIMARY CELL SWITCHING

(71) Applicant: Comcast Cable Communications, LLC, Philadelphia, PA (US)

(72) Inventors: Hua Zhou, Vienna, VA (US); Hyoungsuk Jeon, Centreville, VA (US); Esmael Hejazi Dinan, McLean, VA (US); Ali Cagatay Cirik, Chantilly, VA (US); Kyungmin Park, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 306 days.

(21) Appl. No.: 18/478,752

(22) Filed: Sep. 29, 2023

(65) Prior Publication Data

US 2024/0121727 A1 Apr. 11, 2024

Related U.S. Application Data

(60) Provisional application No. 63/411,578, filed on Sep. 29, 2022.

(51) Int. Cl.

*H04W 52/36* (2009.01)

*H04W 72/231* (2023.01)

(52) U.S. Cl.

CPC ....... *H04W 52/365* (2013.01); *H04W 72/231* (2023.01)

(58) Field of Classification Search

CPC .. H04W 52/365; H04W 72/231; H04L 5/001; H04L 5/0096

See application file for complete search history.

(56) References Cited

U.S. PATENT DOCUMENTS

| | | | |
|---|---|---|---|
| 10,455,456 B2 | 10/2019 | Jang et al. | |
| 11,051,255 B2 | 6/2021 | Loehr et al. | |
| 2009/0318180 A1* | 12/2009 | Yi | H04W 52/365 455/522 |

(Continued)

FOREIGN PATENT DOCUMENTS

EP 2663139 B1 1/2019

OTHER PUBLICATIONS

R2-2207293 3GPP RAN WG2 Meeting #119-e, Electronic meeting, Aug. 17-26, 2022, Source: NEC, Title: Assistance information to support choice of NES configuration.

(Continued)

*Primary Examiner* — Hoang-Chuong Q Vu

(74) *Attorney, Agent, or Firm* — Banner & Witcoff, Ltd.

(57) ABSTRACT

A wireless device may receive a message indicating that it is to switch cells, such as in a handover process, and the wireless device may take steps to switch cells. The time needed for making the switch can depend on, for example, the time it takes the wireless device to process that message, and different types of messages (e.g., messages at a media access control—MAC—layer) may be processed more quickly than others. A wireless device may quickly cancel a triggered power headroom report (PHR) procedure for an old cell, and trigger a PHR for a new cell, based on receiving such a message. The canceling and/or triggering may be performed even without resetting a MAC entity of the wireless device.

20 Claims, 43 Drawing Sheets

(56) References Cited

U.S. PATENT DOCUMENTS

| | | | | |
|---|---|---|---|---|
| 2010/0329204 | A1* | 12/2010 | Guo | H04W 72/20 370/329 |
| 2015/0003345 | A1* | 1/2015 | Kuo | H04L 67/10 370/329 |
| 2015/0358998 | A1* | 12/2015 | Golitschek Edler Von Elbwart | H04L 1/0041 |
| 2018/0213452 | A1* | 7/2018 | Kim | H04L 5/0007 |
| 2018/0227805 | A1* | 8/2018 | Jang | H04W 28/0278 |
| 2019/0349822 | A1* | 11/2019 | Kim | H04W 36/08 |
| 2020/0100193 | A1* | 3/2020 | Cheng | H04W 52/146 |
| 2022/0078670 | A1* | 3/2022 | Kung | H04W 36/085 |
| 2022/0217653 | A1 | 7/2022 | Kung et al. | |
| 2022/0361277 | A1* | 11/2022 | Tsai | H04W 52/50 |

OTHER PUBLICATIONS

R2-2207406 3GPP RAN WG2 Meeting #119-e, Electronic meeting, Aug. 17-26, 2022, Source: Fujitsu, Title: Consideration on network energy saving.
R2-2207414 3GPP RAN WG2 Meeting #119 electronic, Online, Aug. 17-29, 2022, Source: Fujitsu, Title: Efficient PCell and SCell handling for network energy saving.
R2-2207423 3GPP RAN WG2 Meeting #119-e, E-Conference, Aug. 17-26, 2022, Source: Apple, Title: Initial discussion on RAN2 work of Network energy saving.
R2-2207424 3GPP RAN WG2 Meeting #119-e, E-Conference, Aug. 17-26, 2022, Source: Apple, Title: On-demand measurement for network energy saving.
R2-2207511 3GPP RAN WG2 Meeting #119-e, E-Conference, Aug. 17-26, 2022, Source: CATT, Title: Network energy savings: issues for investigation in RAN2.
R2- 2207512 3GPP RAN WG2 Meeting #119-e, E-Conference, Aug. 17-26, 2022, Source: CATT, Title: Consideration on UE Assistance Information.
R2-2207545 3GPP TSG-RAN WG2 Meeting #119 Electronic, Elbonia, Aug. 17-26, 2022, Source: Nokia, Nokia Shanghai Bell, Title: NW Energy Saving.
R2-2207546 3GPP TSG-RAN WG2 Meeting #119 Electronic, Elbonia, Aug. 17-26, 2022, Source: Nokia, Nokia Shanghai Bell, Title: NW Energy Saving IDLE.
R2-2207786 3GPP TSG-RAN WG2 Meeting #119-e, E-Meeting, Aug. 17-29, 2022, Source: vivo, Title: Discussions on time domain techniques for network energy saving.
R2-2207787 3GPP TSG-RAN WG2 Meeting #119-e, E-Meeting, Aug. 17-29, 2022, Source: vivo, Title: Discussion on frequency domain and UE-assisted Network Energy saving techniques.
R2-2207799 3GPP TSG-RAN WG2 Meeting #119-e, E-meeting, Aug. 2022, Source: OPPO, Title: Discussion on network energy savings.
R2-2207800 3GPP TSG-RAN WG2 Meeting #119-e, E-meeting, Aug. 2022, Source: OPPO, Title: Discussion on the UE assistance information.
R2-2207919 3GPP TSG-RAN WG2 Meeting #119 electronic, Online, Aug. 17-Aug. 26, 2022, Source: Lenovo, Title: Discussion on supporting of network energy savings for NR.
R2-2207920 3GPP TSG-RAN WG2 Meeting #119 electronic, Online, Aug. 17-Aug. 26, 2022, Source: Lenovo, Title: Discussion on the state transition in NES.
R2-2207960 3GPP TSG RAN WG2 #119-e, Online, Aug. 17-Aug. 29, 2022, Source: Fraunhofer IIS, Fraunhofer HHI, Title: Alignment of UE and Network Energy Saving.
R2-2208026 3GPP TSG RAN WG2 #119e, Electronic meeting, Aug. 15-Aug. 26, 2022, Source: Ericsson, Title: Assistance information from the UE for NW energy savings.
R2-2208031 3GPP TSG RAN WG2 #119e, Electronic meeting, Aug. 15-Aug. 26, 2022, Source: Ericsson, Title: Miscellaneous mechanisms for network energy savings.
R2-2208120 3GPP TSG-RAN WG3 Meeting #119 electronic, Online, Aug. 17-29, 2022, Source: Qualcomm Incorporated, Title: Network energy saving techniques.
R2-2208133 3GPP TSG-RAN WG3 Meeting #119 electronic, Online, Aug. 17-29, 2022, Source: Ericsson, Title: Correction to MINT—applicableDisasterInfoList.
R2-2208297 3GPP TSG-RAN WG2 Meeting #119-e, Electronic, Aug. 17-26, 2022, Source: Rakuten Mobile Inc, Title: Network Energy savings—UE grouping for efficient signaling.
R2-2208330 3GPP TSG-RAN WG2 Meeting #119-e, Electronic, Aug. 17-26, 2022, Source: ZTE corporation, Sanechips, Title: Supporting access via assistant cell for network energy saving.
R2-2208331 3GPP TSG-RAN WG2 Meeting #119-e, Electronic, Aug. 17-29, 2022, Source: ZTE corporation, Sanechips, Title: Techniques in various domains and UE assistance information for network energy saving.
R2-2208342 3GPP TSG-RAN WG2 Meeting #119-e, Online, Aug. 17-29, 2022, Source: Huawei, HiSilicon, Deutsche Telekom, Title: Discussion on network energy saving techniques for single carrier.
R2-2208343 3GPP TSG-RAN WG2 Meeting #119-e, Online, Aug. 17-29, 2022, Source: Huawei, HiSilicon, China Unicom, Deutsche Telekom, Title: Discussion on network energy saving techniques for multi-carrier case.
R2-2208431 3GPP TSG-RAN WG2 Meeting #119-e, Online, Aug. 17-26, 2022, Source: CMCC, Title: Discussion on the technical directions for network energy saving.
R2-2208432 3GPP TSG-RAN WG2 Meeting #119-e, Online, Aug. 17-26, 2022, Source: CMCC, Title: Analysis on power consumption in base station.
R2-2208573 3GPP TSG-RAN WG2 Meeting #119 electronic, E-Meeting, Aug. 17-29, 2022, Source: Xiaomi, Title: Energy saving on system information transmission.
R2-2208592 3GPP TSG-RAN WG2 Meeting #119-e, Online, Aug. 17-29, 2022, Source: Samsung, Title: Feedback and Assistance Information for NES.
R2-2208593 3GPP TSG-RAN WG2 Meeting #119-e, Online, Aug. 17-29, 2022, Source: Samsung, Title: Network Energy Saving (NES) Techniques.
R2-2208606 3GPP TSG-RAN WG2 Meeting #119-e, e-Meeting: Aug. 17-Aug. 26, 2022, Source: MediaTek Inc., Title: Coexistence considerations in network energy saving.
Feb. 8, 2024—International Search Report—App. No. PCT/US2023/034174.
R2-2208368 3GPP TSG-RAN WG2 Meeting #119, Online, Aug. 17-29, 2022, Source: ASUSTek, Title: Discussion on L1 L2 mobility procedure.
3GPP TR 36.887 V12.0.0 (Jun. 2014), 3rd Generation Partnership Project; Technical Specification Group Radio Access Network; Evolved Universal Terrestrial Radio Access Network (E-UTRAN); Study on energy saving enhancement for E-UTRAN (Release 12).
3GPP TR 36.927 V16.0.0 (Jul. 2020), 3rd Generation Partnership Project; Technical Specification Group Radio Access Network; Evolved Universal Terrestrial Radio Access (E-UTRA); Potential solutions for energy saving for E-UTRAN (Release 16).
3GPP TS 38.133 V17.4.0 (Dec. 2021), 3rd Generation Partnership Project; Technical Specification Group Radio Access Network; NR; Requirements for support of radio resource management (Release 17).
3GPP TS 38.211 V17.1.0 (Mar. 2022), 3rd Generation Partnership Project; Technical Specification Group Radio Access Network; NR; Physical channels and modulation (Release 17).
3GPP TS 38.212 V17.1.0 (Mar. 2022), 3rd Generation Partnership Project; Technical Specification Group Radio Access Network; NR; Multiplexing and channel coding (Release 17).
3GPP TS 38.213 V17.1.0 (Mar. 2022), 3rd Generation Partnership Project; Technical Specification Group Radio Access Network; NR; Physical layer procedures for control (Release 17).
3GPP TS 38.214 V17.1.0 (Mar. 2022) 3rd Generation Partnership Project; Technical Specification Group Radio Access Network; NR; Physical layer procedures for data (Release 17).
3GPP TS 38.215 V17.1.0 (Mar. 2022), 3rd Generation Partnership Project; Technical Specification Group Radio Access Network; NR; Physical layer measurements (Release 17).

(56) References Cited

OTHER PUBLICATIONS

3GPP TS 38.300 V16.7.0 (Sep. 2021), Technical Specification, 3rd Generation Partnership Project; Technical Specification Group Radio Access Network; NR; NR and NG-RAN Overall Description; Stage 2 (Release 16).
3GPP TS 38.321 V17.0.0 (Mar. 2022), 3rd Generation Partnership Project; Technical Specification Group Radio Access Network;NR;Medium Access Control (MAC) protocol specification (Release 17).
3GPP TS 38.331 V16.7.0 (Dec. 2021) 3rd Generation Partnership Project; Technical Specification Group Radio Access Network; NR; Radio Resource Control (RRC) protocol specification (Release 16).
R1-22xxxxx 3GPP TSG RAN WG1 Meeting #110bis-e, Online, Oct. 10-19, 2022, Source: MCC Support, Title: Draft Report of 3GPP TSG RAN WG1 #110 v0.1.0.
R1-2205756 3GPP TSG RAN WG1 Meeting #110, Toulouse, France, Aug. 22-26, 2022, Source: Futurewei, Title: Enhancements for Network Energy Savings.
R1-2205861 3GPP TSG-RAN WG1 Meeting #110, Toulouse, France, Aug. 22-26, 2022, Source: Huawei, HiSilicon, Title: Discussion on network energy saving techniques.
R1-2206000 3GPP TSG RAN WG1 Meeting #110, Toulouse, France, Aug. 22-26, 2022, Source: Spreadtrum Communications, Title: Discussion on network energy saving techniques.
R1-2206054 3GPP TSG RAN WG1 #110-e, Toulouse, France, Aug. 22-26, 2022, Source: vivo, Title: Discussions on network energy saving techniques.
R1-2206075 3GPP TSG RAN WG1 #110, Toulouse, France, Aug. 22-26, 2022, Source: Nokia, Nokia Shanghai Bell, Title: Network Energy Saving Techniques.
R1-2206142 3GPP TSG-RAN WG1 #110, Toulouse, France, Aug. 22-26, 2022, Source: Panasonic, Title: Discussion on potential network energy saving techniques.
R1-2206173 3GPP TSG-RAN WG1 #110, Toulouse, France, Aug. 22-26, 2022, Source: Fujitsu, Title: Discussion on network energy saving techniques.
R1- 2206242 3GPP TSG-RAN WG1 #110, Toulouse, France, Aug. 22-26, 2022, Source: NEC, Title: Discussion on network energy saving techniques.
R1-2206309 3GPP TSG-RAN WG1 #110, Toulouse, France, Aug. 22-26, 2022, Source: OPPO, Title: Discussion on NW energy savings techniques.
R1-2206412 3GPP TSG RAN WG1 #110, Toulouse, France, Aug. 22-26, 2022, Source: CATT, Title: Network Energy Saving techniques in time, frequency, and spatial domain.
R1-2206517 3GPP TSG RAN WG1 Meeting #110, Toulouse, France, Aug. 22-26, 2022, Source: Lenovo, Title: Network energy saving techniques.
R1-2206596 3GPP TSG RAN WG1 Meeting #110, Toulouse, France, Aug. 22-26, 2022, Source: Intel Corporation, Title: Discussion on Network Energy Saving Techniques.
R1-2206655 3GPP TSG RAN WG1 Meeting #110, Toulouse, France, Aug. 22-26, 2022, Source: Xiaomi, Title: Discussions on techniques for network energy Saving.
R1-2206666 3GPP TSG RAN WG1 Meeting #110, Toulouse, France, Aug. 22-26, 2022, Source: InterDigital Inc., Title: Potential techniques for network energy saving.
R1-2206697 3GPP TSG RAN WG1 #110, e-Meeting, Aug 22-Aug. 26, 2022, Source: China Telecom, Title: Discussion on network energy saving techniques.
R1-2206839 3GPP TSG RAN WG1 Meeting #110, Toulouse, France, Aug. 22-26, 2022, Source: Samsung, Title: Network energy saving techniques.
R1-2206926 3GPP TSG RAN WG1 Meeting #110, Toulouse, France, Aug. 22-26, 2022, Source: CMCC, Title: Discussion on network energy saving techniques.
R1-2206947 3GPP TSG RAN WG1 Meeting #110, Toulouse, France, Aug. 22-26, 2022, Source: Fraunhofer IIS, Fraunhofer HHI, Title: On Network Energy Saving Techniques.
R1-2206980 3GPP TSG RAN WG1 Meeting #110, Toulouse, France, Aug. 22-26, 2022, Source: MediaTek Inc., Title: Network energy saving techniques.
R1-2207038 3GPP TSG RAN WG1 Meeting #110, Toulouse, France, Aug. 22-26, 2022, Source: LG Electronics, Title: Discussion on physical layer techniques for network energy savings.
R1-2207060 3GPP TSG RAN WG1 Meeting #110, Toulouse, France, Aug. 22-26, 2022, Source: ZTE, Sanechips, Title: Discussion on NW energy saving techniques.
R1-2207074 3GPP TSG RAN WG1 Meeting #110, Toulouse, France, Aug. 22-26, 2022, Source: CEWIT, Title: Discussion on Network energy saving techniques.
R1-2207119 3GPP TSG RAN WG1 Meeting #110, Toulouse, France, Aug. 22-26, 2022, Source: Rakuten Mobile Inc., Title: Discussion on network energy saving techniques.
R1-2207246 3GPP TSG RAN WG1 Meeting #110, Toulouse, France, Aug. 22-26, 2022, Source: Qualcomm Incorporated, Title: Network energy saving techniques.
R1-2207344 3GPP TSG RAN WG1 Meeting #110, Toulouse, France, Aug. 22-26, 2022, Source: Apple, Title: Discussion on network energy saving techniques.
R1-2207419 3GPP TSG RAN WG1 Meeting #110, Toulouse, France, Aug. 22-26, 2022, Source: NTT Docomo, Inc., Title: Discussion on NW energy saving techniques.
R1-2207438 3GPP TSG RAN WG1 Meeting #110, Toulouse, France, Aug. 22-26, 2022, Source: Ericsson, Title: Network energy saving techniques.
R1-2207446 3GPP TSG RAN WG1 Meeting #110, Toulouse, France, Aug. 22-26, 2022, Source: ITRI, Title: Discussion on potential L1 network energy saving techniques for NR.
R1-2207481 3GPP Tsg Ran WG1 Meeting #110, Toulouse, France, Aug. 22-26, 2022, Source: KT Corp., Title: Discussion on network energy saving techniques.
R1-2208185 3GPP TSG RAN WG1 Meeting #110, Toulouse, France, Aug. 22-26, 2022, Source: Moderator (Intel Corporation), Title: Discussion Summary #2 for energy saving techniques of NW energy saving SI.
R2-2xxxxxx 3GPP TSG-RAN WG2 Meeting #119 electronic, Online, Aug. 2022, Source: RAN2 Chairman (MediaTek), Title: Agenda.
R2-22xxxxx 3GPP TSG-RAN WG2 Meeting #119-bis-e, E-meeting, Oct. 10-19, 2022, Source: Ericsson, Title: [Post119-e][048][feMob] Candidate target configurations for L1/L2 mobility.
R2-2207037 3GPP TSG-RAN WG2 Meeting #119-e, Online, Aug 17-Aug. 29, 2022, Source: KDDI Corporation, Title: Discussion on NW energy saving.
R2-2207115 3GPP TSG-RAN WG2 Meeting #119 Electronic, Elbonia, Aug. 17-26, 2022, Source: Intel Corporation, Title: Efficient operation of adaptation for network energy saving.
R2-2207116 3GPP TSG-RAN WG2 Meeting #119 Electronic, Elbonia, Aug. 17-26, 2022, Source: Intel Corporation, Title: Additional UE assistance information and UE feedback.
R2-2207246 3GPP RAN WG2 Meeting #119-e, Online, Aug. 17-26, 2022, Source: InterDigital, Title: Time domain NES techniques.
R2-2207247 3GPP RAN WG2 Meeting #119-e, Online, Aug. 17-26, 2022, Source: InterDigital, Title: Frequency domain and UE assistance NES techniques.
R2-2207292 3GPP RAN WG2 Meeting #119-e, Electronic meeting, Aug. 17-26, 2022, Source: NEC, Title: FFiner granularity configuration for NES.

* cited by examiner

100
Wireless Device 106
RAN 104
CN 102
DN(s)

150
Wireless Device 156A
Uu
gNB 160A
Xn
ng-eNB 162A
NG
NG
Xn
Xn
ng-eNB 162B
NG
NG
Xn
Wireless Device 156B
Uu
gNB 160B
AMF 158A
UPF 158B
AMF/UPF 158
5G-CN 152
DN(s)
Wireless Devices 156
NG-RAN 154

Logical Channels
Transport Channels
Physical Channels
Physical Signals

PCCH
BCCH
CCCH
DCCH
DTCH
PCH
BCH
DL-SCH
DCI
PBCH
PDSCH
PDCCH
PSS/SSS
CSI-RS
DM-RS
PT-RS
Downlink CCCH
DCCH
DTCH
UL-SCH
RACH
UCI
PUSCH
PUCCH
PRACH
DM-RS
PT-RS
SRS
Uplink

1800

| SCS | OFDM starting Symbols of the candidate SSBs | fc<=3GHz, Lmax=4 | 3GHz<fc<=6GHz, Lmax=8 | fc>6GHz, Lmax=64 |
|---|---|---|---|---|
| CaseA: 15 KHz | {2,8}+14n | n=0,1 | n=0,1,2,3 | Not Applicable (NA) |
| CaseB: 30 KHz | {4,8,16,20}+28n | n=0 | n=0,1 | NA |
| CaseC: 30 KHz | {2,8}+14n | n=0,1 | n=0,1,2,3 | NA |
| CaseD: 120 KHz | {4,8,16,20}+28n | NA | NA | n=0,1,2,3,5,6,7,8,10,11,12,13,15,16,17,18 |
| CaseE: 240 KHz | {8,12,16,20,32,36,40,44} + 56n | NA | NA | n=0,1,2,3,5,6,7,8 |

```
MIB ::=                       SEQUENCE {
  systemFrameNumber                BIT STRING (SIZE (6)),
  subCarrierSpacingCommon            ENUMERATED {scs15or60, scs30or120},
  ssb-SubcarrierOffset            INTEGER (0..15),
  dmrs-TypeA-Position              ENUMERATED {pos2, pos3},
  pdcch-ConfigSIB1                PDCCH-ConfigSIB1,
  cellBarred                  ENUMERATED {barred, notBarred},
  intraFreqReselection              ENUMERATED {allowed, notAllowed},
  spare                      BIT STRING (SIZE (1))}

PDCCH-ConfigSIB1 ::=            SEQUENCE {
  controlResourceSetZero            ControlResourceSetZero,
  searchSpaceZero                SearchSpaceZero}
```

| Index | SS/PBCH block and CORESET multiplexing pattern | Number of RBs per coreset | Number of Symbols per coreset | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| ... | ... | ... | ... | ... |

| Index | *O* | Number of search space sets per slot | *M* | First symbol index |
|---|---|---|---|---|
| 0 | 0 | 1 | 1 | 0 |
| 1 | 0 | 2 | 1/2 | {0, if *i* is even}, {*N*, if is odd} |
| 2 | 2 | 1 | 1 | 0 |
| 3 | 2 | 2 | 1/2 | {0, if *i* is even}, {*N*, if *i* is odd} |
| 4 | 5 | 1 | 1 | 0 |
| 5 | 5 | 2 | 1/2 | {0, if *i* is even}, *N*, if *i* is odd |
| 6 | 7 | 1 | 1 | 0 |
| 7 | 7 | 2 | 1/2 | {0, if *i* is even}, {*N*, if *i* is odd} |
| ... | ... | ... | ... | ... |

```
SIB1 ::=      SEQUENCE {
   cellSelectionInfo              SEQUENCE {
      q-RxLevMin                     Q-RxLevMin,
      q-RxLevMinOffset                 INTEGER (1..8) ...}
   cellAccessRelatedInfo           CellAccessRelatedInfo,
   connEstFailureControl           ConnEstFailureControl
   si-SchedulingInfo              SI-SchedulingInfo
   servingCellConfigCommon            ServingCellConfigCommonSIB
   ims-EmergencySupport             ENUMERATED {true}
   eCallOverIMS-Support            ENUMERATED {true}
   ue-TimersAndConstants            UE-TimersAndConstants
   uac-BarringInfo                SEQUENCE { ...}
   useFullResumeID                 ENUMERATED {true}
   lateNonCriticalExtension         OCTET STRING
   nonCriticalExtension            SIB1-v16xy-IEs  }

ServingCellConfigCommonSIB ::=     SEQUENCE {
   downlinkConfigCommon             DownlinkConfigCommonSIB,
   uplinkConfigCommon              UplinkConfigCommonSIB
   supplementaryUplink             UplinkConfigCommonSIB
   n-TimingAdvanceOffset            ENUMERATED { n0, n25600, n39936 }
   ssb-PositionsInBurst           SEQUENCE {
      inOneGroup                  BIT STRING (SIZE (8)),
      groupPresence                 BIT STRING (SIZE (8)) },
   ssb-PeriodicityServingCell        ENUMERATED {ms5, ms10, ms20, ms40, ms80, ms160},
   tdd-UL-DL-ConfigurationCommon      TDD-UL-DL-ConfigCommon
   ss-PBCH-BlockPower               INTEGER (-60..50),
   ...,}

DownlinkConfigCommonSIB ::=    SEQUENCE {
   frequencyInfoDL              FrequencyInfoDL-SIB,
   initialDownlinkBWP            BWP-DownlinkCommon,
   bcch-Config                  BCCH-Config,
   pcch-Config                  PCCH-Config,  ...}

PCCH-Config ::=          SEQUENCE {
   defaultPagingCycle             PagingCycle,
   nAndPagingFrameOffset             CHOICE {
      oneT                      NULL,
      halfT                     INTEGER (0..1), ...},
   ns                        ENUMERATED {four, two, one},
   firstPDCCH-MonitoringOccasionOfPO   CHOICE {
      sCS15KHZoneT      SEQUENCE (SIZE (1..maxPO-perPF)) OF INTEGER (0..139),...}
   ...,
   [[   nrofPDCCH-MonitoringOccasionPerSSB-InPO-r16  INTEGER (2..4)  ]]
}
```

```
BWP-DownlinkCommon ::=          SEQUENCE {
   genericParameters            BWP,
   pdcch-ConfigCommon            SetupRelease { PDCCH-ConfigCommon }
   pdsch-ConfigCommon            SetupRelease { PDSCH-ConfigCommon }
   ...}
PDCCH-ConfigCommon ::=          SEQUENCE {
   controlResourceSetZero        ControlResourceSetZero
   commonControlResourceSet        ControlResourceSet
   searchSpaceZero              SearchSpaceZero
   commonSearchSpaceList           SEQUENCE (SIZE(1..4)) OF SearchSpace
   searchSpaceSIB1              SearchSpaceId
   searchSpaceOtherSystemInformation  SearchSpaceId
   pagingSearchSpace              SearchSpaceId
   ra-SearchSpace               SearchSpaceId
    [[
   firstPDCCH-MonitoringOccasionOfPO   CHOICE {
      sCS15KHZoneT    SEQUENCE (SIZE (1..maxPO-perPF)) OF INTEGER (0..139),
      ...
   }OPTIONAL   -- Cond OtherBWP
    ]]
   ...,}
PDCCH-ServingCellConfig ::=       SEQUENCE {
   slotFormatIndicator            SetupRelease { SlotFormatIndicator }...,
   [[
   availabilityIndicator-r16        SetupRelease {AvailabilityIndicator-r16}
   searchSpaceSwitchTimer-r16         INTEGER (1..80)
   ]]
}

SearchSpaceSwitchConfig-r16 ::=    SEQUENCE {
   cellGroupsForSwitchList-r16       SEQUENCE(SIZE (1..4)) OF CellGroupForSwitch-r16
   searchSpaceSwitchDelay-r16         INTEGER (10..52)
}
CellGroupForSwitch-r16 ::= SEQUENCE(SIZE (1..16)) OF ServCellIndex
ControlResourceSet ::=          SEQUENCE {
   controlResourceSetId           ControlResourceSetId,
   frequencyDomainResources          BIT STRING (SIZE (45)),
   duration                    INTEGER (1..maxCoReSetDuration),
   cce-REG-MappingType             CHOICE {
      interleaved                SEQUENCE {
         reg-BundleSize              ENUMERATED {n2, n3, n6},
         interleaverSize            ENUMERATED {n2, n3, n6},
         shiftIndex               INTEGER(0..maxNrofPhysicalResourceBlocks-1)},
      nonInterleaved              NULL},
   precoderGranularity            ENUMERATED {sameAsREG-bundle, allContiguousRBs},
   pdcch-DMRS-ScramblingID            INTEGER (0..65535)
   coresetPoolIndex-r16            INTEGER (0..1)
...,
}
```

```
SearchSpace ::=                    SEQUENCE {
   searchSpaceId                    SearchSpaceId,
   controlResourceSetId              ControlResourceSetId
   monitoringSlotPeriodicityAndOffset    CHOICE {
      sl1                           NULL,
      sl2                           INTEGER (0..1),...}
   duration                         INTEGER (2..2559)
   monitoringSymbolsWithinSlot          BIT STRING (SIZE (14))
   nrofCandidates                   SEQUENCE {
      aggregationLevel1                ENUMERATED {n0, n1, n2, ... n8},
      aggregationLevel2                ENUMERATED {n0, n1, n2, ... n8},
      ...}
   searchSpaceType                  CHOICE {
      common                        SEQUENCE {
         dci-Format0-0-AndFormat1-0         SEQUENCE {...}
         dci-Format2-0                 SEQUENCE {
            nrofCandidates-SFI             SEQUENCE {
               aggregationLevel1              ENUMERATED {n1, n2}
               aggregationLevel2              ENUMERATED {n1, n2}...},
            ...}
         dci-Format2-1                 SEQUENCE {...}
...
      },
      ue-Specific                      SEQUENCE {
         dci-Formats      ENUMERATED {formats0-0-And-1-0, formats0-1-And-1-1},
         ...,}
   }
}

SearchSpaceExt-r16 ::=              SEQUENCE {
   controlResourceSetId-r16           ControlResourceSetId-r16
   searchSpaceType-r16               SEQUENCE {
      common-r16                     SEQUENCE {
         dci-Format2-4-r16               SEQUENCE {
            nrofCandidates-CI-r16            SEQUENCE {
               aggregationLevel1-r16            ENUMERATED {n1, n2}...},...}
         dci-Format2-5-r16              SEQUENCE {
            nrofCandidates-IAB-r16            SEQUENCE {
               aggregationLevel1-r16            ENUMERATED {n1, n2}...},...}
         dci-Format2-6-r16               SEQUENCE {...}
         ...}
   }
   searchSpaceGroupIdList-r16        SEQUENCE (SIZE (1.. 2)) OF INTEGER (0..1)
   freqMonitorLocations-r16               BIT STRING (SIZE (5))
}

SearchSpaceSwitchTrigger-r16 ::=   SEQUENCE {
   servingCellId-r16              ServCellIndex,
   positionInDCI-r16
INTEGER(0..maxSFI-DCI-PayloadSize-1)
}
```

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 2_7 | Notifying Paging early indication and TRS availability indication for one or more UEs |
| 3_0 | Scheduling of NR sidelink in one cell |
| 3_1 | Scheduling of LTE sidelink in one cell |
| 4_0 | Scheduling of PDSCH with CRC scrambled by MCCH-RNTI/G-RNTI for broadcast |
| 4_1 | Scheduling of PDSCH with CRC scrambled by G-RNTI/G-CS-RNTI for multicast |
| 4_2 | Scheduling of PDSCH with CRC scrambled by G-RNTI/G-CS-RNTI for multicast |

FIG. 26

R/LCID subheader
Fixed-sized MAC CE
R/F/LCID/L subheader
Variable-sized MAC CE
R/F/LCID/L subheader
MAC SDU MAC subPDU including MAC CE 1
MAC subPDU including MAC CE 2
MAC subPDU including MAC SDU
...
MAC subPDU including MAC SDU
MAC subPDU including padding (opt)

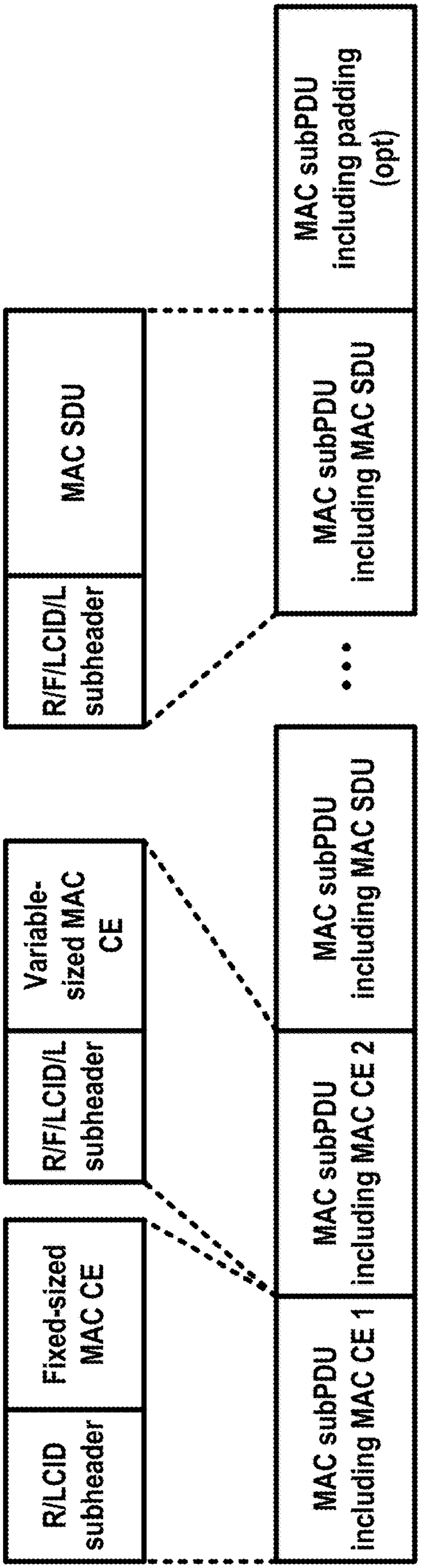

FIG. 28A

R/F/LCID/L subheader
MAC SDU
R/LCID subheader
Fixed-sized MAC CE
R/F/LCID/L subheader
Variable-sized MAC CE MAC subPDU including MAC SDU
MAC subPDU including MAC SDU
...
MAC subPDU including MAC CE 1
MAC subPDU including MAC CE 2
MAC subPDU including padding (opt)

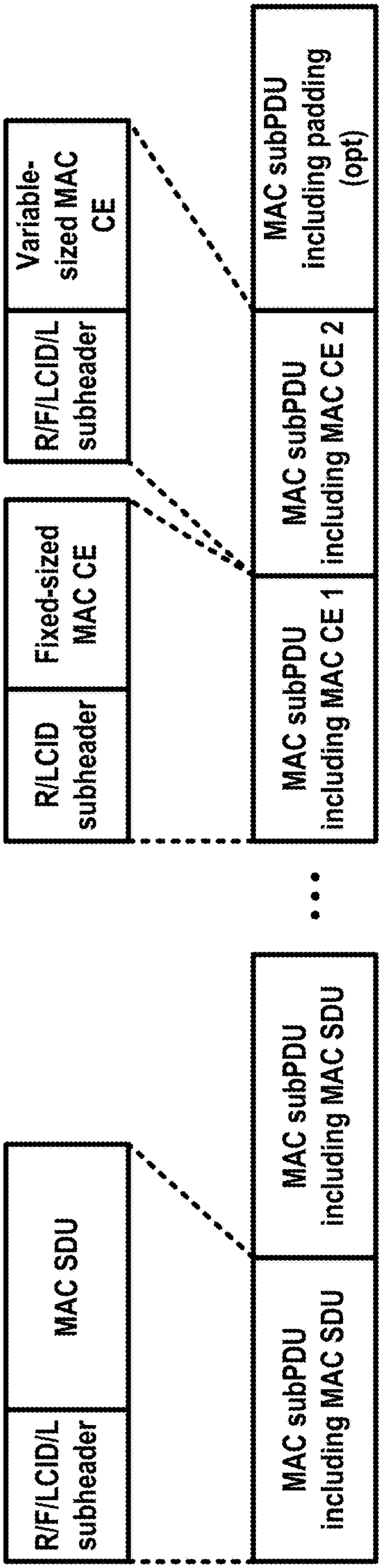

| Codepoint/ Index | LCID values |
|---|---|
| 0 | CCCH of size 64 bits (referred to as "CCCH1"), except for a RedCap UE |
| 1~32 | Identity of the logical channel of DCCH and DTCH |
| 33 | Extended logical channel ID field (two-octet eLCID field) |
| 34 | Extended logical channel ID field (one-octet eLCID field) |
| 35 | CCCH of size 48 bits (referred to as "CCCH") for a RedCap UE |
| 36 | CCCH of size 64 bits (referred to as "CCCH1") for a RedCap UE |
| 37~42 | Reserved |
| 43 | Truncated Enhanced BFR (one octet $C_i$) |
| 44 | Timing Advance Report |
| 45 | Truncated Sidelink BSR |
| 46 | Sidelink BSR |
| 47 | Reserved |
| 48 | LBT failure (four octets) |
| 49 | LBT failure (one octet) |
| 50 | BFR (one octet $C_i$) |
| 51 | Truncated BFR (one octet $C_i$) |
| 52 | CCCH of size 48 bits (referred to as "CCCH" ), except for a RedCap UE |
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

| Codepoint/ Index | LCID values |
|---|---|
| 0 | CCCH |
| 1~32 | Identity of the logical channel of DCCH, DTCH and multicast MTCH |
| 33 | Extended logical channel ID field (two-octet eLCID field) |
| 34 | Extended logical channel ID field (one-octet eLCID field) |
| 35~46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

FIG. 30B

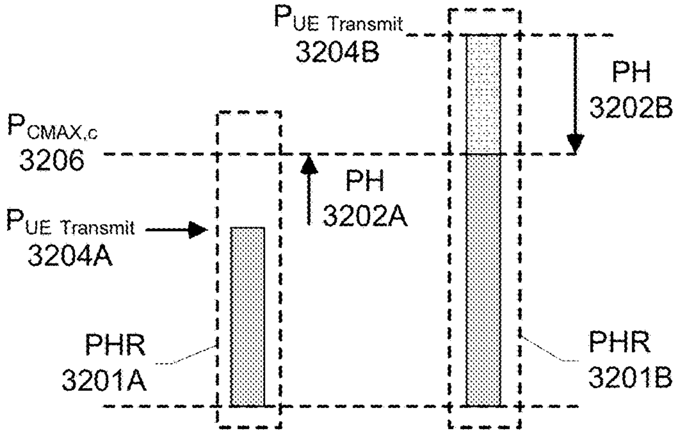

FIG. 32A

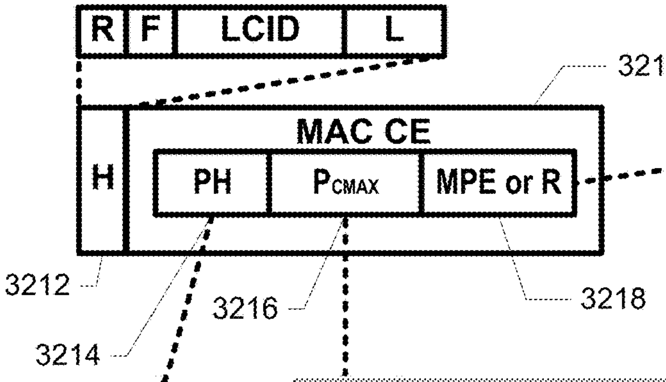

| MPE | Measured P-MPR Value | Measured quantity value (dB) |
|---|---|---|
| 0 | P-MPR_00 | 3 ≤ PMP-R < 6 |
| 1 | P-MPR_01 | 6 ≤ PMP-R < 9 |
| 2 | P-MPR_02 | 9 ≤ PMP-R < 12 |
| 3 | P-MPR_03 | PMP-R ≥ 12 |

| $P_{CMAX,f,c}$ | Nominal UE transmit power level | Measured quantity value (dBm) |
|---|---|---|
| 0 | PCMAX_C_00 | $P_{CMAX,c,f}$ < -29 |
| 1 | PCMAX_C_01 | -29 ≤ $P_{CMAX,c,f}$ < -28 |
| 2 | PCMAX_C_02 | -28 ≤ $P_{CMAX,c,f}$ < -27 |
| … | … | … |
| 61 | PCMAX_C_61 | 31 ≤ $P_{CMAX,c,f}$ < 32 |
| 62 | PCMAX_C_62 | 32 ≤ $P_{CMAX,c,f}$ < 33 |
| 63 | PCMAX_C_63 | 33 ≤ $P_{CMAX,c,f}$ |

3222

| PH | Power Headroom Level | Measured quantity value (dB) |
|---|---|---|
| 0 | POWER_HEADROOM_0 | PH < -32 |
| 1 | POWER_HEADROOM_1 | -32 ≤ PH < -31 |
| 2 | POWER_HEADROOM_2 | -31 ≤ PH < -30 |
| 3 | POWER_HEADROOM_3 | -30 ≤ PH < -29 |
| … | … | … |
| 53 | POWER_HEADROOM_53 | 20 ≤ PH < 21 |
| 54 | POWER_HEADROOM_54 | 21 ≤ PH < 22 |
| 55 | POWER_HEADROOM_55 | 22 ≤ PH < 24 |
| 56 | POWER_HEADROOM_56 | 24 ≤ PH < 26 |
| 57 | POWER_HEADROOM_57 | 26 ≤ PH < 28 |
| 58 | POWER_HEADROOM_58 | 28 ≤ PH < 30 |
| 59 | POWER_HEADROOM_59 | 30 ≤ PH < 32 |
| 60 | POWER_HEADROOM_60 | 32 ≤ PH < 34 |
| 61 | POWER_HEADROOM_61 | 34 ≤ PH < 36 |
| 62 | POWER_HEADROOM_62 | 36 ≤ PH < 38 |
| 63 | POWER_HEADROOM_63 | PH ≥ 38 |

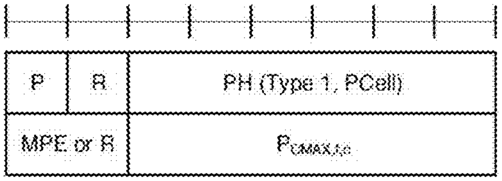

FIG. 33A

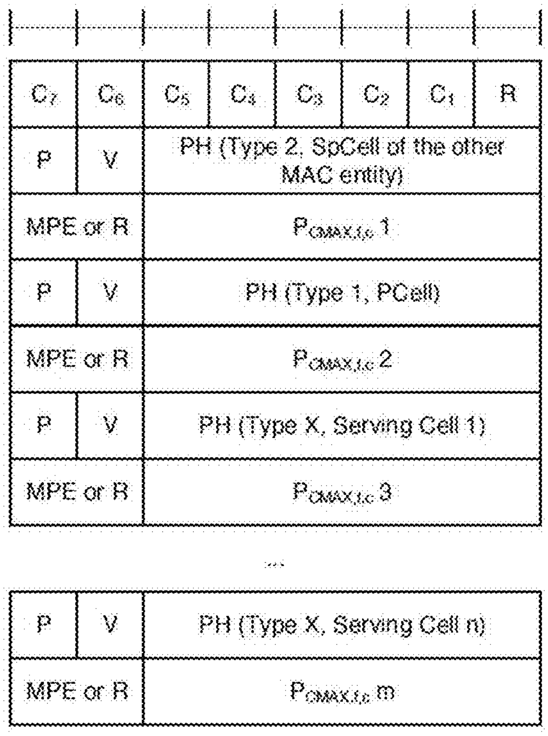

FIG. 33B

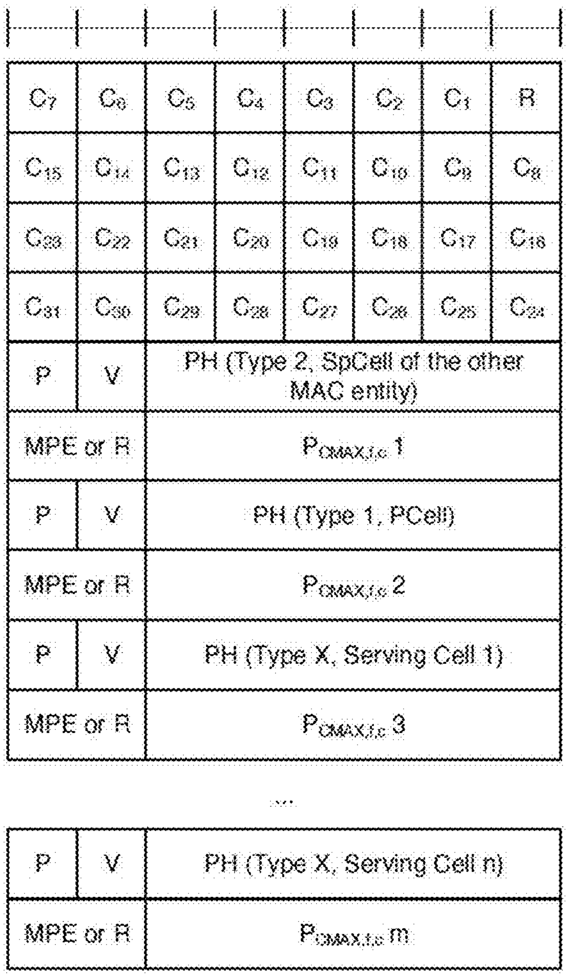

FIG. 33C

| | | | | | | | |
|---|---|---|---|---|---|---|---|
| $C_7$ | $C_6$ | $C_5$ | $C_4$ | $C_3$ | $C_2$ | $C_1$ | R |
| P | V | PH (Type 2, SpCell of the other MAC entity) | | | | | |
| MPE or R | | $P_{CMAX,f,c}$ 1 | | | | | |
| P | V | PH (Type 1, PCell) | | | | | |
| MPE or R | | $P_{CMAX,f,c}$ 2 | | | | | |
| P | V | PH (Type X, Serving Cell 1) | | | | | |
| MPE or R | | $P_{CMAX,f,c}$ 3 | | | | | |
| ... | | | | | | | |
| P | V | PH (Type X, Serving Cell n) | | | | | |
| MPE or R | | $P_{CMAX,f,c}$ m | | | | | |

| | | | | | | | |
|---|---|---|---|---|---|---|---|
| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, SpCell of the other MAC entity) | | | | | |
| MPE or R | | $P_{CMAX,f,c}$ 1 | | | | | |
| P | V | PH (Type 1, PCell) | | | | | |
| MPE or R | | $P_{CMAX,f,c}$ 2 | | | | | |
| P | V | PH (Type X, Serving Cell 1) | | | | | |
| MPE or R | | $P_{CMAX,f,c}$ 3 | | | | | |
| ... | | | | | | | |
| P | V | PH (Type X, Serving Cell n) | | | | | |
| MPE or R | | $P_{CMAX,f,c}$ m | | | | | |

Base station

Cell 1

TRP 1

TRP 2

Wireless device

Intra-Cell Multiple TRPs

Base station

Cell 1 with PCI 1

TRP 1

Cell 2 with PCI 2

TRP 2

Wireless device

Inter-Cell Multiple TRPs

```
RRCReconfiguration-IEs ::=          SEQUENCE {
  radioBearerConfig                 RadioBearerConfig
  secondaryCellGroup                 OCTET STRING (CONTAINING CellGroupConfig)
  measConfig                      MeasConfig
  nonCriticalExtension               RRCReconfiguration-v1530-IEs
}

RRCReconfiguration-v1530-IEs ::=          SEQUENCE {
  masterCellGroup          OCTET STRING (CONTAINING CellGroupConfig)
  fullConfig               ENUMERATED {true}        OPTIONAL, -- Cond FullConfig
  ...
}

CellGroupConfig ::=                  SEQUENCE {
  cellGroupId                       CellGroupId,
  rlc-BearerToAddModList        SEQUENCE (SIZE(1..maxLC-ID)) OF RLC-BearerConfig
  rlc-BearerToReleaseList       SEQUENCE (SIZE(1..maxLC-ID)) OF LogicalChannelIdentity
  mac-CellGroupConfig           MAC-CellGroupConfig              OPTIONAL,   -- Need M
  physicalCellGroupConfig       PhysicalCellGroupConfig          OPTIONAL,   -- Need M
  spCellConfig                  SpCellConfig                     OPTIONAL,   -- Need M
  sCellToAddModList             SEQUENCE (SIZE (1..maxNrofSCells)) OF SCellConfig
  sCellToReleaseList            SEQUENCE (SIZE (1..maxNrofSCells)) OF SCellIndex
  ...,
}

SpCellConfig ::=                 SEQUENCE {
  servCellIndex                  ServCellIndex          OPTIONAL,   -- Cond SCG
  reconfigurationWithSync          ReconfigurationWithSync   OPTIONAL,   -- Cond
ReconfWithSync
  rlf-TimersAndConstants           SetupRelease { RLF-TimersAndConstants }
  rlmInSyncOutOfSyncThreshold       ENUMERATED {n1}
  spCellConfigDedicated            ServingCellConfig
  ...,
}

ReconfigurationWithSync ::=       SEQUENCE {
  spCellConfigCommon               ServingCellConfigCommon
  newUE-Identity               RNTI-Value,
  t304                     ENUMERATED {ms50, ms100, ms150, ...},
  rach-ConfigDedicated             CHOICE {
    uplink                     RACH-ConfigDedicated,
    supplementaryUplink              RACH-ConfigDedicated
  }
  ...,
  [[   smtc                       SSB-MTC  ]],
  ...}
```

FIG. 36

```
RRCReconfiguration-v1610-IEs ::=       SEQUENCE {
   otherConfig-v1610                   OtherConfig-v1610
   bap-Config-r16                      SetupRelease { BAP-Config-r16 }
   iab-IP-AddressConfigurationList-r16    IAB-IP-AddressConfigurationList-r16
   conditionalReconfiguration-r16       ConditionalReconfiguration-r16
   daps-SourceRelease-r16               ENUMERATED{true}
   t316-r16                             SetupRelease {T316-r16}
  ...
   targetCellSMTC-SCG-r16               SSB-MTC
   }

ConditionalReconfiguration-r16 ::=   SEQUENCE {
   attemptCondReconfig-r16              ENUMERATED {true}
condReconfigToRemoveList-r16          CondReconfigToRemoveList-r16
condReconfigToAddModList-r16          CondReconfigToAddModList-r16
 ...
}

CondReconfigToAddModList-r16 ::= SEQUENCE (SIZE (1.. maxNrofCondCells-r16)) OF
CondReconfigToAddMod-r16

CondReconfigToAddMod-r16 ::=    SEQUENCE {
   condReconfigId-r16              CondReconfigId-r16,
   condExecutionCond-r16              SEQUENCE (SIZE (1..2)) OF MeasId
   condRRCReconfig-r16              OCTET STRING (CONTAINING RRCReconfiguration)
   ...,
}

CondReconfigId-r16 ::=          INTEGER (1.. maxNrofCondCells-r16)
```

*condExecutionCond*

The execution condition that needs to be fulfilled in order to trigger the execution of a conditional reconfiguration for CHO, CPA, intra-SN CPC without MN involvement or MN initiated inter-SN CPC. When configuring 2 triggering events (Meas Ids) for a candidate cell, network ensures that both refer to the same *measObject*. For CHO, if network configures *condEventD1* or *condEventT1* for a candidate cell network configures a second triggering event *condEventA3, condEventA4* or *condEventA5* for the same candidate cell. Network does not configure both *condEventD1* and *condEventT1* for the same candidate cell.

CondEvent A3: Conditional reconfiguration candidate becomes amount of offset better than PCell/PSCell;
CondEvent A4: Conditional reconfiguration candidate becomes better than absolute threshold;
CondEvent A5: PCell/PSCell becomes worse than absolute threshold1 AND Conditional reconfiguration candidate becomes better than another absolute threshold2;

FIG. 38

POWER HEADROOM REPORT FOR FAST PRIMARY CELL SWITCHING

CROSS-REFERENCE TO RELATED APPLICATIONS

The present application claims priority to U.S. Provisional Application No. 63/411,578, entitled "Power Headroom Report for Fast Primary Cell Switching," filed Sep. 29, 2022, the contents of which are hereby incorporated by reference in its entirety.

BACKGROUND

A wireless device, such as a mobile phone, may perform power headroom reporting to report power characteristics of its transmissions. In the case of a handover, the wireless device may receive a radio resource configuration (RRC) message regarding the handover, and based on the RRC message, the wireless device may instruct its own media access control (MAC) layer to cancel scheduled power headroom reporting in preparation for the handover.

SUMMARY

Features described herein allow for improving a speed with which a wireless device may handle its power headroom reporting in situations involving a handover from a source cell to another candidate cell. A MAC control element (CE) may be used to inform the wireless of the handover (e.g., that the wireless device should switch from using the source cell as a primary cell (PCell) to using a candidate cell as a PCell). Power headroom reporting that had been triggered, but not yet sent on the source cell, may be cancelled by the wireless device based on the MAC CE. Power headroom reporting may be triggered on the candidate cell instead of the source cell. Handling this cancellation based on the MAC CE from the source cell may save time, as the processing of the MAC CE can be performed without waiting for the reception and processing of an RRC message.

The above summary presents a simplified summary of certain features. The summary is not an extensive overview and is not intended to identify key or critical elements. These and other features and advantages are described in greater detail below.

BRIEF DESCRIPTION OF THE DRAWINGS

Examples of several of the various embodiments of the present disclosure are described herein with reference to the drawings.

FIG. 18 is a table showing an example for determination of the starting OFDM symbol index.

FIG. 21A is a diagram showing example configuration parameters of a master information block (MIB) of a cell.

FIG. 21B is a diagram showing an example of a configuration of CORESET #0.

FIG. 21C is a diagram showing an example of a configuration of SS #0.

FIG. 22 is a diagram showing example RRC configuration parameters of system information block (SIB).

FIG. 23 is a diagram showing an example of RRC configuration parameters (e.g., BWP-DownlinkCommon IE) in an initial downlink BWP of a serving cell.

FIG. 24 is a diagram showing an example of configuration of a search space.

FIG. 26 is a table showing examples of DCI formats.

FIG. 28A shows an example of a downlink (DL) MAC PDU.

FIG. 28B shows an example of an uplink (UL) MAC PDU.

FIG. 30A is a table showing an example of the one or more MAC CEs identified by a corresponding codepoint/index of the LCID.

FIG. 30B is a table showing an example of one or more MAC CEs identified by a corresponding codepoint/index of the LCID.

FIG. 32A is a diagram showing two example power headroom reports (PHRs).

FIG. 32B is a diagram showing an example MAC subheader and a corresponding MAC CE for transmitting a PHR.

FIG. 33A shows an example of a Single Entry PHR MAC CE.

FIG. 33B shows an example of Multiple Entry PHR MAC CE.

FIG. 33C shows an example of Multiple Entry PHR MAC CE.

FIG. 36 is a diagram showing an example RRC message for HO.

FIG. 38 shows an example of an RRC message for CHO.

DETAILED DESCRIPTION

Figure 1A:
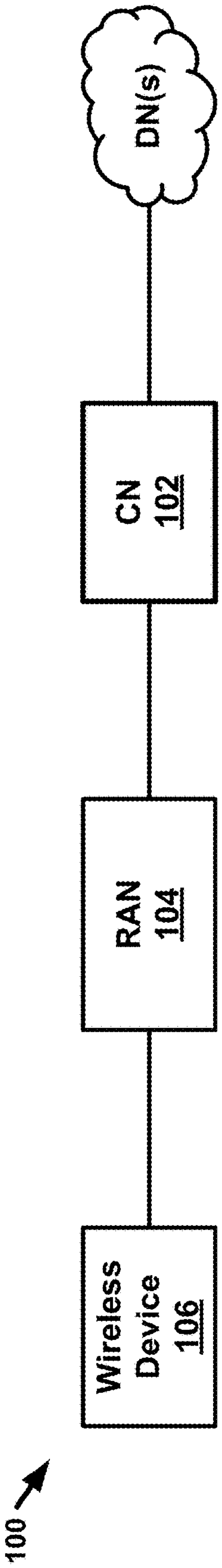
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to signaling for resource conservation.

FIG. 1A shows an example communication network 100. The communication network 100 may comprise a mobile communication network. The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with the one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over/via an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a Generation Node B (gNB), an Next Generation Evolved Node B (ng-eNB), a relay node (e.g., an integrated access and backhaul (IAB) node), a donor node (e.g., a donor eNB, a donor gNB, etc.), an access point (AP) (e.g., a Wi-Fi access point), a transmission and reception point (TRP), a computing device, a device capable of wirelessly communicating, or any other device capable of sending and/or receiving signals. A base station may comprise one or more of the elements listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an eNB (e.g., associated with Evolved-Universal Terrestrial Radio Access (E-UTRA) and/or fourth-generation (4G) standards), a remote radio head (RRH), a baseband processing unit coupled to one or more RRHs, a repeater node or relay node used to extend the coverage area of a donor node, a ng-eNB, a gNB (e.g., associated with New Radio (NR) and/or fifth-generation (5G) standards), an AP (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an AP, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
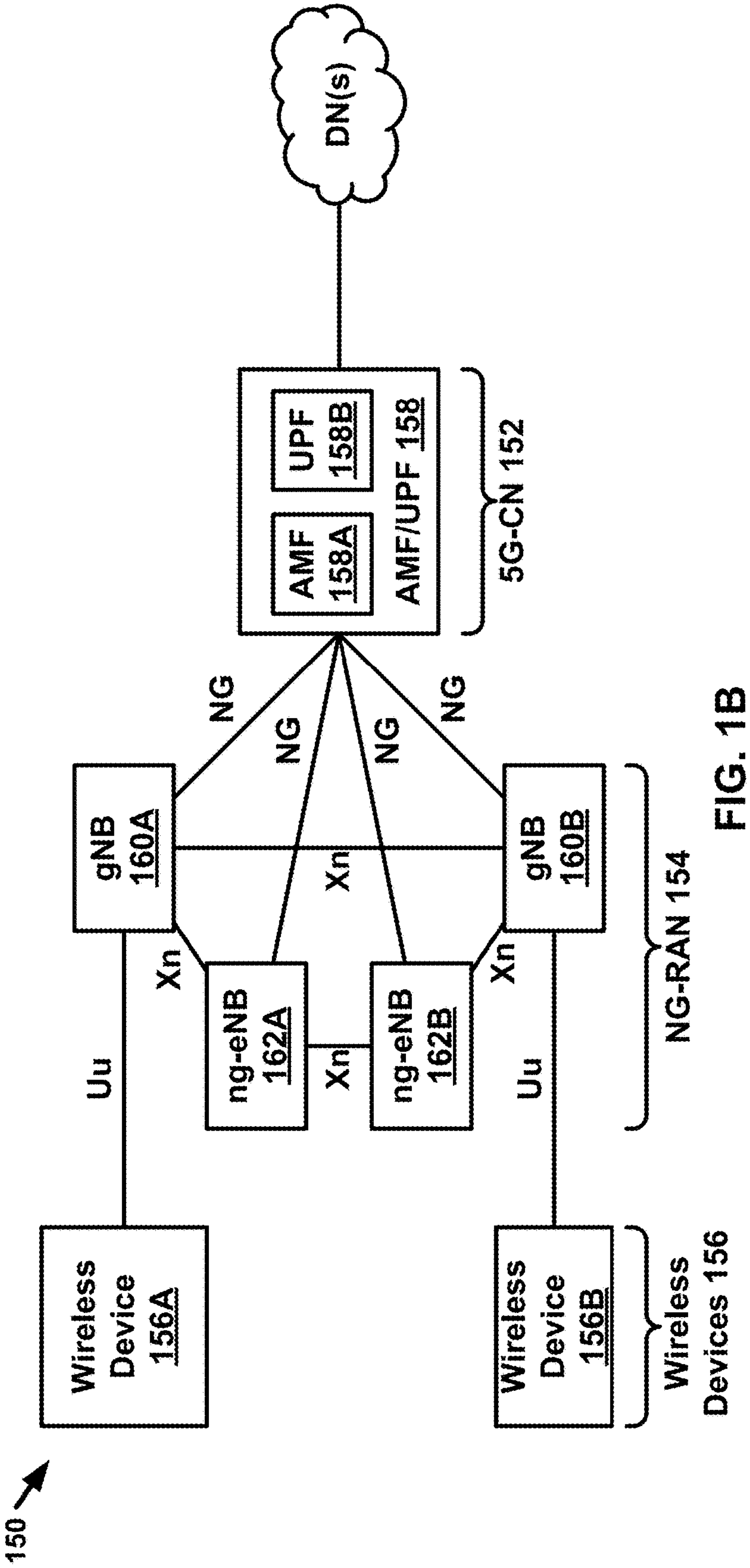

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to the one or more DNs 170. The wireless device(s) 156 may communicate with the one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs 170, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G-CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between the RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs 170, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng-eNBs comprising an ng-eNB 162A and an ng-eNB 162B (collectively ng-eNBs 162)). The RAN 154 may comprise one or more of any quantity of types of base station. The gNBs 160 and/or ng-eNBs 162 may be referred to as base stations. The base stations (e.g., the gNBs 160 and/or ng-eNBs 162) may comprise one or more sets of antennas for communicating with the wireless device(s) 156 wirelessly (e.g., an over an air interface). One or more base stations (e.g., the gNBs 160 and/or the ng-eNBs 162) may comprise multiple sets of antennas to respectively control multiple cells (or sectors). The cells of the base stations (e.g., the gNBs 160 and/or the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G-CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide E-UTRA user plane and control plane protocol terminations towards the wireless device(s) 156 via a Uu interface (e.g., where E-UTRA may refer to the 3GPP 4G radio-access technology). A base station (e.g., the ng-eNB 162B) may provide E-UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/ device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, IoT devices, hotspots, cellular repeaters, computing devices, and/or, more generally, UE. Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
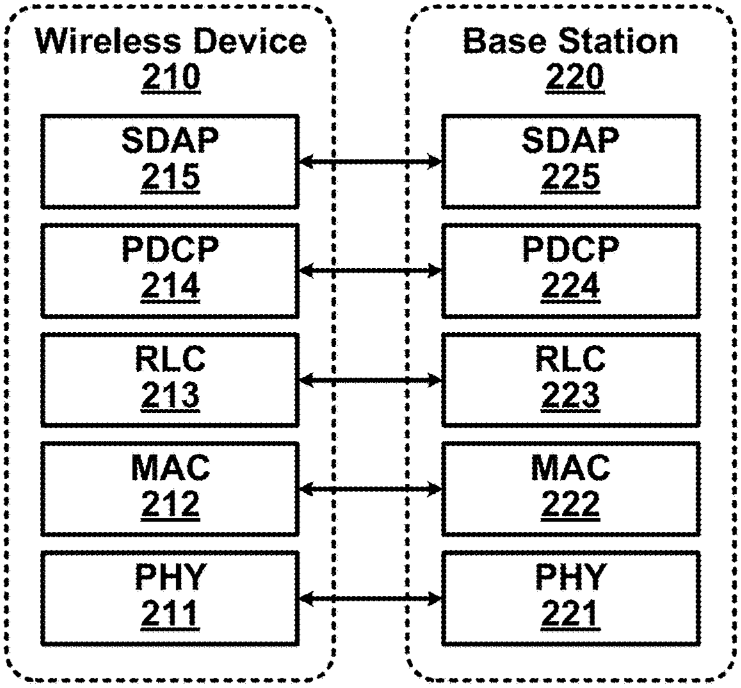
FIG. 2A shows an example user plane.
Figure 2B:
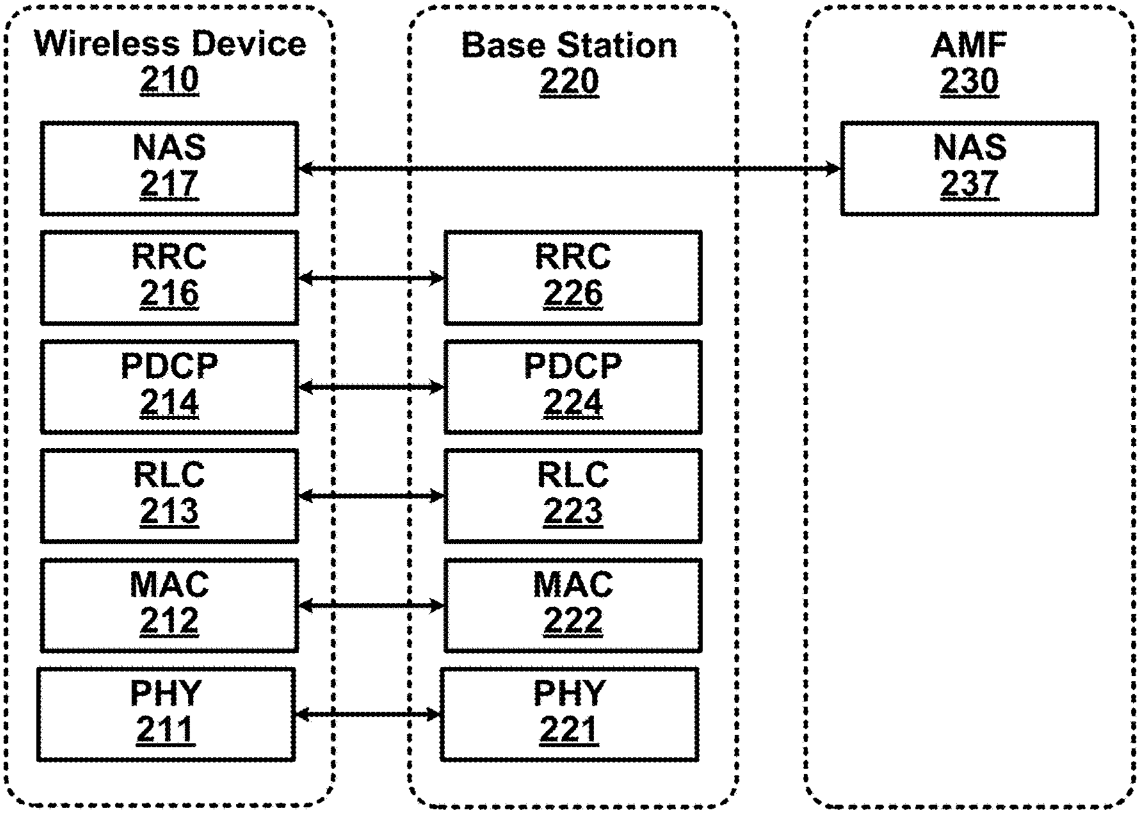
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configurations and/or the control plane configurations may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
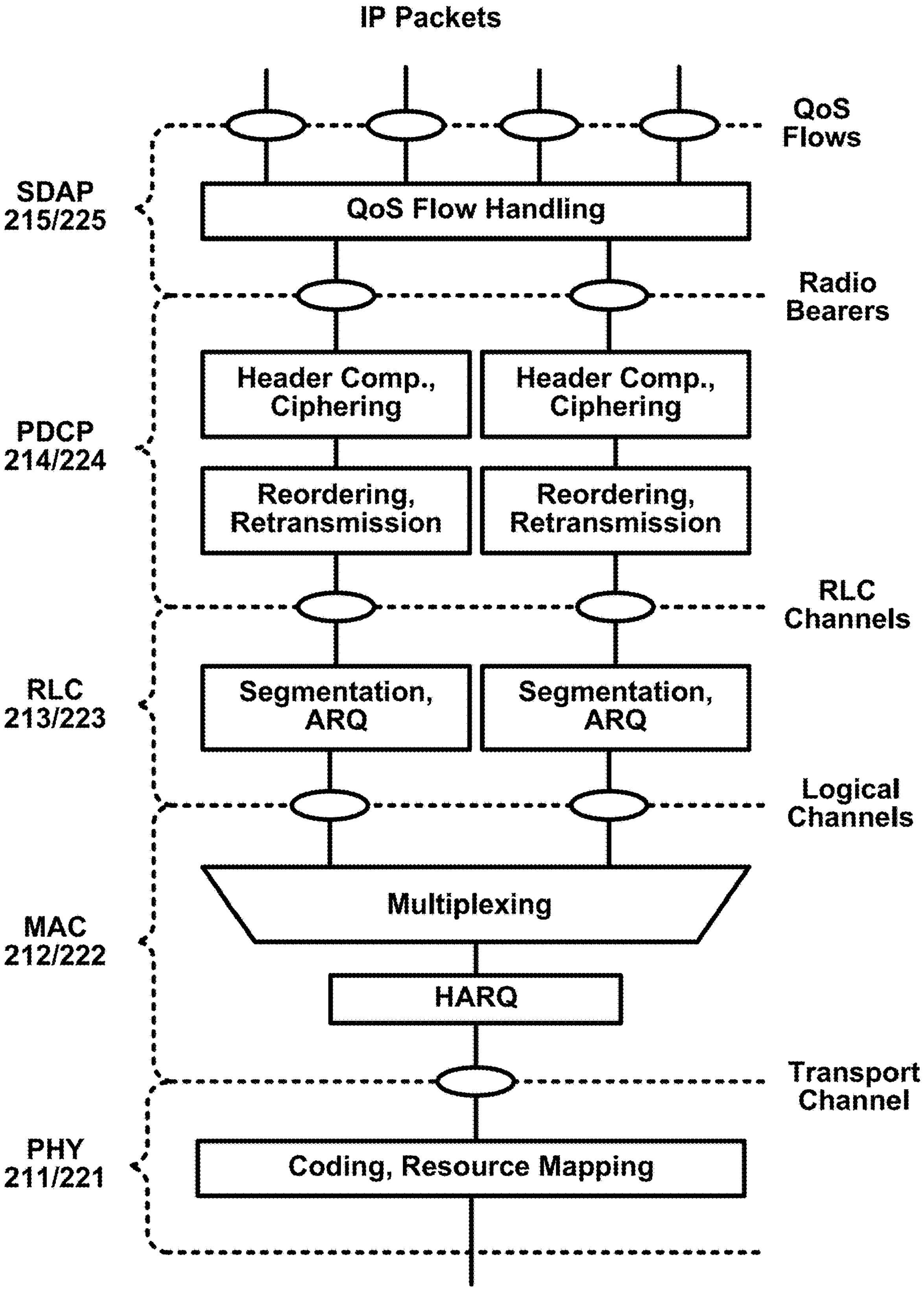
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform QoS flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows 310 of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers (e.g., RLCs 213 and 223) may perform one or more of the noted functions, for example, based on the transmission mode the RLC layer (e.g., RLCs 213 and 223) is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels 330 as a service to the PDCP layers (e.g., PDCPs 214 and 224, respectively), such as shown in FIG. 3.

The MAC layers (e.g., MACs 212 and 222) may perform multiplexing/demultiplexing of logical channels 340 and/or mapping between logical channels 340 and transport channels 350. The multiplexing/demultiplexing may comprise multiplexing/demultiplexing of data units/data portions, belonging to the one or more logical channels 340, into/from Transport Blocks (TBs) delivered to/from PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels 340 of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels 350 to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
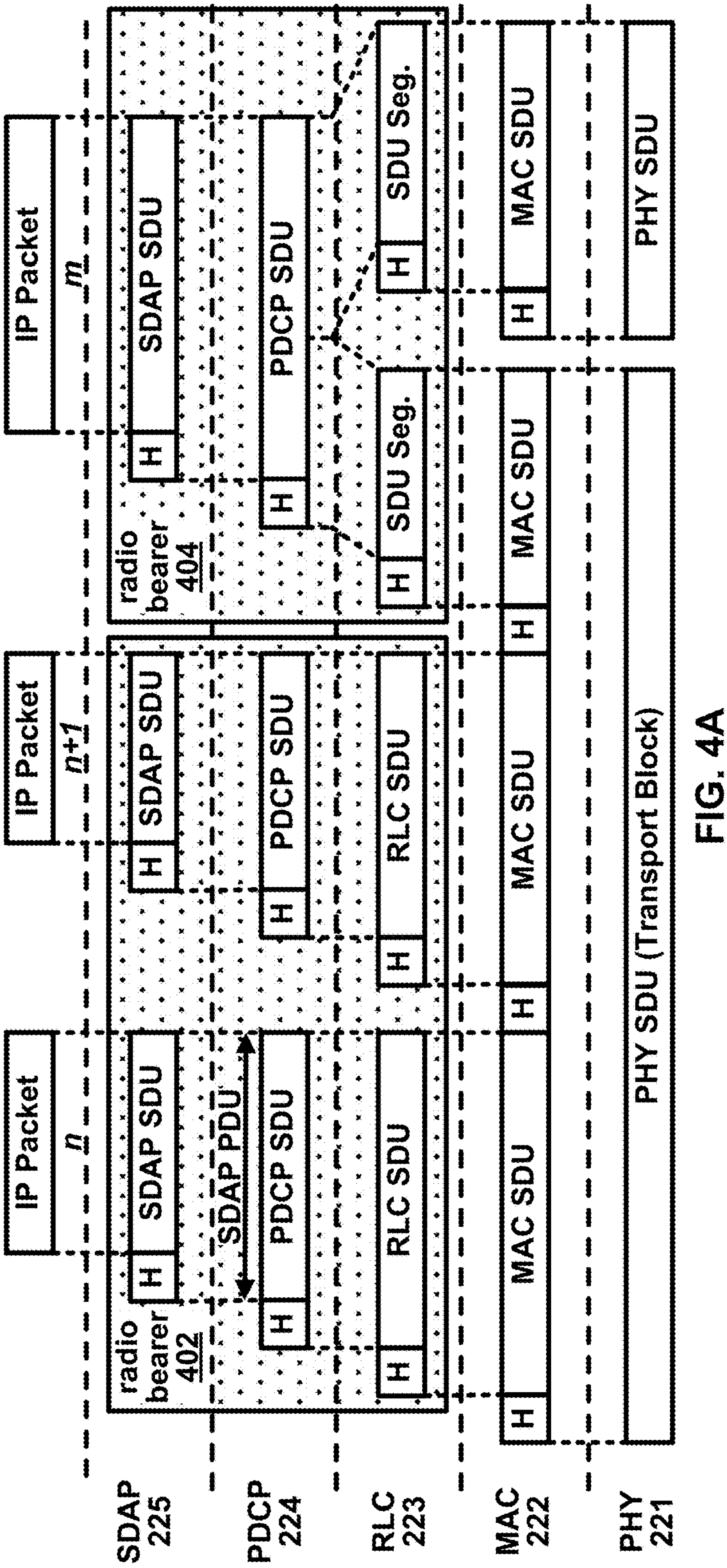
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
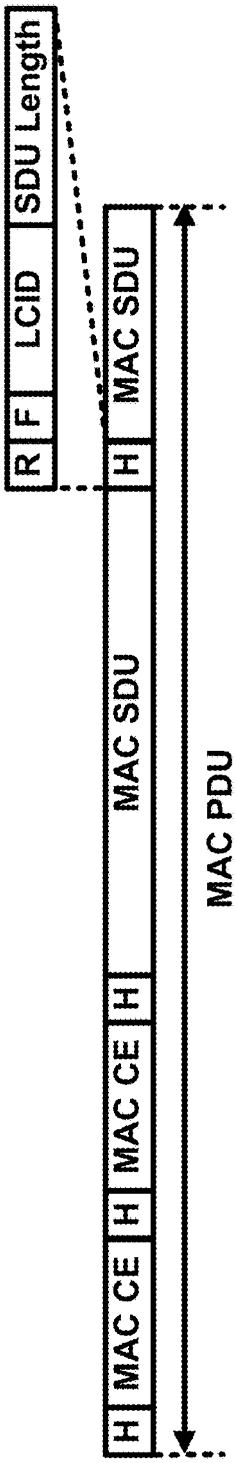
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 212 or MAC 222. As shown in FIG. 4B, two MAC CEs may be inserted into/added to the MAC PDU. The MAC CEs may be inserted/added at the beginning of a MAC PDU for downlink transmissions (as shown in FIG. 4B).

One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
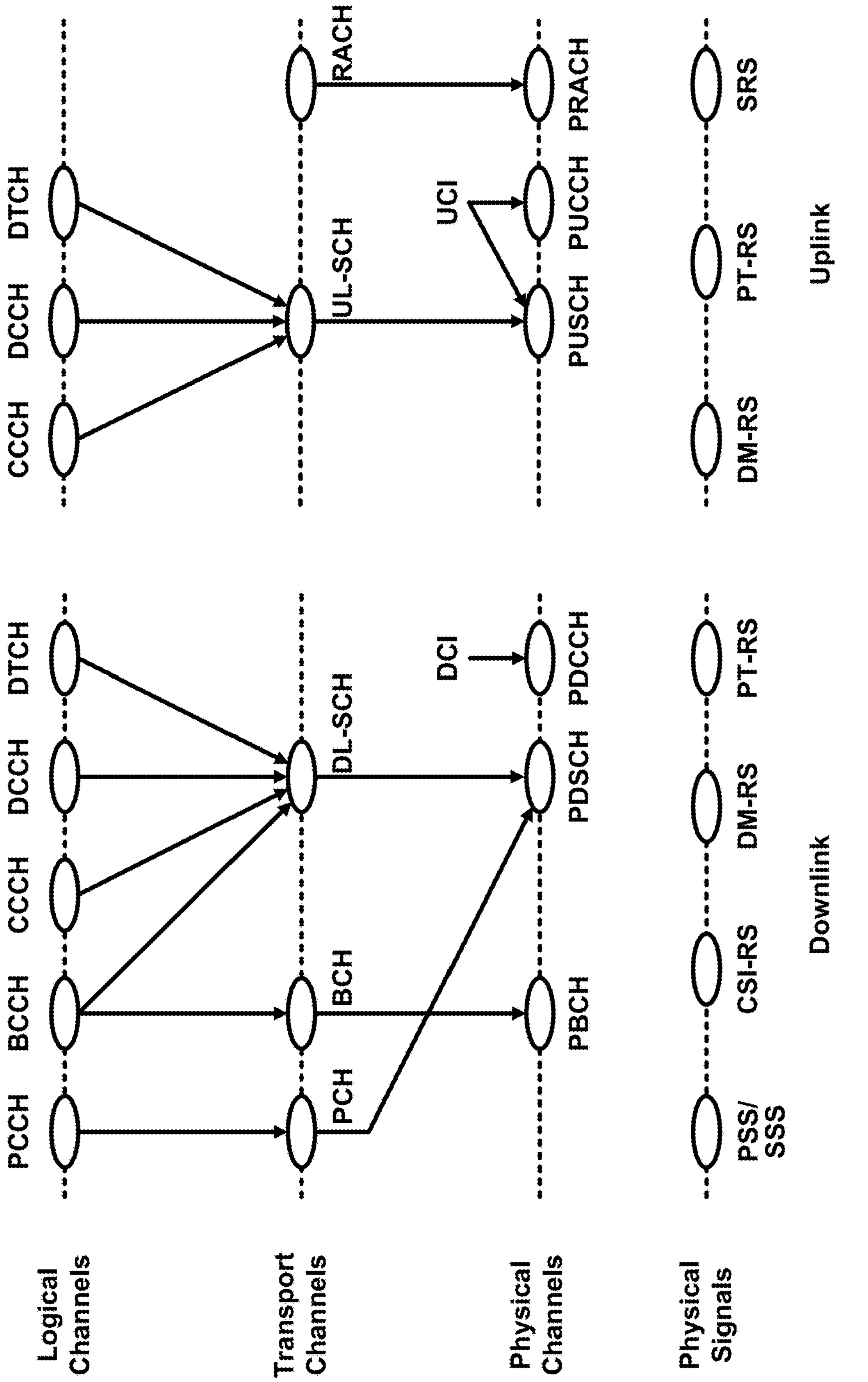
FIG. 5A shows an example mapping for downlink channels.
FIG. 5B shows an example mapping for uplink channels.

FIG. 5A shows an example mapping for downlink channels. The mapping for downlink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless devices).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may comprise an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The PHY layer may generate physical signals to support the low-level operation of the PHY layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), SRS, phase-tracking reference signals (PT RS), and/or any other signals.

One or more of the channels (e.g., logical channels, transport channels, physical channels, etc.) may be used to carry out functions associated with the control plane protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHYs 211 and 221, MACs 212 and 222, RLCs 213 and 223, and PDCPs 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane protocol stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and substantially the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting and control of the reporting; detection of and recovery from radio link failure (RLF); and/or NAS message transfer. As part of establishing an RRC connection, the RRC layers 216 and 226 may establish an RRC context, which may involve configuring parameters for communication between the wireless device 210 and the RAN (e.g., the base station 220).

Figure 6:
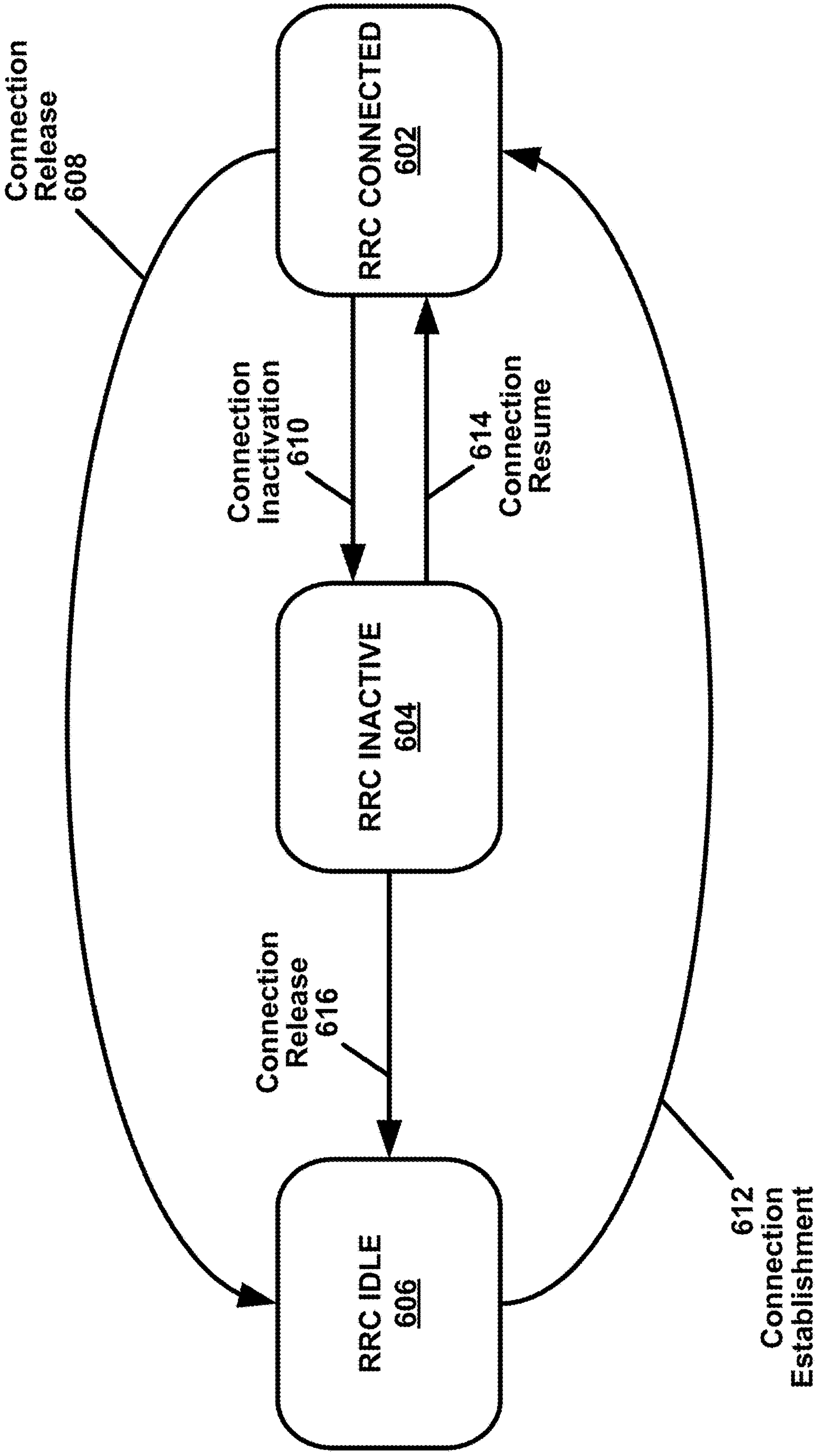
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104, the RAN 154, or any other RAN). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., the RRC connected 602) to an RRC idle state (e.g., the RRC idle 606) via a connection release procedure 608. The RRC state may transition from the RRC connected state (e.g., the RRC connected 602) to the RRC inactive state (e.g., the RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every DRX cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be substantially the same as or similar to connection release procedure 608.

An RRC state may be associated with a mobility management mechanism. During the RRC idle state (e.g., the RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC inactive state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the wireless device registration area, for example, if the wireless device moves (e.g., via a cell reselection) to a cell associated with a TAI that may not be included in the list of TAIs associated with the wireless device registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., the RRC inactive 604).

A base station (e.g., the gNBs 160 in FIG. 1B or any other base station) may be split in two parts: a central unit (e.g., a base station central unit, such as a gNB-CU) and one or more distributed units (e.g., a base station distributed unit, such as a gNB-DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM may be a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbol streams may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
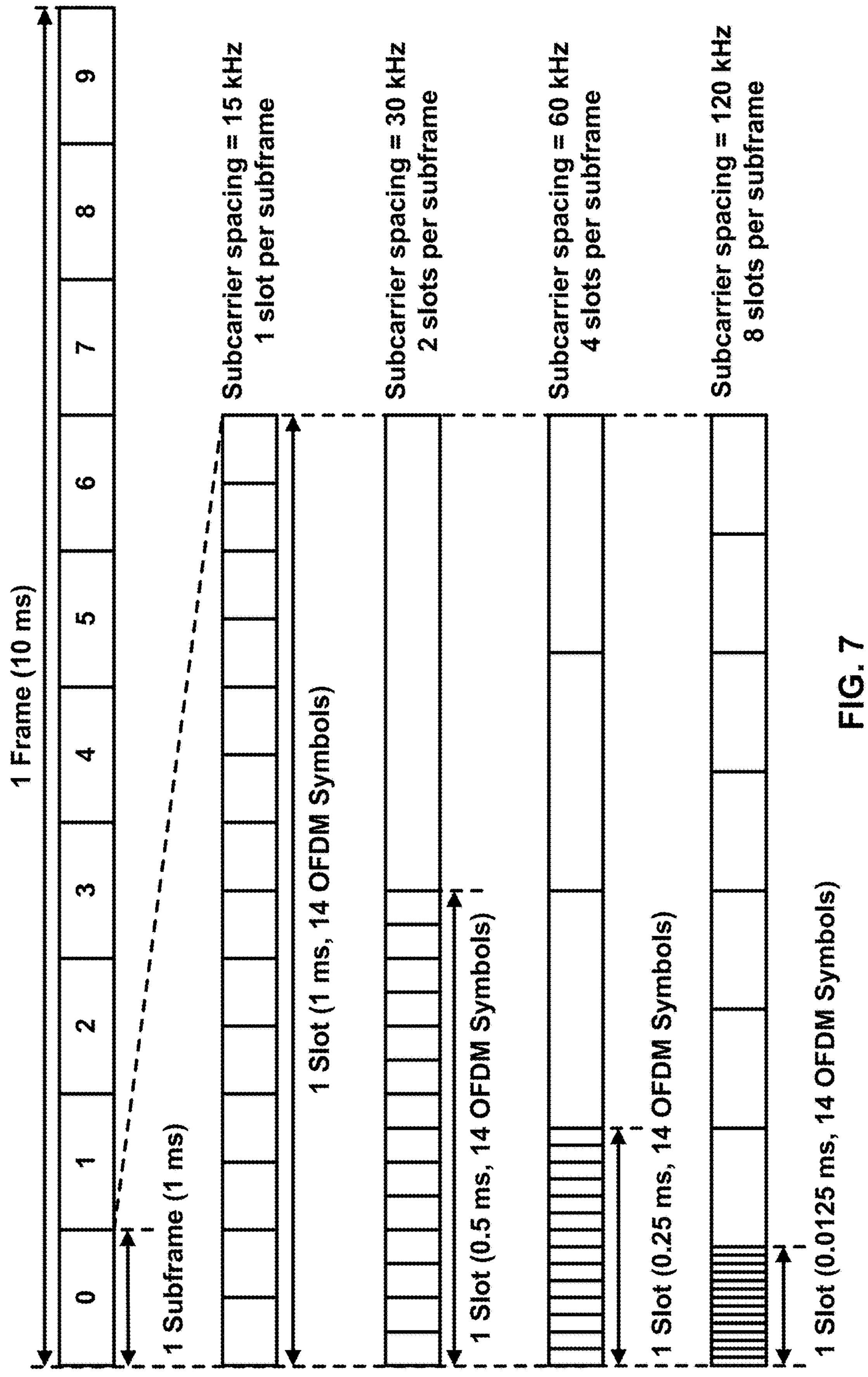
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR radio frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
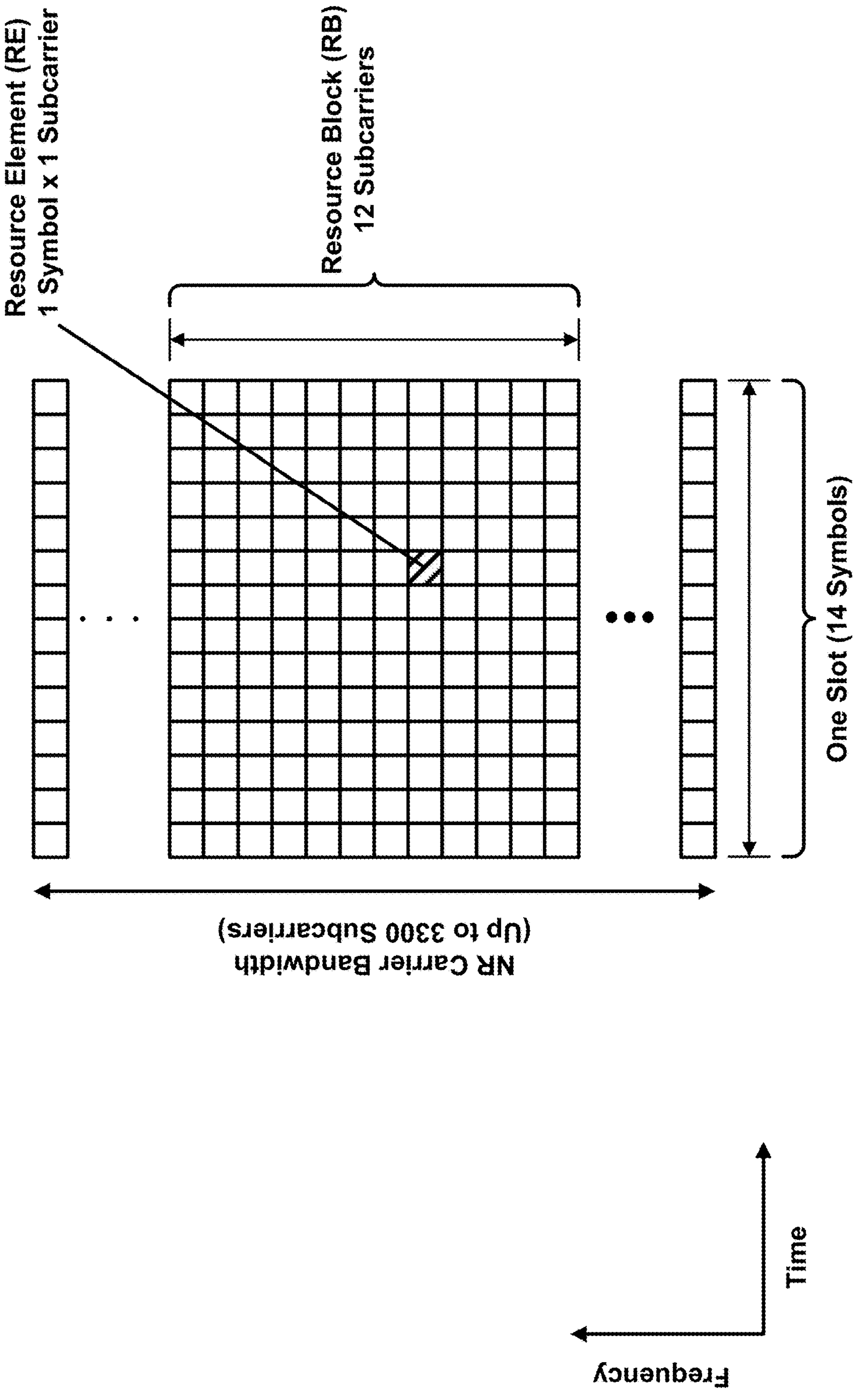
FIG. 8 shows an example resource configuration of one or more carriers.

FIG. 8 shows an example resource configuration of one or more carriers. The resource configuration may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR carrier such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in DCI. A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
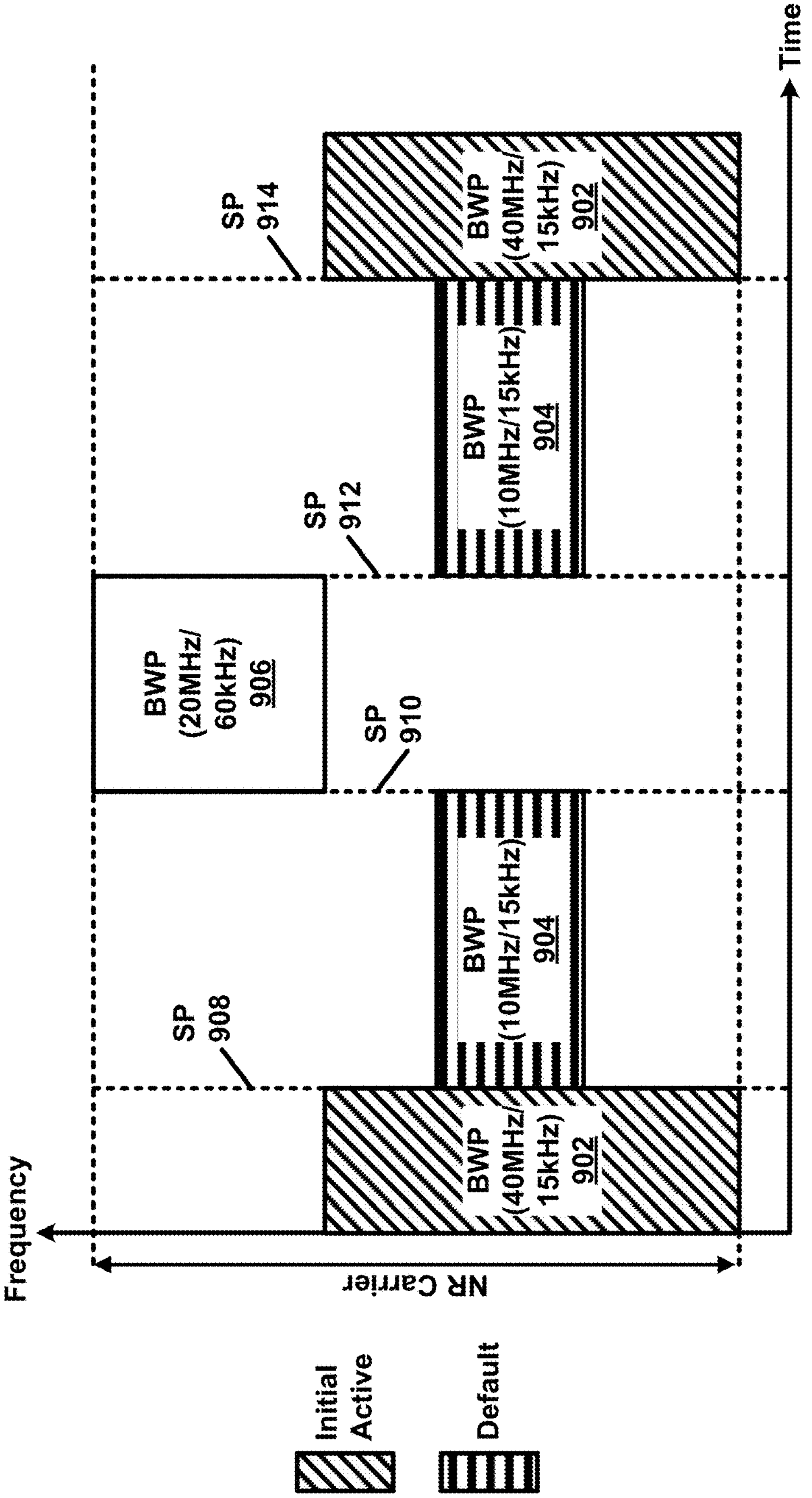
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at the switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating the BWP 904 as the active BWP. The wireless device may switch at a switching point 910 from the active BWP (e.g., the BWP 904) to the BWP 906, for example, after or in response receiving DCI indicating the BWP 906 as a new active BWP. The wireless device may switch at a switching point 912 from the active BWP (e.g., the BWP 906) to the BWP 904, for example, a based on (e.g., after or in response to) an expiry of a BWP inactivity timer. The wireless device may switch at the switching point 912 from the active BWP (e.g., the BWP 906) to the BWP 904, for example, after or in response to receiving DCI indicating the BWP 904 as a new active BWP. The wireless device may switch at a switching point 914 from the active BWP (e.g., the BWP 904) to the BWP 902, for example, after or in response receiving DCI indicating the BWP 902 as a new active BWP.

Wireless device procedures for switching BWPs on a secondary cell may be substantially the same/similar as those on a primary cell, for example, if the wireless device is configured for a secondary cell with a default downlink BWP in a set of configured downlink BWPs and a timer value. The wireless device may use the timer value and the default downlink BWP for the secondary cell in substantially the same/similar manner as the wireless device uses the timer value and/or default downlink BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
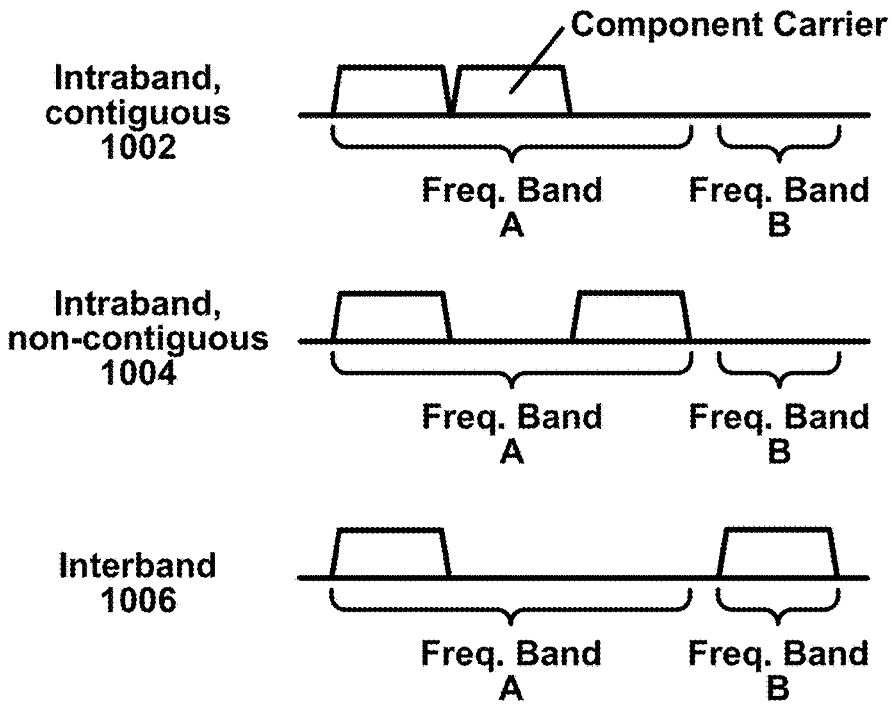
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless devices may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information for the downlink, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. UCI may comprise control information for the uplink, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
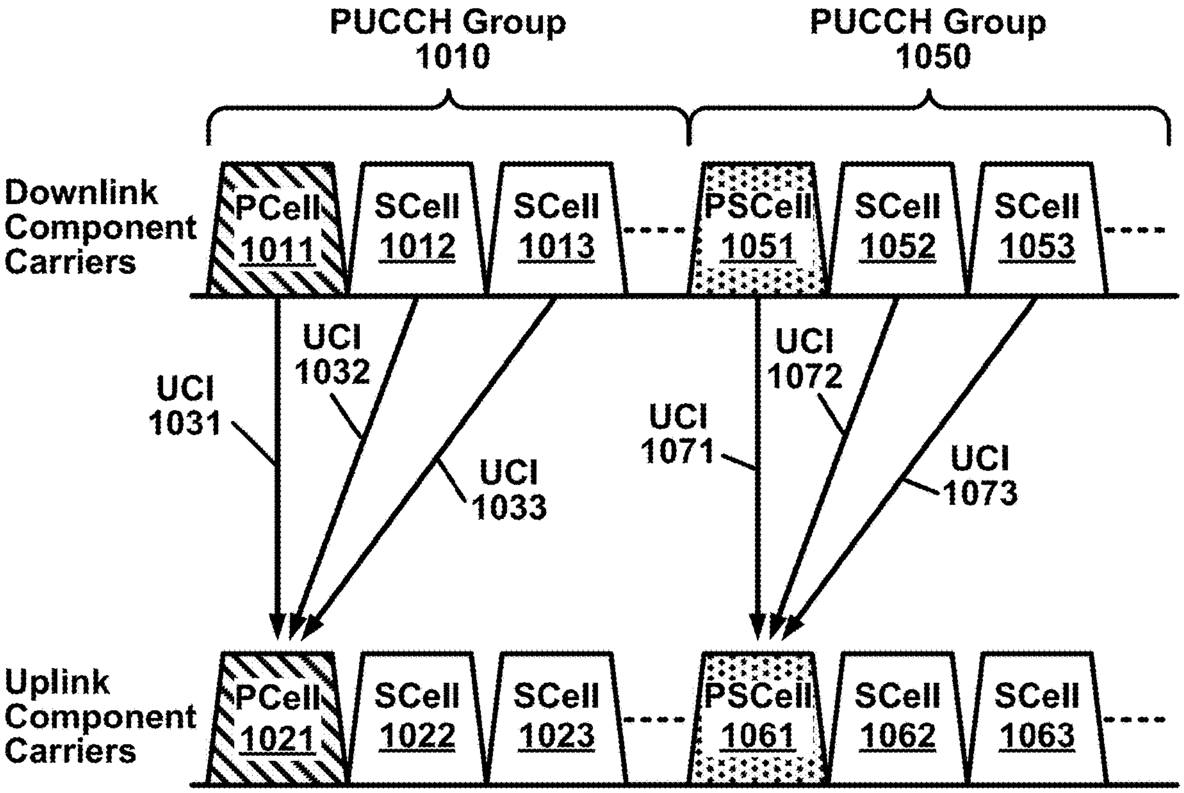
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may use/apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
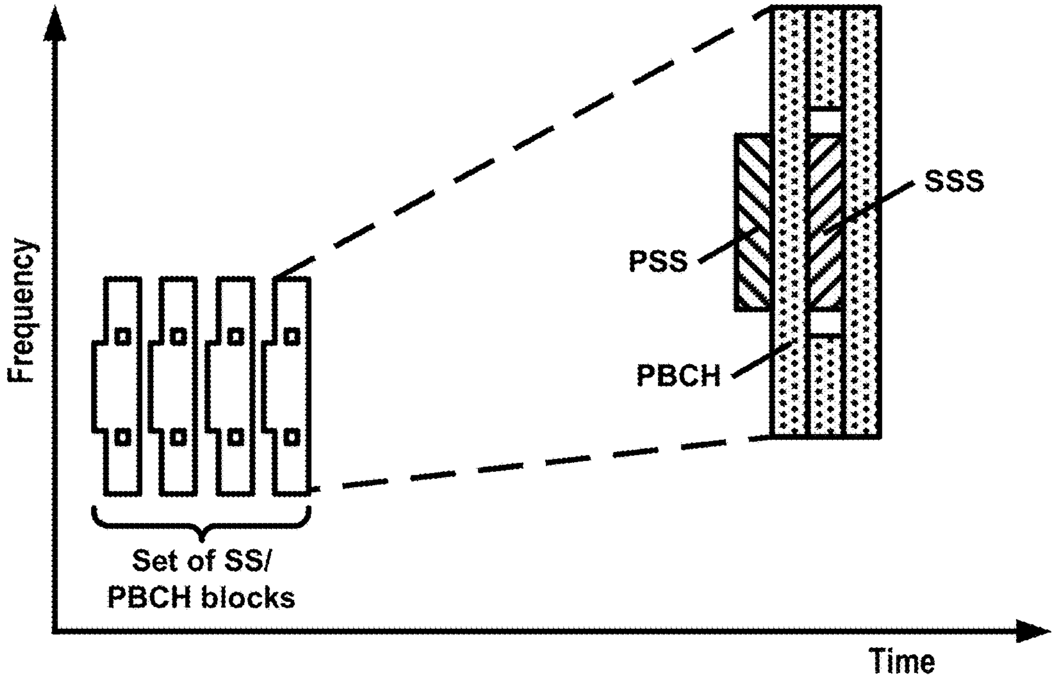
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial receiving (Rx) parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine CSI. The base station may configure the wireless device with one or more CSI-RSs for channel estimation or any other suitable purpose. The base station may configure a wireless device with one or more of substantially the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports (or any other quantity of orthogonal downlink DM-RS ports) per wireless device (e.g., for single user-MIMO). A DM-RS configuration may support up to 4 orthogonal downlink DM-RS ports (or any other quantity of orthogonal downlink DM-RS ports) per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be substantially the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with substantially the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as QCLed, for example, if one or more large-scale properties of the channel over which a first symbol on the first antenna port is conveyed may be inferred/determined from the channel over which a second symbol on a second antenna port is conveyed. The one or more large-scale properties may comprise at least one of: a delay spread; a Doppler spread; a Doppler shift; an average gain; an average delay; and/or spatial Rx parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
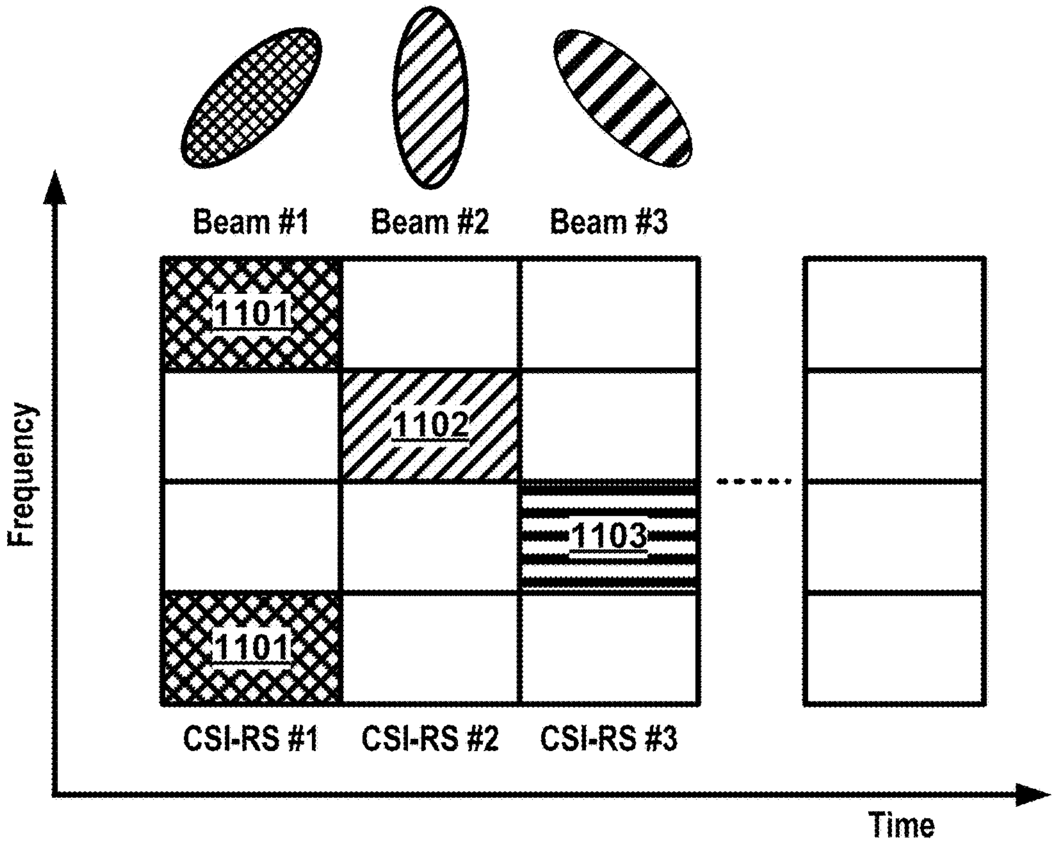
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a RB within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and RE locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, QCL parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams may be shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure a reference signal received power (RSRP) of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more SRS resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a PMI, a CQI, and/or a RI.

Figure 12A:
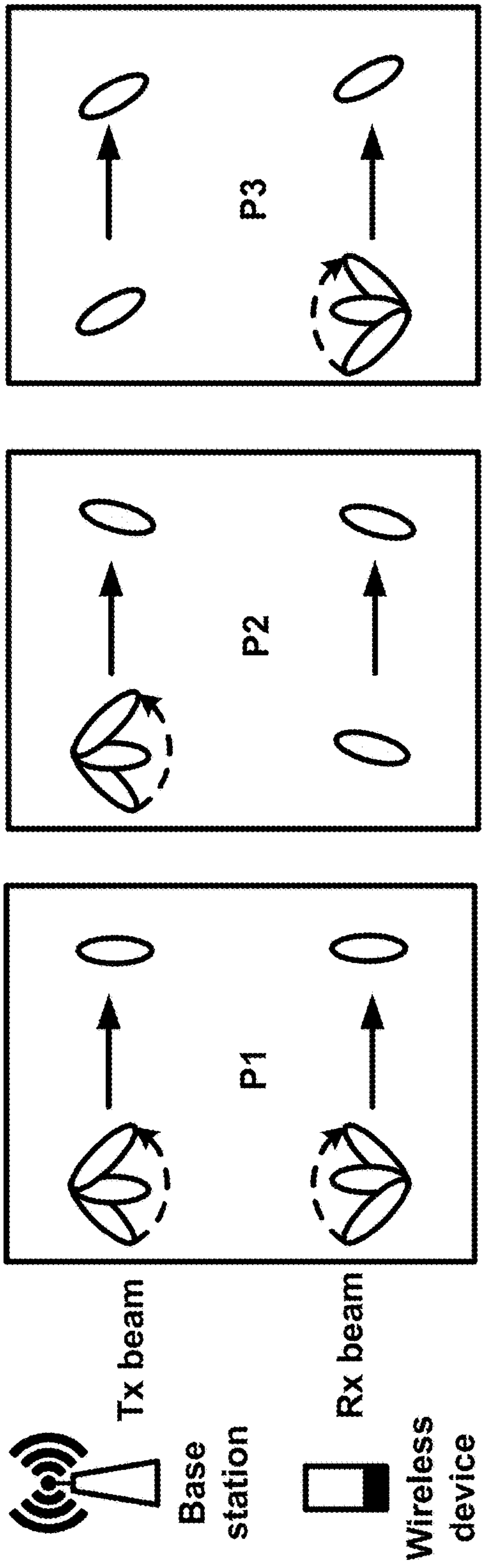
FIG. 12A shows examples of downlink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

Figure 12B:
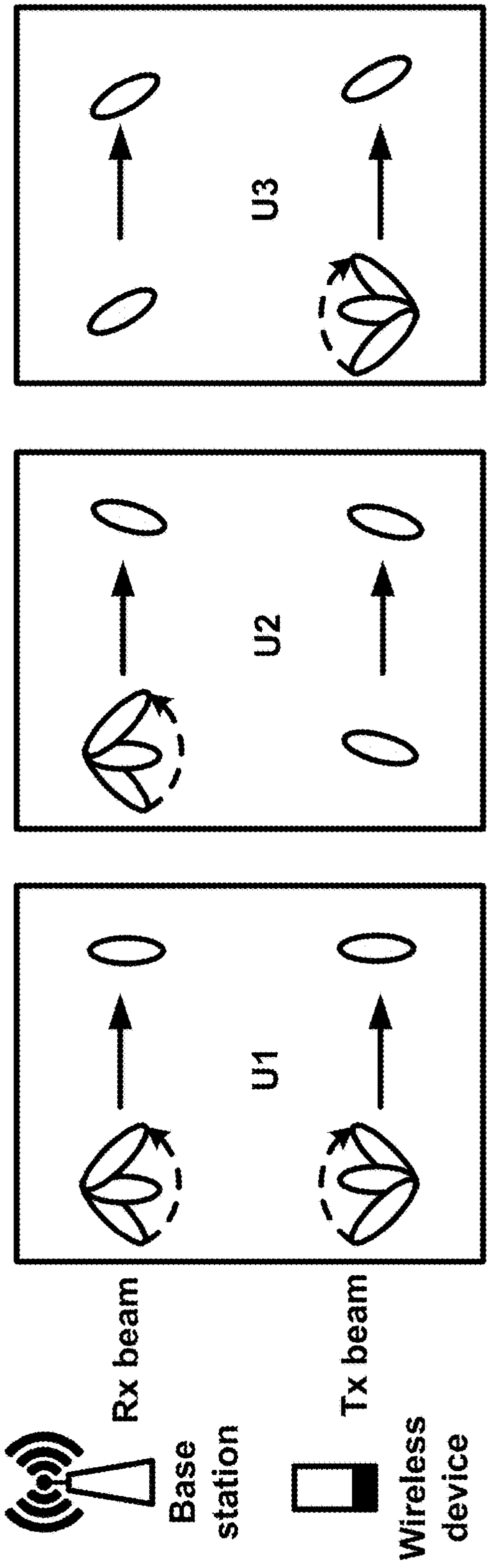
FIG. 12B shows examples of uplink beam management procedures.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the bottom row of U1 and top row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more RSs comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are substantially the same or similar as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more SIBs (e.g., or any other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13A:
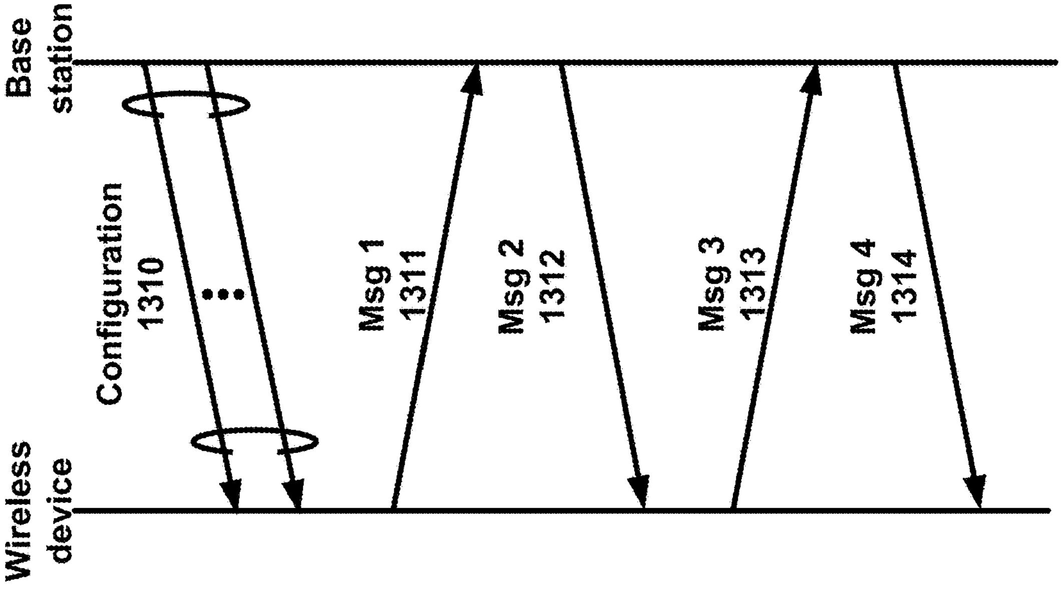
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more RACH parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more PRACH occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate at least one of: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. RNTIs may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$\text{RA-RNTI}=1+s\_id+14\times t\_id+14\times 80\times f\_id+14\times 80\times 8\times ul\_carrier\_id,$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless device on the PDCCH (e.g., the base station may send the PDCCH to the wireless device) using a C-RNTI, for example, if the C-RNTI was included in the third message (e.g., Msg 3 1313). The random access procedure may be determined to be successfully completed, for example, if the unique C-RNTI of the wireless device is detected on the PDCCH (e.g., the PDCCH is scrambled by the C-RNTI). The fourth message (e.g., Msg 4 1314) may be received using a DL-SCH associated with a TC-RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., for the first message (e.g., Msg 1 1311) and/or the third message (e.g., Msg 3 1313)). The wireless device may determine and/or switch an uplink carrier for the first message (e.g., Msg 1 1311) and/or the third message (e.g., Msg 3 1313), for example, based on a channel clear assessment (e.g., a listen-before-talk).

Figure 13B:
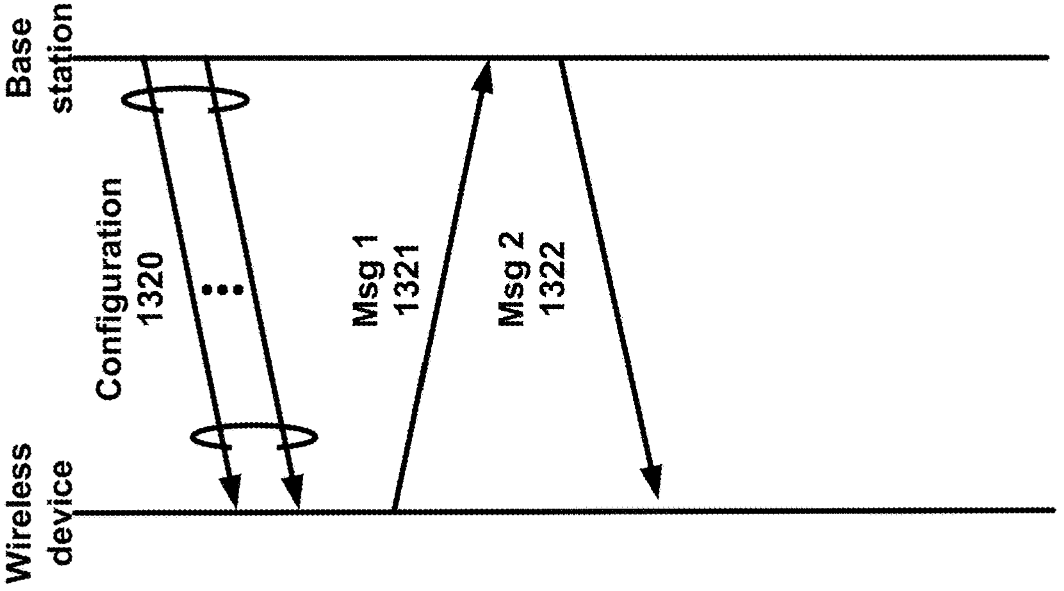
FIG. 13B shows an example two-step random access procedure.

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

Figure 13C:
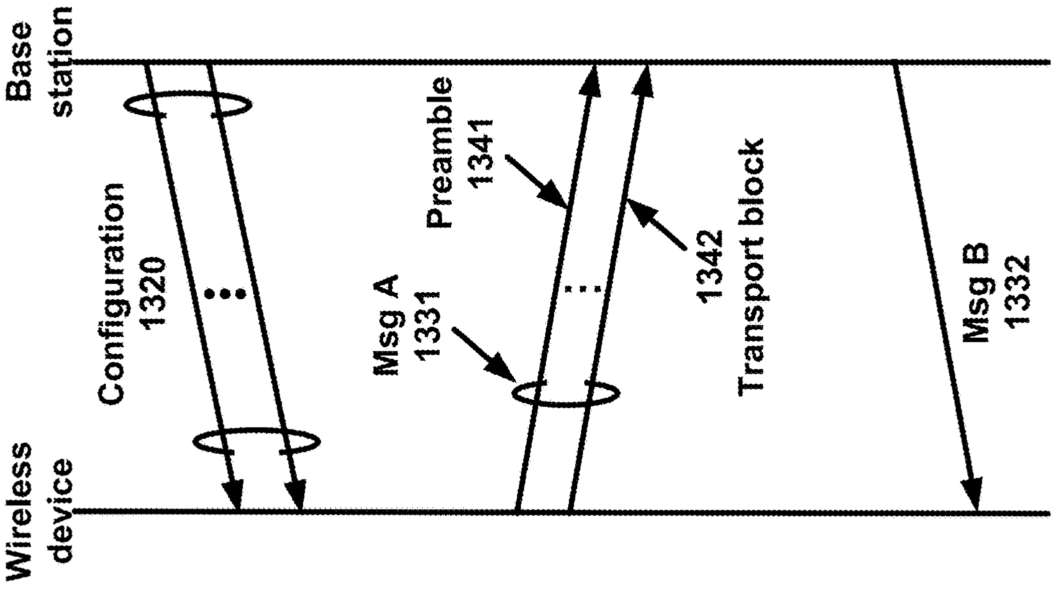
FIG. 13C shows an example two-step random access procedure.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

The first message (e.g., Msg A 1331) may be sent/transmitted in an uplink transmission by the wireless device. The first message (e.g., Msg A 1331) may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as DCI. The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as “FFFE” in hexadecimal. DCI having CRC parity bits scrambled with a system information RNTI (SI-RNTI) may indicate a broadcast transmission of the system information. The SI-RNTI may be predefined as “FFFF” in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 22 may be used for transmission of a transmit power control (TPC) command for PUCCH or PUSCH. DCI format 2_3 may be used for transmission of a group of TPC commands for SRS transmissions by one or more wireless devices. DCI format (s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
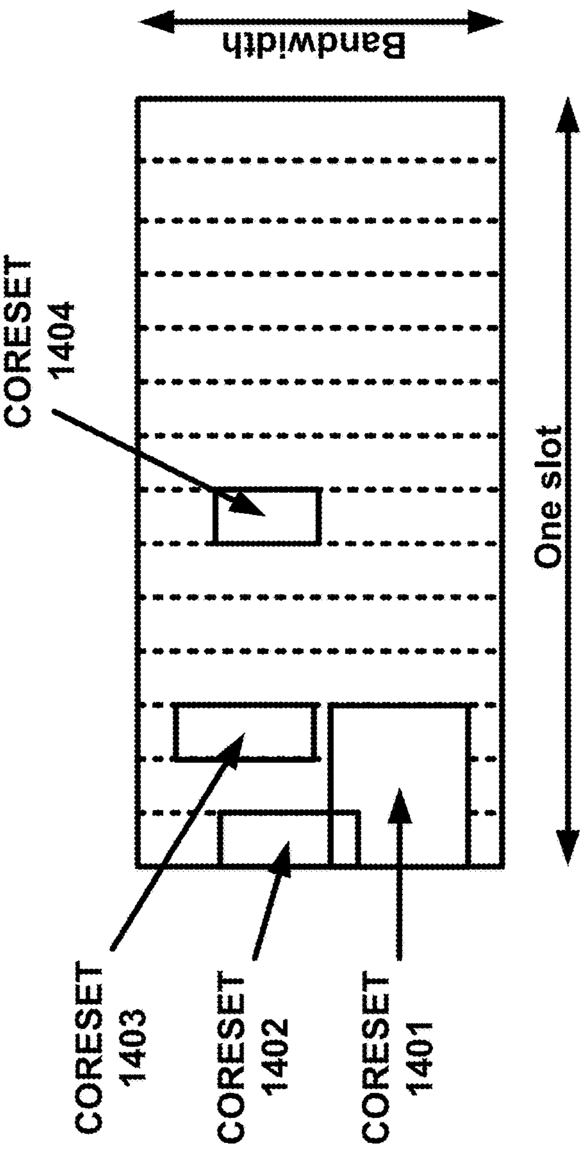
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more CORESETs. A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
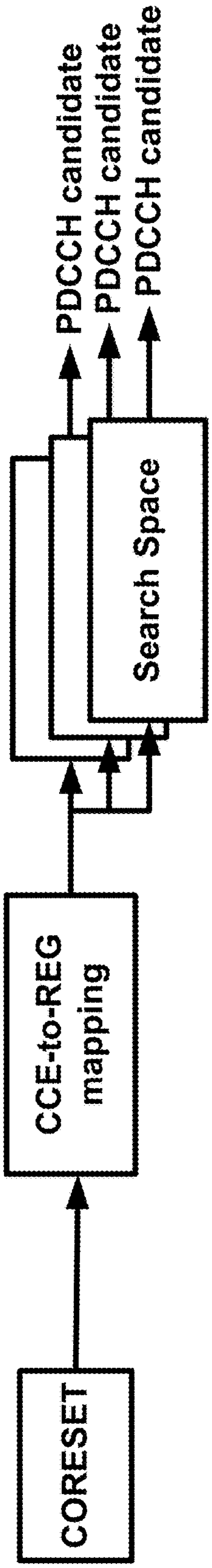
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a quantity/number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the quantity/number of CCEs, the quantity/number of PDCCH candidates in common search spaces, and/or the quantity/number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise SR. The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a quantity/number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a quantity/number of OFDM symbols (e.g., between four and fourteen OFDM symbols) and may comprise two or fewer bits. The wireless device may use PUCCH format 1, for example, if the transmission is over/via four or more symbols and the quantity/number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a quantity/number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a quantity/number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a quantity/number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from a PUCCH resource set for UCI (HARQ-ACK, CSI, and/or SR) transmission, for example, after determining the PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
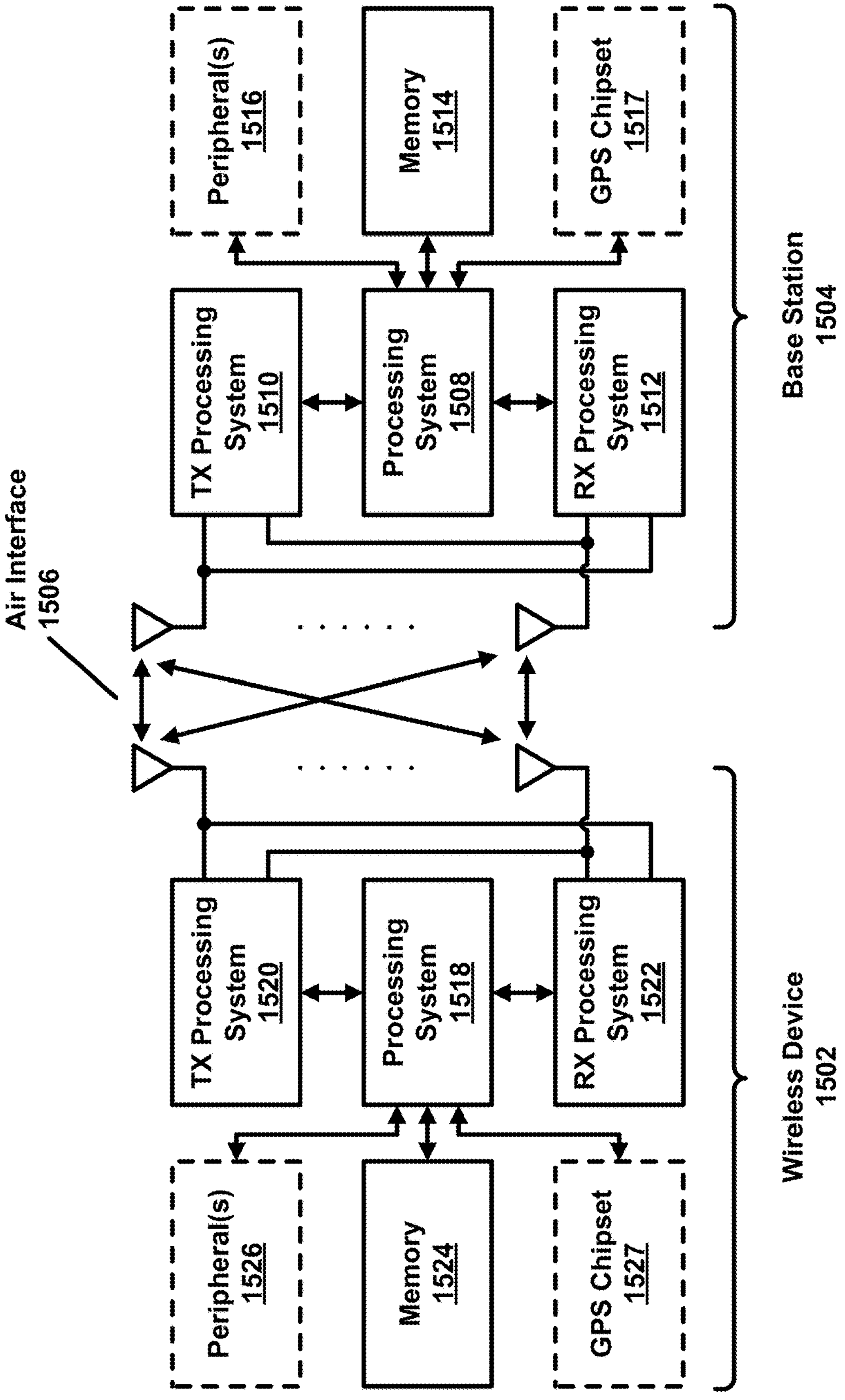
FIG. 15A shows an example of communications between a wireless device and a base station.

FIG. 15A shows an example of communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
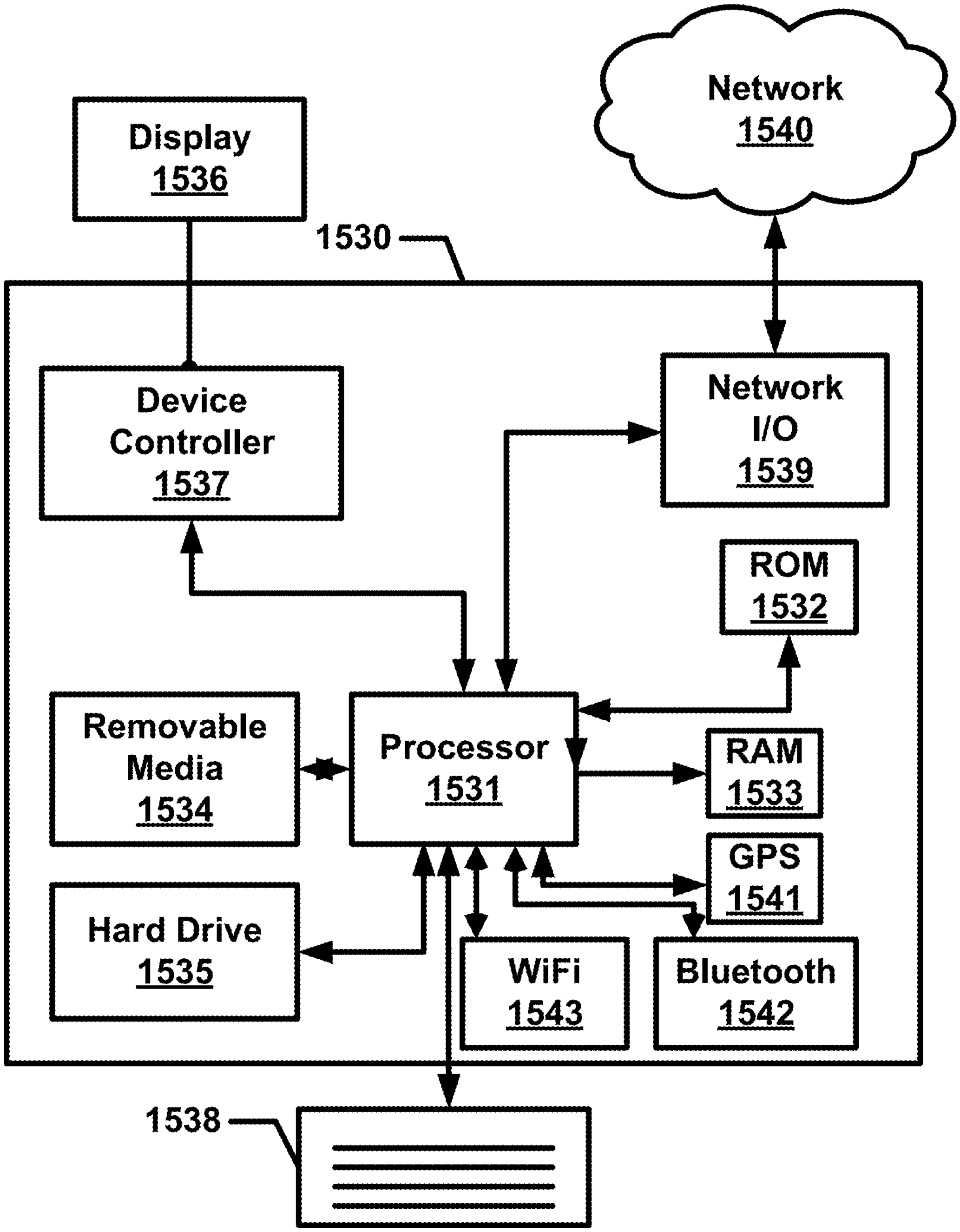
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a USB drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a GPS microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figure 16A:
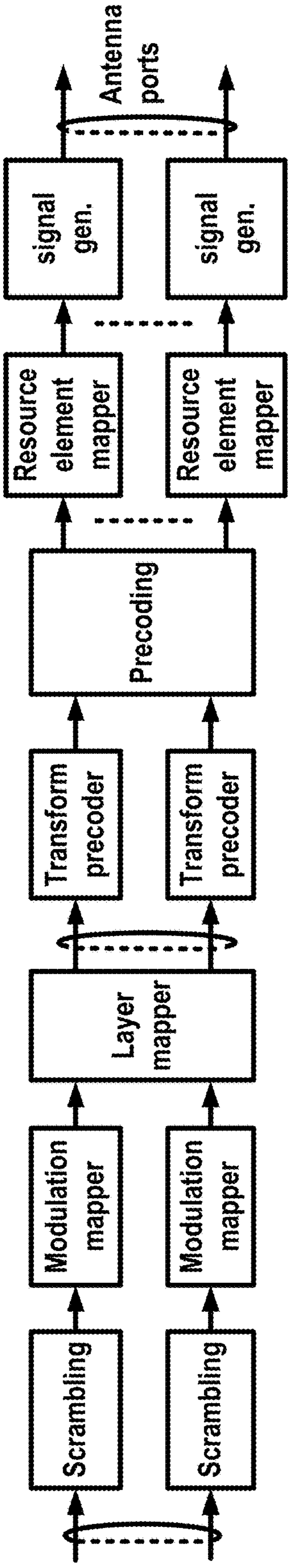
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

Figure 16B:
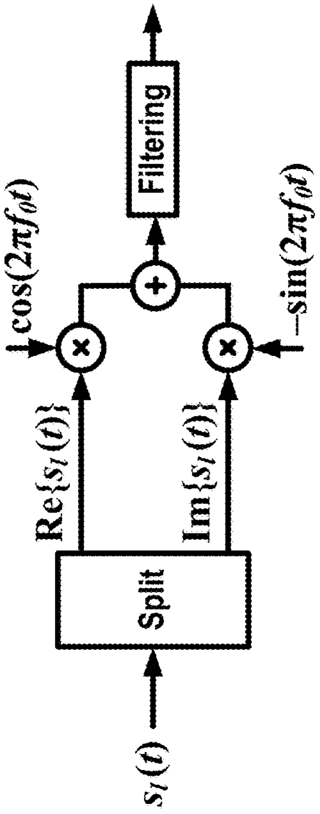

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

Figure 16D:
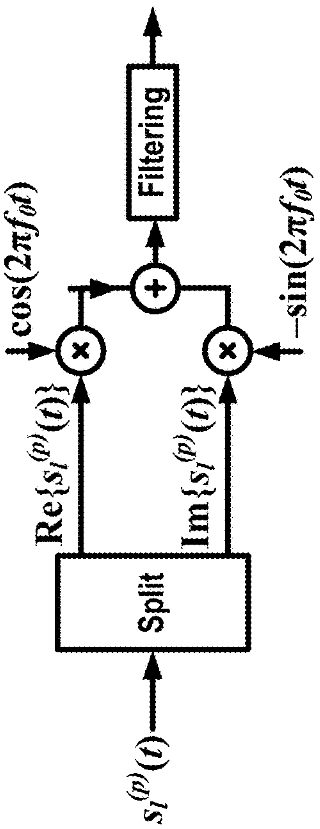
Figure 16C:
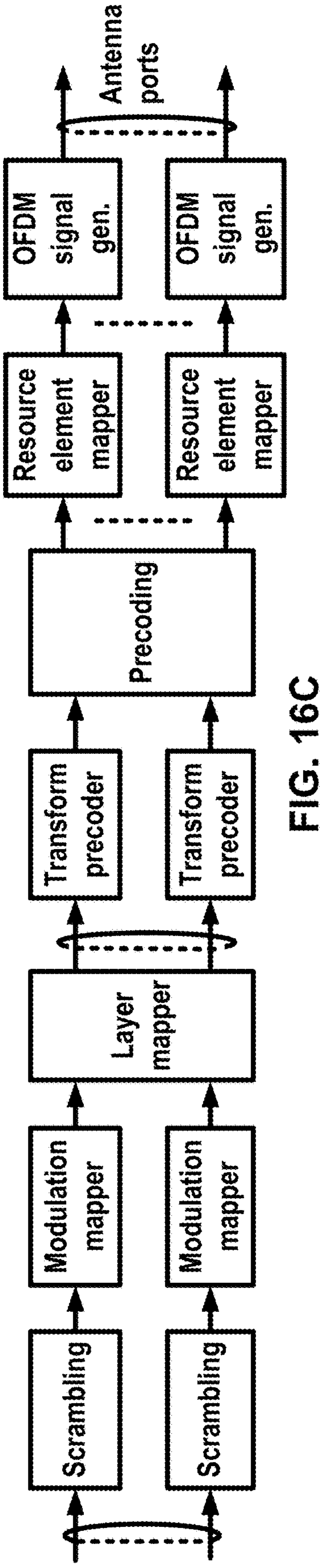

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Figure 17:
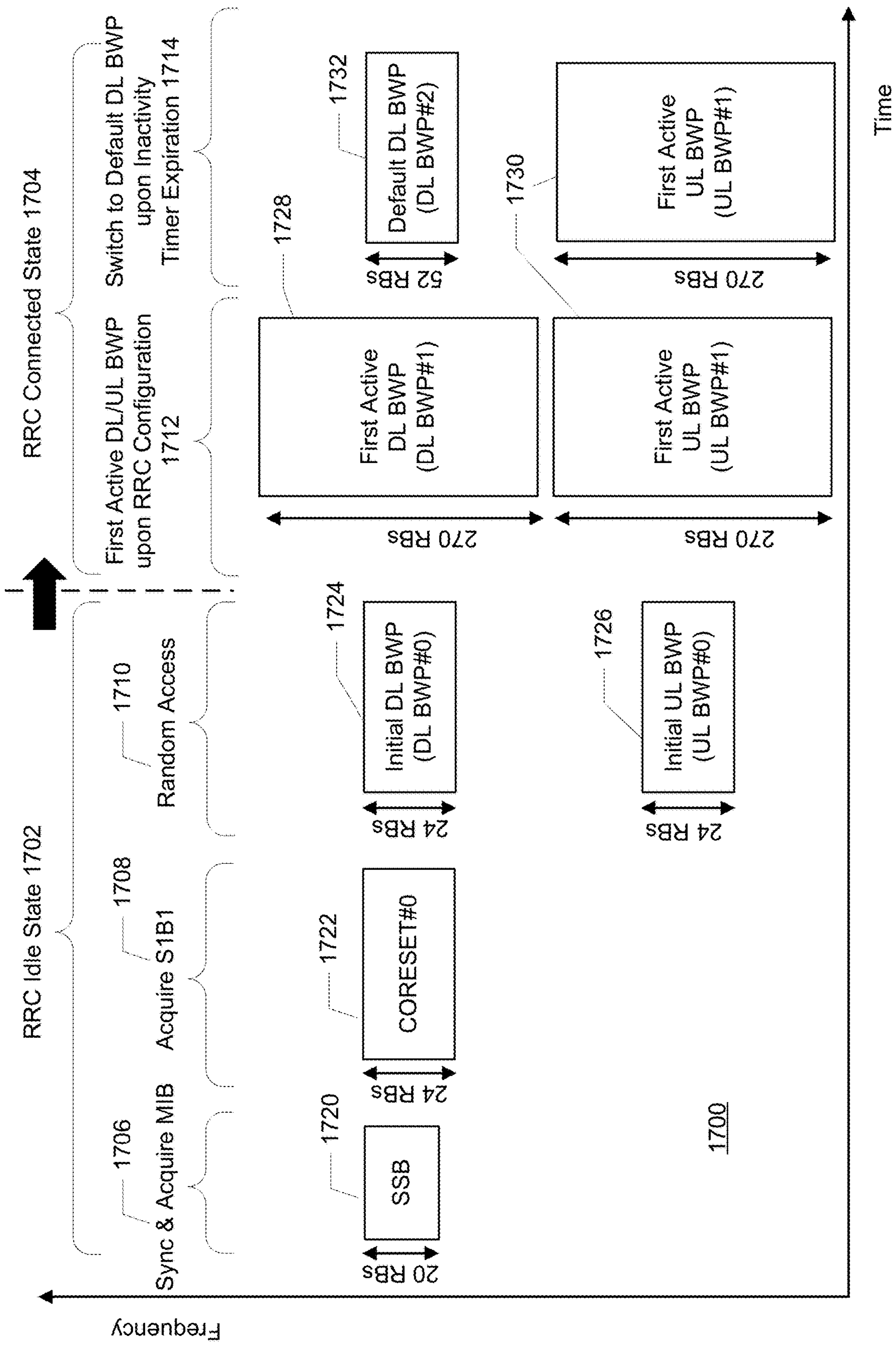
FIG. 17 is a diagram showing a wireless device performing an example initial access procedure.

FIG. 17 is a diagram 1700 showing a wireless device (e.g., wireless device 106 of FIG. 1A or UE 156 of FIG. 1B) performing an example initial access procedure to transition from an RRC idle state 1702 (e.g., RRC IDLE 606 of FIG. 6) to an RRC connected state 1704 (e.g., RRC CONNECTED 602 of FIG. 6) in which an RRC connection is established between the wireless device and a base station, e.g., with a serving cell (e.g., a primary cell (PCell)) of the base station.

In an example, as part of the initial access procedure, the wireless device may perform downlink synchronization 1706 to receive, from the base station, PBCH based on SSB 1720 (e.g., as described in FIG. 11A and as will be further described below). The wireless device may receive, via the PBCH, a Master Information Block (MIB) that indicates (e.g., configures) a CORESET #0 1722 (e.g., CORESET with index #0) of an initial DL BWP 1724 (e.g., with index #0 shown as DL BWP #0), from which the wireless device may receive (e.g., acquire) SIB1 1708. In an example, the SIB1 1708 may configure (e.g., indicate configuration parameters of) initial DL BWP 1724 and/or initial UL BWP 1726 (e.g., with index #0 shown as UL BWP #0), on which the wireless device performs random access 1710 (e.g., as described in FIG. 13A, FIG. 13B, and/or FIG. 13C) to establish the RRC connection with the serving cell of the base station, after which the wireless device enters an RRC connected state 1704. For example, the wireless device may use the initial DL/UL BWP configurations in SIB1 to perform random access 1710 to request the setup of the RRC connection. The base station may configure the frequency domain location and bandwidth of initial DL BWP 1724 in the SIB1 so that initial DL BWP 1724 contains the CORESET #0 1722 in the frequency domain.

Although diagram 1700 shows an example of SSB being monitored/received to perform initial access in which the wireless device may start in an RRC idle state 1702, SSB 1720 may be used by the wireless device for other purposes. In an example, the base station may transmit one or more SSBs (such as SSB 1720) periodically to the wireless device or to a plurality of wireless devices. The wireless device (which may be in RRC idle state, RRC inactive state, or RRC connected state) may use the one or more SSBs for time and frequency synchronization with a cell (e.g., a serving cell such as a PCell or a PSCell) of the base station. As described with respect to FIG. 11A, an SSB includes a primary synchronization signal (PSS), a secondary synchronization signal (SSS), a physical broadcast channel (PBCH), and/or a PBCH DM-RS. An SSB may occupy a number (e.g., 4) of OFDM symbols as shown in FIG. 11A. The base station may transmit one or more SSBs in a SSB burst, e.g., to enable beam-sweeping for PSS/SSS and PBCH. An SSB burst includes a set of SSBs with each SSB potentially being transmitted on a different beam. SSBs in the SSB burst may be transmitted in time-division multiplexing fashion. In an example, an SSB burst may be confined to a 5 ms window and is either located in the first-half or in the second-half of a 10 ms radio frame. An SSB burst may be equivalently referred to as a transmission window (e.g., 5 ms) in which the set of SSBs are transmitted.

Figure 25:
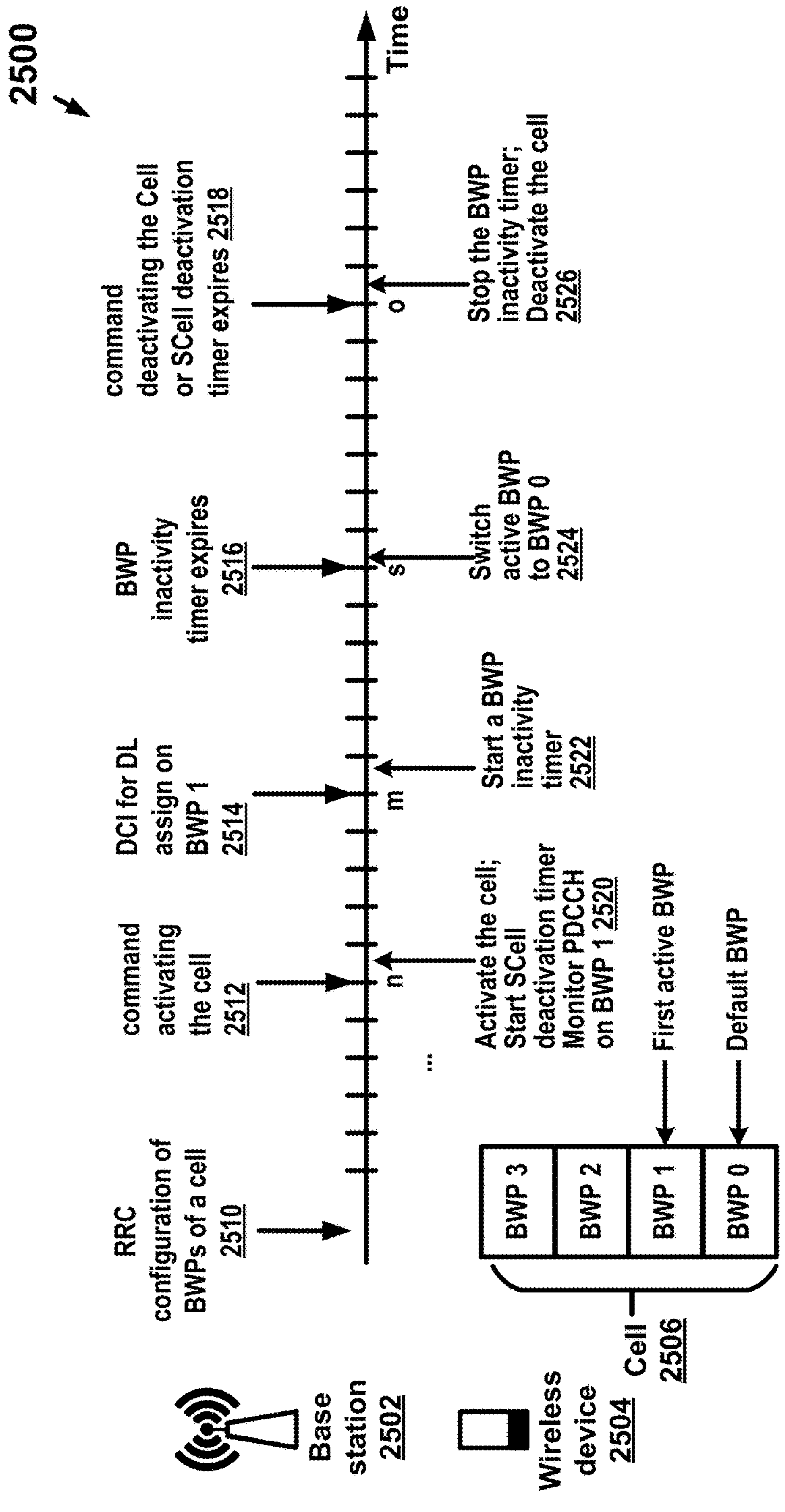
FIG. 25 is a diagram showing an example of BWP switching on a cell.

The base station may indicate a transmission periodicity of SSB via an RRC message (e.g., ssb-PeriodicityServingCell in ServingCellConfigCommonSIB of SIB1 message, as shown in FIG. 25). For example, a candidate value of the transmission periodicity may be in a range of {5 ms, 10 ms, 20 ms, 40 ms, 80 ms, 160 ms}. The maximum number of candidate SSBs ($L_{max}$) within an SSB burst depends upon a carrier frequency/band of the (serving) cell. In an example, $L_{max}$=4 if $f_c$<=3 GHz, where $f_c$ is the carrier frequency of the cell. $L_{max}$=8 if 3 GHz<$f_c$<=6 GHz. $L_{max}$=64 if $f_c$>=6 GHz, etc.

FIG. 18 is a table 1800 showing an example for determination of a starting OFDM symbol index. A starting OFDM symbol index of a candidate SSB (occupying 4 OFDM symbols) within a SSB burst (5 ms) may depend on a subcarrier spacing (SCS) and a carrier frequency band of the cell. For example, table 1800 shows that starting OFDM symbol indexes of SSBs in a SSB burst, for a cell configured with 15 kHz and carrier frequency fc<3 GHz ($L_{max}$=4), are 2, 8, 16, and 22. OFDM symbols in a half-frame are indexed with the first symbol of the first slot being indexed as 0. Starting OFDM symbol indexes of SSBs in a SSB burst, for a cell configured with 15 kHz and carrier frequency 3 GHz<fc<6 GHz ($L_{max}$=8), are 2, 8, 16, 22, 30, 36, 44 and 50, etc. In an example, when the base station is not transmitting the SSBs with beam forming, the base station may transmit only one SSB by using the first SSB starting position.

Figure 19:
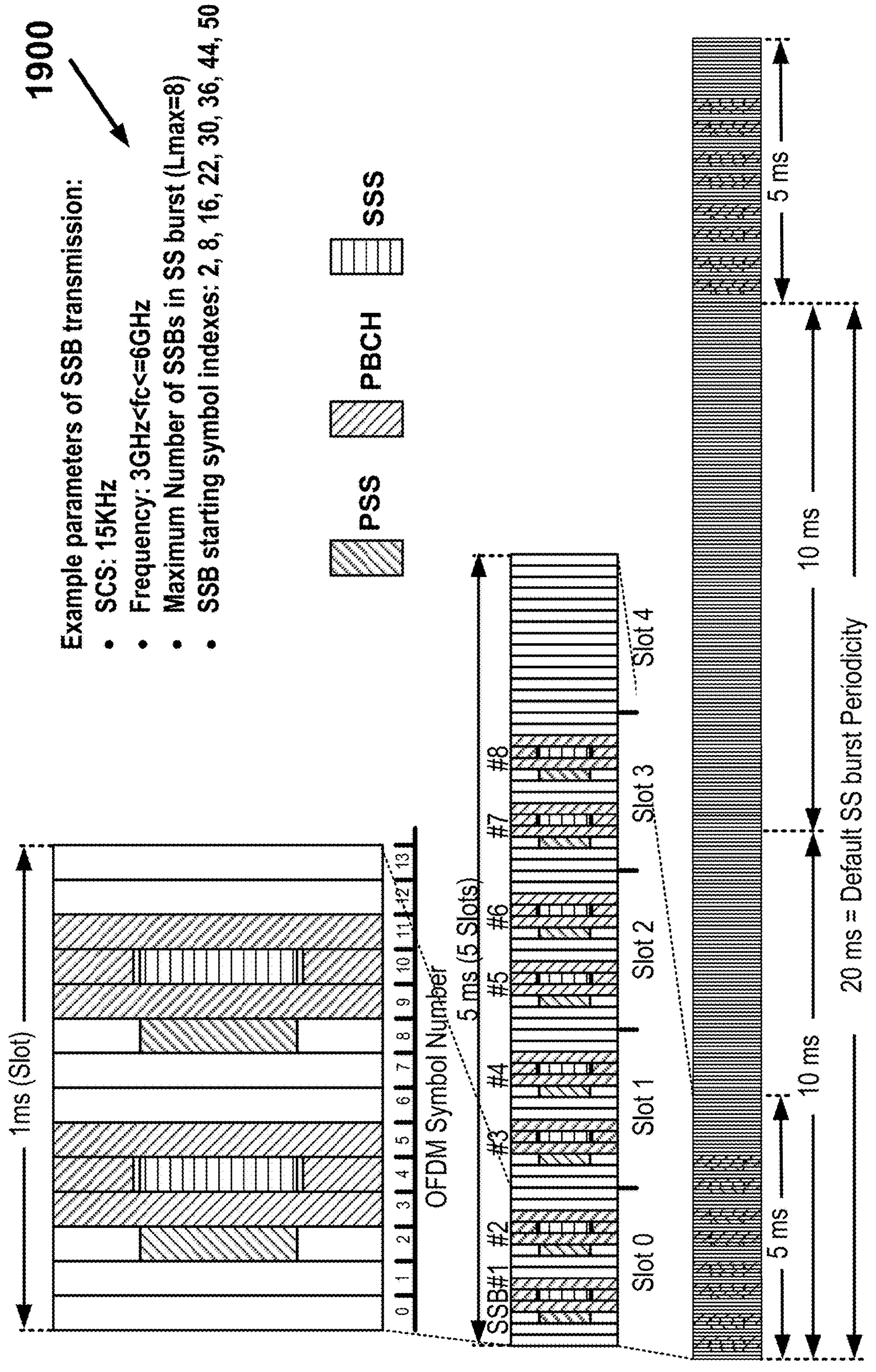
FIG. 19 is a diagram showing example synchronization signal block (SSB) transmissions of a cell, according to some embodiments.
Figure 35:
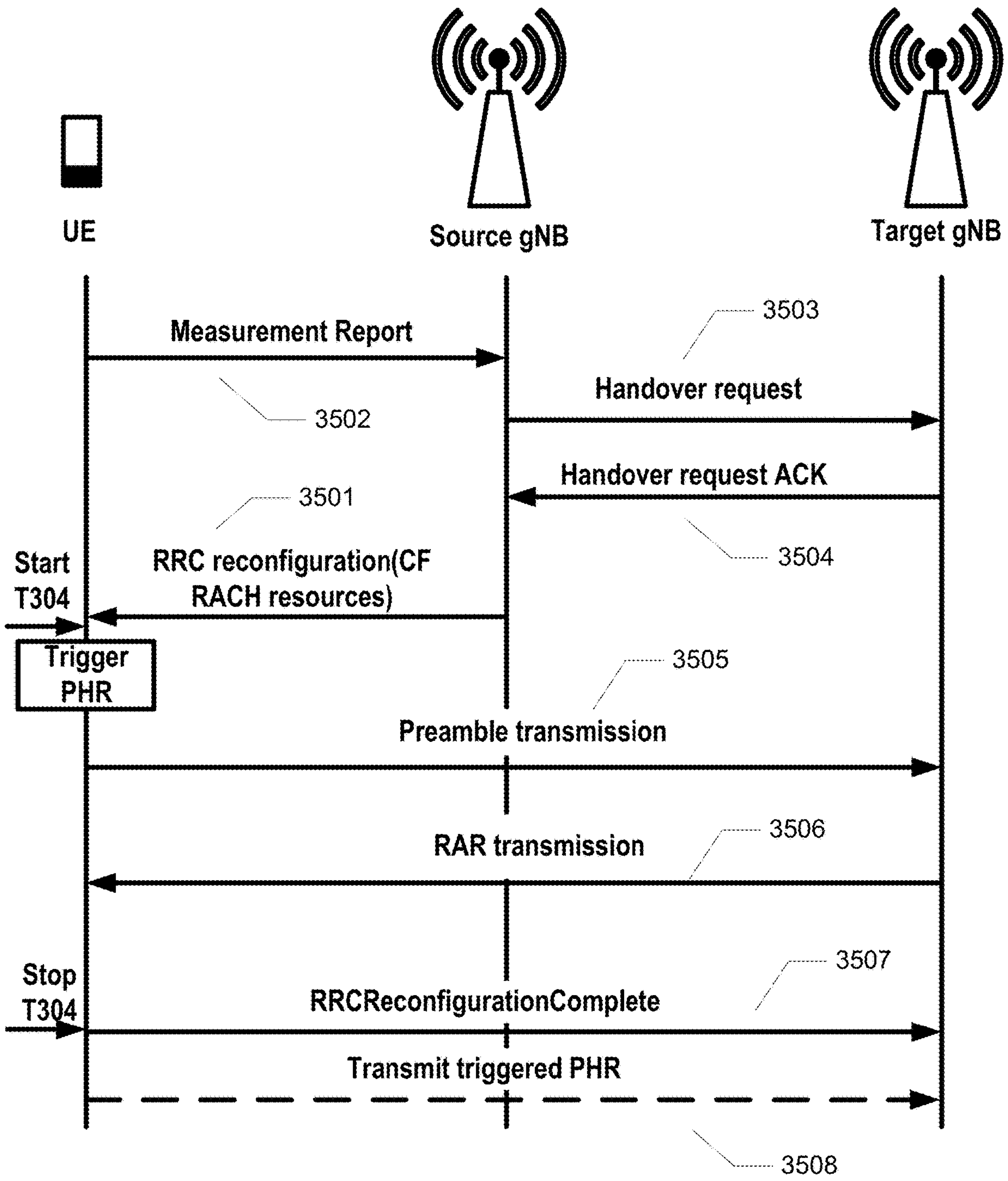
FIG. 35 is a diagram showing an example handover (HO) procedure.

FIG. 19 is a diagram 1900 showing example SSB transmissions of a cell by a base station in greater detail. For example, these SSB transmissions may correspond SSB 1720 of FIG. 17 and/or SSB transmission generally described with respect to FIG. 11A. As shown in the example diagram 1900, the SSB transmissions may be associated with (e.g., configured with) a SCS of the cell being 15 kHz, the cell being configured with 3 GHz<fc<=6 GHz, and the maximum number of candidate SSBs in a SSB burst being 8 (Lmax=8). Based on the example of table 1800 of FIG. 18 showing this specific set of configurations, the SSB starting symbol indexes may be determined to be 2, 8, 16, 22, 30, 36, 44, and 50. Therefore, as shown in diagram 1900, SSB #1 starts at symbol #2 of 70 symbols in 5 ms, SSB #2 starts at symbol #8, SSB #3 starts at symbol #16, SSB #4 starts at symbol #22, SSB #5 starts at symbol #30, SSB #6 starts at symbol #36, SSB #7 starts at symbol #44, and SSB #8 starts at symbol 50. As illustrated, the SSB burst is transmitted in the first half (not the second half as shown in FIG. 35) of a 10 ms radio frame.

The SSB burst (also for each SSB of the SSB burst) may be transmitted in a periodicity. In the example of FIG. 19, a default periodicity of a SSB burst is 20 ms, e.g., before a wireless device receives a SIB1 message for initial access of the cell. The base station, with 20 ms transmission periodicity of SSB (or SSB burst), may transmit the SSB burst in the first 5 ms of each 20 ms. In this example, the base station does not transmit the SSB burst in the rest 15 ms of the each 20 ms.

A base station may transmit one or more RRC messages (e.g., SIB1) indicating cell specific configuration parameters of SSB transmission. The cell specific configuration parameters may include a value for a transmission periodicity (ssb-PeriodicityServingCell) of a SSB burst, locations of a number of SSBs (e.g., active SSBs), of a plurality of candidate SSBs, comprised in the SSB burst. The plurality of candidate SSBs may be implemented based on example embodiments described above with respect to FIG. 18. The cell specific configuration parameters may include position indication of a SSB in a SSB burst (e.g., ssb-PositionsInBurst). The position indication may include a first bitmap (e.g., groupPresence) and a second bitmap (e.g., inOneGroup) indicating locations of a number of SSBs comprised in a SSB burst.

Figure 20:
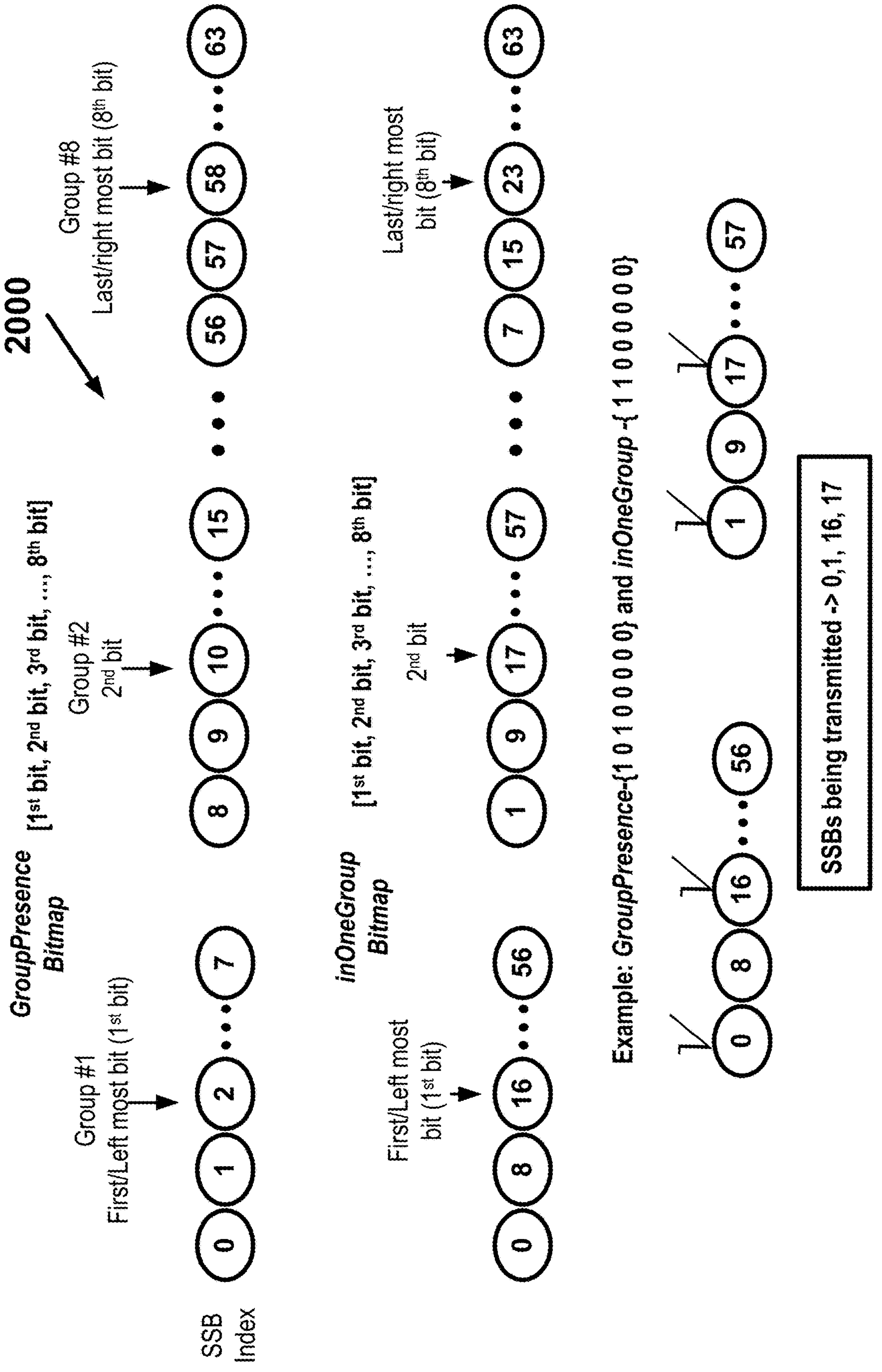
FIG. 20 is a diagram showing example SSB location indication in a SSB burst.

FIG. 20 is an example diagram 2000 showing an example embodiment of SSB location indication in a SSB burst. In diagram 2000, a maximum number of candidate SSBs in an SSB burst is 64. The candidate SSBs may comprise SSBs with indexes from 0 to 63. A first bitmap (groupPresence) (configured by SIB1 message) may comprise a number of bits (e.g., 8), each bit corresponding to a respective group of SSB groups of a plurality of SSBs (which may be the maximum number of candidate SSBs) in a SSB burst. In the example of FIG. 20, a first bit (e.g., left most bit of the first bitmap) may correspond to a first SSB group comprising 1st SSB (with SSB index 0), $2^{nd}$ SSB (with SSB index 1), . . . and $8^{th}$ SSB (with SSB index 7). A second bit (e.g., the second bit of the first bitmap) may correspond to a second SSB group comprising $9^{th}$ SSB (with SSB index 8), $10^{th}$ SSB (with SSB index 9), . . . and 16th SSB (with SSB index 15). A last bit (e.g., right most bit of the first bitmap) may correspond to an $8^{th}$ SSB group comprising $57^{th}$ SSB (with SSB index 56), $58^{th}$ SSB (with SSB index 57, . . . and $64^{th}$ SSB (with SSB index 63), etc. As illustrated, a SSB may belong to at most one SSB group of the first SSB groups. A bit, of the first bitmap, may indicate whether the base station transmits a SSB group, corresponding to the bit, in a SSB burst. For example, the bit setting to a first value (e.g., 1) may indicate that the corresponding SSB group is transmitted in the SSB burst by the base station, and the bit setting to a second value (e.g., 0) may indicate that the corresponding SSB group is not transmitted in the SSB burst by the base station, or vice versa.

As shown in FIG. 20, a second bitmap (inOneGroup) (configured by SIB1 message) may comprise a number of bits (e.g., 8), each bit corresponding to a respective group of SSB groups of the plurality of SSBs in a SSB burst. In the example of FIG. 20, a first bit (e.g., left most bit of the second bitmap) may correspond to a 1st SSB group comprising 1st SSB (with SSB index 0), $2^{nd}$ SSB (with SSB index 8), . . . and $8^{th}$ SSB (with SSB index 56). A second bit (e.g., the second bit of the second bitmap) may correspond to a second SSB group comprising 1st SSB (with SSB index 1), $2^{nd}$ SSB (with SSB index 9), . . . and $8^{th}$ SSB (with SSB index 57). A last bit (e.g., right most bit of the second bitmap) may correspond to an $8^{th}$ SSB group comprising $1^{st}$ SSB (with SSB index 7), $2^{nd}$ SSB (with SSB index 15, . . . and $8^{th}$ SSB (with SSB index 63), etc. As illustrated, a SSB may belong to at most one SSB group of the second SSB groups. A bit, of the second bitmap, may indicate whether the base station transmit a SSB group, corresponding to the bit, in a SSB burst. The bit setting to a first value (e.g., 1) may indicate that the corresponding SSB group is transmitted in the SSB burst by the base station, and the bit setting to a second value (e.g., 0) may indicate that the corresponding SSB group is not transmitted in the SSB burst by the base station, or vice versa.

As shown in diagram 2000, the plurality of SSBs (e.g., with SSB index from 0 to 63) may be grouped, for the first bitmap, into first SSB groups, each SSB comprising SSBs with continuous SSB indexes. A first SSB group of the first SSB groups comprises SSBs with SSB indexes from 0 to 7, a second SSB group comprises SSB indexes from 8 to 15, etc. The plurality of SSBs may be also grouped, for the second bitmap, into second SSB groups, each SSB comprising SSBs with discontinuous SSB indexes. A first SSB group of the second SSB groups comprises SSBs with SSB indexes {0, 8, 16, . . . 56}, SSB index gap between two neighbor SSB indexes being 8. A second SSB group of the second SSB groups comprises SSBs with SSB indexes {1, 9, 17, . . . 57}, etc.

If fc≤3 GHz, a maximum number of SSBs within SS burst may equal to four, and a wireless device may determine that the four leftmost bits of a bitmap (e.g., the first bitmap and/or the second bitmap) are valid. The wireless device may ignore the 4 rightmost bits of the first bitmap and/or the second bitmap.

In the example diagram 2000, the first bitmap may be indicated, by the base station, as {1 0 1 0 0 0 0 0} and the second bitmap may be indicated as {1 1 0 0 0 0 0}. Based on the grouping configuration of the first SSB groups and the second SSB groups, the base station may transmit SSBs with indexes {0 1 16 17} in a SSB burst.

As described above with respect to FIG. 17 (and FIG. 11A), a base station may transmit a Master Information Block (MIB) on PBCH of SSB 1720, to indicate configuration parameters (e.g., for CORESET #0 1722) for a wireless device monitoring PDCCH for receiving a SIB1 message 1708. The base station may transmit a MIB message with a transmission periodicity of 80 millisecond (ms). The same MIB message may be repeated (according to SSB periodicity) within the 80 ms. Contents of a MIB message are the same over the 80 ms period. The same MIB is transmitted over all SSBs within a SS burst. The PBCH may indicate that there is no associated SIB1, in which case a wireless device may be directed to (e.g., configured to search) another frequency from where to search for an SSB that is associated with a SIB1, as well as a frequency range where the wireless device may assume no SSB associated with SIB1 is present. The indicated frequency range may be confined within a contiguous spectrum allocation of the same operator in which SSB is detected.

In an example, a base station may transmit a SIB1 message (e.g., SIB1 1708) with a periodicity of 160 ms. The base station may transmit the same SIB1 message with variable transmission repetition periodicity within the 160 ms period. A default transmission repetition periodicity of SIB1 may be 20 ms. The base station may determine an actual transmission repetition periodicity based on network implementation. In an example, for SSB and CORESET multiplexing pattern 1, SIB1 repetition transmission period is 20 ms. For SSB and CORESET multiplexing patterns 2 or 3, SIB1 transmission repetition period is the same as the SSB period. SIB1 may include information regarding the availability and scheduling (e.g., mapping of SIBs to SI message, periodicity, SI-window size) of other SIBs, an indication whether one or more SIBs are only provided on-demand and in which case, configuration parameters needed by a wireless device to perform an SI request.

FIG. 21A shows example configuration parameters 2100A of a master information block (MIB) of a cell (e.g., PCell). The wireless device, based on receiving primary synchronization signal (PSS) and/or secondary synchronization signal (SSS) as described with respect to FIG. 11A, FIG. 17, and FIG. 19, may receive a MIB via a PBCH. The configuration parameters 2100A of a MIB may comprise a system frame number (SFN) which may have six bits (systemFrameNumber), a subcarrier spacing indication (subCarrierSpacingCommon), a frequency domain offset (ssb-SubcarrierOffset) between SSB and overall resource block grid in number of subcarriers, an indication (cellBarred) of whether the cell is bared, a DMRS position indication (dmrs-TypeA-Position) of a position of DMRS, parameters of CORESET and SS of a PDCCH (pdcch-ConfigSIB1) comprising a common CORESET, a common search space, and necessary PDCCH parameters, etc.

A pdcch-ConfigSIB1 configuration parameter(s) may include a first parameter (e.g., controlResourceSetZero) indicating a common ControlResourceSet (CORESET) with ID #0 (e.g., CORESET #0 1722 of FIG. 17) of an initial BWP of the cell (e.g., initial DL BWP 1724 of FIG. 17). controlResourceSetZero may be an integer between 0 and 15. Each integer between 0 and 15 may identify a configuration of CORESET #0.

FIG. 21B shows an example of a configuration 2100B of CORESET #0 (e.g., CORESET #0 1722 of FIG. 17). As shown in FIG. 21B, based on a value of the integer of controlResourceSetZero (shown in the “Index” column), a wireless device may determine a SSB and CORESET #0 multiplexing pattern, a number of RBs for CORESET #0, a number of symbols for CORESET #0, and/or an RB offset for CORESET #0.

FIG. 21C shows an example of a configuration 2100C of SS #0. As shown in FIG. 21C, based on a value of the integer of searchSpaceZero (shown in the “Index” column), a wireless device may determine one or more parameters (e.g., 0, M) for slot determination of PDCCH monitoring, a first symbol index for PDCCH monitoring, and/or a number of search spaces per slot. A pdcch-ConfigSIB1 may include a second parameter (e.g., searchSpaceZero) indicating a common search space with ID #0 (e.g., SS #0) of the initial BWP of the cell. searchSpaceZero may be an integer between 0 and 15. Each integer between 0 and 15 may identify a configuration of SS #0.

Based on receiving a MIB (e.g., based on synchronization 1706 in FIG. 17), a wireless device may monitor PDCCH via SS #0 of CORESET #0 (e.g., CORESET #0 1722) for receiving a DCI scheduling a system information block 1 (SIB1) (e.g., SIB1 1708 of FIG. 17). The wireless device may receive the DCI with CRC scrambled with a system information radio network temporary identifier (SI-RNTI) dedicated for receiving the SIB1.

FIG. 22 shows example RRC configuration parameters 2200 of system information block (SIB) (e.g., SIB 1708 of FIG. 17). A SIB (e.g., SIB1) may be transmitted via broadcast to (all) wireless devices within range of the base station (or a primary cell of the base station). The SIB may include information relevant when evaluating if a wireless device is allowed to access a cell, information of paging configuration, and/or scheduling configuration of other system information. A SIB may include radio resource configuration information that is common for (all) wireless devices within range of the broadcast and barring information applied to a unified access control. A base station may transmit to a wireless device (or a plurality of wireless devices) one or more SIB information. As shown in FIG. 22, parameters of the one or more SIB information may include: one or more parameters (e.g., cellSelectionInfo) for cell selection related to a serving cell (e.g., a SpCell such as a PCell), one or more configuration parameters of a serving cell (e.g., in ServingCellConfigCommonSIB IE), and one or more other parameters. The ServingCellConfigCommonSIB IE may include at least one of: common downlink parameters (e.g., in DownlinkConfigCommonSIB IE) of the serving cell, common uplink parameters (e.g., in UplinkConfigCommonSIB IE) of the serving cell, and other parameters.

A DownlinkConfigCommonSIB IE may comprise parameters of an initial downlink BWP (initialDownlinkBWP IE) of the serving cell (e.g., SpCell). The parameters of the initial downlink BWP (e.g., initial DL BWP 1724) may be comprised in a BWP-DownlinkCommon IE (as shown in diagram 2300 of FIG. 23). The BWP-DownlinkCommon IE may be used to configure common parameters of a downlink BWP of the serving cell. The base station may configure the locationAndBandwidth so that the initial downlink BWP contains the entire CORESET #0 of this serving cell in the frequency domain. The wireless device may apply the locationAndBandwidth upon reception of this field (e.g., to determine the frequency position of signals described in relation to this locationAndBandwidth) but it keeps CORESET #0 until after reception of an RRC message such as one of RRCSetup/RRCResume/RRCReestablishment.

The DownlinkConfigCommonSIB IE may include parameters of a paging channel configuration. The parameters may include a paging cycle value (T, by defaultPagingCycle IE), a parameter (nAndPagingFrameOffset IE) indicating total number N) of paging frames (PFs) and paging frame offset (PF_offset) in a paging DRX cycle, a number (Ns) for total paging occasions (POs) per PF, a first PDCCH monitoring occasion indication parameter (firstPDCCH-MonitoringOccasionofPO IE) indicating a first PDCCH monitoring occasion for paging of each PO of a PF. The wireless device, based on parameters of a PCCH configuration, may monitor PDCCH for receiving paging message.

The parameter first-PDCCH-MonitoringOccasionOfPO may be signaled in SIB1 for paging in initial DL BWP. For paging in a DL BWP other than the initial DL BWP, the parameterfirst-PDCCH-MonitoringOccasionOfPO may be signaled in the corresponding BWP configuration.

FIG. 23 shows an example of RRC configuration parameters 2300 (e.g., BWP-DownlinkCommon IE) in an initial downlink BWP of a serving cell (e.g., initial DL BWP 1724 of FIG. 17). A base station may transmit to a wireless device (or a plurality of wireless devices) one or more configuration parameters of the initial downlink BWP of the serving cell. As shown in FIG. 23, the one or more configuration parameters of the initial downlink BWP may comprise: one or more generic BWP parameters of the initial downlink BWP, one or more cell specific parameters for PDCCH of the initial downlink BWP (e.g., in pdcch-ConfigCommon IE), one or more cell specific parameters for the PDSCH of this BWP (e.g., in pdsch-ConfigCommon IE), and one or more other parameters. A pdcch-ConfigCommon IE may comprise parameters of COESET #0 (e.g., controlResourceSetZero) which may be used in any common or UE-specific search spaces. A value of the controlResourceSetZero may be interpreted like the corresponding bits in MIB pdcch-ConfigSIB1. A pdcch-ConfigCommon IE may comprise parameters (e.g., in commonControlResourceSet) of an additional common control resource set which may be configured and used for any common or UE-specific search space. If the network configures this field, it uses a ControlResourceSetId other than 0 for this ControlResourceSet. The network configures the commonControlResourceSet in SIB1 so that it is contained in the bandwidth of CORESET #0. A pdcch-ConfigCommon IE may comprise parameters (e.g., in commonSearchSpaceList) of a list of additional common search spaces. Parameters of a search space may be implemented based on example of FIG. 24. A pdcch-ConfigCommon IE may indicate, from a list of search spaces, a search space for paging (e.g., pagingSearchSpace), a search space for random access procedure (e.g., ra-SearchSpace), a search space for SIB1 message (e.g., searchSpaceSIB1), a common search space #0 (e.g., searchSpaceZero), and one or more other search spaces.

As shown in FIG. 23, a control resource set (CORESET) may be associated with a CORESET index (e.g., ControlResourceSetId). A CORESET may be implemented based on example embodiments described above with respect to FIG. 14A and/or FIG. 14B. The CORESET index with a value of 0 may identify a common CORESET (e.g., CORESET #0 1722 of FIG. 17) configured in MIB and in ServingCellConfigCommon (controlResourceSetZero) and may not be used in the ControlResourceSet IE. The CORESET index with other values may identify CORESETs configured by dedicated signaling or in SIB1. The controlResourceSetId is unique among the BWPs of a serving cell. A CORESET may be associated with coresetPoolIndex indicating an index of a CORESET pool for the CORESET. A CORESET may be associated with a time duration parameter (e.g., duration) indicating contiguous time duration of the CORESET in number of symbols. As shown in FIG. 23, configuration parameters of a CORESET may comprise at least one of: frequency resource indication (e.g., frequencyDomainResources), a CCE-REG mapping type indicator (e.g., cce-REG-MappingType), a plurality of TCI states, an indicator indicating whether a TCI is present in a DCI, and the like. The frequency resource indication, comprising a number of bits (e.g., 45 bits), may indicate frequency domain resources, each bit of the indication corresponding to a group of 6 RBs, with grouping starting from the first RB group in a BWP of a cell (e.g., SpCell, SCell). The first (left-most/most significant) bit may correspond to the first RB group in the BWP, and so on. A bit that is set to 1 may indicate that an RB group, corresponding to the bit, belongs to the frequency domain resource of this CORESET. Bits corresponding to a group of RBs not fully contained in the BWP within which the CORESET is configured may be set to zero.

FIG. 24 shows an example of configuration 2400 of a search space (e.g., SearchSpace IE). One or more search space configuration parameters of a search space may comprise at least one of: a search space ID (searchSpaceId), a control resource set ID (controlResourceSetId), a monitoring slot periodicity and offset parameter (monitoringSlotPeriodicityAndOffset), a search space time duration value (duration), a monitoring symbol indication (monitoringSymbolsWithinSlot), a number of candidates for an aggregation level (nrofCandidates), and/or a SS type indicating a common SS type or a UE-specific SS type (searchSpaceType). The monitoring slot periodicity and offset parameter may indicate slots (e.g., in a radio frame) and slot offset (e.g., related to a starting of a radio frame) for PDCCH monitoring. The monitoring symbol indication may indicate on which symbol(s) of a slot a wireless device may monitor PDCCH on the SS. The control resource set ID may identify a control resource set on which a SS may be located.

A wireless device, in RRC_IDLE or RRC_INACTIVE state, may periodically monitor paging occasions (POs) for receiving paging message for the wireless device. Before monitoring the POs, the wireless device, in RRC_IDLE or RRC_INACTIVE state, may wake up at a time before each PO for preparation and/or turn all components in preparation of data reception (warm up). The gap between the waking up and the PO may be long enough to accommodate all the processing requirements. The wireless device may perform, after the warming up, timing acquisition from SSB and coarse synchronization, frequency and time tracking, time and frequency offset compensation, and/or calibration of local oscillator. After that, the wireless device may monitor a PDCCH for a paging DCI in one or more PDCCH monitoring occasions based on configuration parameters of the PCCH configuration configured in SIB1. The configuration parameters of the PCCH configuration may be implemented based on example embodiments described above with respect to FIG. 22.

Returning to the FIG. 17 example, based on performing successful random access 1710, the wireless device may report (e.g., transmit) UE capability information indicating whether the wireless device is capable of supporting multiple BWPs. Based on the capability information and for the wireless device in RRC connected state 1704, the base station may configure the wireless device with, e.g., DL/UL BWP #1 1728 and 1730, DL/UL BWP #2 (e.g., DL BWP 1730), and a BWP inactivity timer. In time period 1712, the base station may configure/set DL/UL BWP #1 (which may have larger bandwidth than DL/UL BWP #2) as the first active DL/UL BWP and configure/set DL BWP #2 (having smaller bandwidth than DL BWP #1) as a default DL BWP 1732. After RRC configuration, first active DL BWP 1728 and first active UL BWP 1730 may become activated for scheduling large amounts of data. At time period 1714, if the wireless device does not have traffic demand and has no scheduled uplink transmissions, the BWP inactivity timer may expire, upon which the wireless device may switch its active DL BWP to default DL BWP 1732 (e.g., DL BWP #2). In the FIG. 17 example, during time period 1714, active UL BWP 1730 may be maintained as UL BWP #1 and not switch, if in an FDD system where DL and UL BWP may be switched separately.

In general and extending beyond the initial access scenario described in FIG. 17, a base station may configure a wireless device with uplink (UL) bandwidth parts (BWPs) and downlink (DL) BWPs to enable bandwidth adaptation (BA) on a PCell. If carrier aggregation is configured, the base station may further configure the wireless device with at least DL BWP(s) (i.e., there may be no UL BWPs in the UL) to enable BA on an SCell. For the PCell, an initial active BWP (e.g., initial DL BWP 1724 and/or initial UL BWP 1726 of FIG. 17) may be a first BWP used for initial access. For the SCell, a first active BWP may be a second BWP configured for the wireless device to operate on the SCell upon the SCell being activated. In paired spectrum (e.g., FDD), a base station and/or a wireless device may independently switch a DL BWP and an UL BWP. In unpaired spectrum (e.g., TDD), a base station and/or a wireless device may simultaneously switch a DL BWP and an UL BWP.

A base station and/or a wireless device may switch a BWP between configured BWPs by means of a DCI or a BWP inactivity timer. If the BWP inactivity timer is configured for a serving cell, the base station and/or the wireless device may switch an active BWP to a default BWP in response to an expiry of the BWP inactivity timer associated with the serving cell. Note that in this context, the serving cell may refer to a PCell, a SCell, a PSCell, etc. The default BWP may be configured by the network (e.g., base station). For FDD systems, if configured with BA, one UL BWP for each uplink carrier and one DL BWP may be active at a time in an active serving cell. For TDD systems, one DL/UL BWP pair may be active at a time in an active serving cell. Operating on the one UL BWP and the one DL BWP (or the one DL/UL pair) may improve wireless device battery consumption. BWPs other than the one active UL BWP and the one active DL BWP that the wireless device may work on may be deactivated. On deactivated BWPs, the wireless device may: not monitor PDCCH; and/or not transmit on PUCCH, PRACH, and UL-SCH.

A serving cell may be configured with at most a first number (e.g., four) of BWPs. For an activated serving cell, there may be one active BWP at any point in time. A BWP switching for a serving cell may be used to activate an inactive BWP and deactivate an active BWP at a time. The BWP switching may be controlled by a PDCCH indicating a downlink assignment or an uplink grant. The BWP switching may be controlled by a BWP inactivity timer (e.g., bwp-Inactivity Timer). The BWP switching may be controlled by a MAC entity in response to initiating a Random Access procedure (e.g., random access 1710). After addition of an SpCell or activation of an SCell, one BWP may be initially active without receiving a PDCCH indicating a downlink assignment or an uplink grant. The active BWP for a serving cell may be indicated by RRC and/or PDCCH. For unpaired spectrum, a DL BWP may be paired with a UL BWP, and BWP switching may be common for both UL and DL.

FIG. 25 shows an example of BWP switching 2500 on a cell (e.g., PCell or SCell). In the illustrated example, at time 2510, wireless device 2504 receives, from base station 2502, at least one RRC message comprising parameters of a cell and one or more BWPs associated with the cell. For example, base station 2502 may configure wireless device 2504 with four BWP (BWP 0, 1, 2, 3) on cell 2506. The RRC message may comprise: RRC connection reconfiguration message (e.g., RRCReconfiguration); RRC connection reestablishment message (e.g., RRCRestablishment); and/or RRC connection setup message (e.g., RRCSetup). Among the one or more BWPs, at least one BWP may be configured as the first active BWP (e.g., BWP 1), one BWP as the default BWP (e.g., BWP 0). At time 2512, wireless device 2504 may receive a command (e.g., RRC message, MAC CE, or DCI) to activate the cell at an $n^{th}$ slot. If the cell is a PCell, wireless device 2504 may not receive the command activating the cell; instead, wireless device 2504 may, e.g., activate the PCell once wireless device 2504 receives RRC message comprising configuration parameters of the PCell. At time 2520, wireless device 2504 may start monitoring a PDCCH on BWP 1 in response to activating the cell.

At time 2522, wireless device 2504 may start (or restart) a BWP inactivity timer (e.g., bwp-Inactivity Timer) at an $m^{th}$ slot in response to receiving, at time 2512, a DCI indicating DL assignment on BWP 1. At time 2524, wireless device 2504 may switch back to the default BWP (e.g., BWP 0) as an active BWP when the BWP inactivity timer expires, at st slot at time 2516. At time 2526, wireless device 2504 may deactivate the cell and/or stop the BWP inactivity timer when the sCellDeactivationTimer expires (e.g., if the cell is a SCell) at time 2518. In response to the cell being a PCell, the wireless device may not deactivate the cell and may not apply the sCellDeactivationTimer on the PCell.

A MAC entity of a wireless device (e.g., wireless device 2504) may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-) initializing any suspended configured uplink grants of configured grant Type 1 according to a stored configuration, if any.

On an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

If a MAC entity receives a PDCCH for a BWP switching of a serving cell while a Random Access procedure associated with this serving cell is not ongoing, a wireless device may perform the BWP switching to a BWP indicated by the PDCCH. If a bandwidth part indicator field is configured in DCI format 1_1, the bandwidth part indicator field value may indicate the active DL BWP, from the configured DL BWP set, for DL receptions. If a bandwidth part indicator field is configured in DCI format 0_1, the bandwidth part indicator field value may indicate the active UL BWP, from the configured UL BWP set, for UL transmissions.

For a primary cell, a wireless device may be provided by a higher layer parameter Default-DL-BWP a default DL BWP among the configured DL BWPs. If a wireless device is not provided a default DL BWP by the higher layer parameter Default-DL-BWP, the default DL BWP is the initial active DL BWP. A wireless device may be provided by higher layer parameter bwp-InactivityTimer, a timer value for the primary cell. If configured, the wireless device may increment the timer, if running, every interval of 1 millisecond for frequency range 1 or every 0.5 milliseconds for frequency range 2 if the wireless device may not detect a DCI format 1_1 for paired spectrum operation or if the wireless device may not detect a DCI format 1_1 or DCI format 0_1 for unpaired spectrum operation during the interval.

If a wireless device is configured for a secondary cell with higher layer parameter Default-DL-BWP indicating a default DL BWP among the configured DL BWPs and the wireless device is configured with higher layer parameter bwp-Inactivity Timer indicating a timer value, the wireless device procedures on the secondary cell may be same as on the primary cell using the timer value for the secondary cell and the default DL BWP for the secondary cell.

If a wireless device is configured (e.g., by higher layer parameter Active-BWP-DL-SCell) with a first active DL BWP, and (e.g., by higher layer parameter Active-BWP-UL-SCell) with a first active UL BWP on a secondary cell or carrier, the wireless device may use the indicated DL BWP and the indicated UL BWP on the secondary cell as the respective first active DL BWP and first active UL BWP on the secondary cell or carrier.

A set of PDCCH candidates for a wireless device to monitor may be defined in terms of PDCCH search space sets. A search space set comprises a CSS set or a USS set. A wireless device monitors PDCCH candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the master cell group (MCG), a Type0A-PDCCH CSS set configured by searchSpaceOtherSystemInformation in PDCCH-ConfigCommon for a DCI format with CRC scrambled by a SI-RNTI on the primary cell of the MCG, a Type1-PDCCH CSS set configured by ra-SearchSpace in PDCCH-ConfigCommon for a DCI format with CRC scrambled by a RA-RNTI, a MsgB-RNTI, or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

A wireless device determines a PDCCH monitoring occasion on an active DL BWP based on one or more PDCCH configuration parameters (e.g., based on example embodiment of FIG. 24) comprising: a PDCCH monitoring periodicity, a PDCCH monitoring offset, and a PDCCH monitoring pattern within a slot. For a search space set (SS s), the wireless device determines that a PDCCH monitoring occasion(s) exists in a slot with number $$n_{s,f}^{\mu}$$

in a frame with number $n_f$ if $$\left(n_f \cdot N_{slot}^{frame,\mu} + n_{s,f}^{\mu} - o_s\right) \bmod k_s = 0.\ N_{slot}^{frame,\mu}$$

is a number of slots in a frame when numerology μ is configured. $o_s$ is a slot offset indicated in the PDCCH configuration parameters (e.g., based on example embodiment of FIG. 24). $k_s$ is a PDCCH monitoring periodicity indicated in the PDCCH configuration parameters (e.g., based on example embodiment of FIG. 24). The wireless device monitors PDCCH candidates for the search space set for $T_s$ consecutive slots, starting from slot $$n_{s,f}^{\mu},$$

and does not monitor PDCCH candidates for search space set s for the next $k_s - T_s$ consecutive slots. In an example, a USS at CCE aggregation level L∈{1, 2, 4, 8, 16} is defined by a set of PDCCH candidates for CCE aggregation level L.

A wireless device may decide, for a search space set s associated with CORESET p, CCE indexes for aggregation level L corresponding to PDCCH candidate $m_{s,n_{CI}}$ of the search space set in slot $$n_{s,f}^{\mu}$$

for an active DL BWP of a serving cell corresponding to carrier indicator field value $n_{CI}$ as $$L \cdot \left\{ \left( Y_{p,n^{\mu}_{s,f}} + \left\lfloor \frac{m_{s,n_{CI}} \cdot N_{CCE,p}}{L \cdot M^{(L)}_{s,max}} \right\rfloor + n_{CI} \right) \bmod \lfloor N_{CCE,p}/L \rfloor \right\} + i,$$

where, $$Y_{p,n^{\mu}_{s,f}} = 0$$

for any CSS;

$$Y_{p,n^{\mu}_{s,f}} = \left( A_p \cdot Y_{p,n^{\mu}_{s,f}-1} \right) \bmod D$$

for a USS, $Y_{p,-1}=n_{RNTI}\neq 0$, $A_p=39827$ for p mod 3=0, $A_p=39829$ for p mod 3=1, $A_p=39839$ for p mod 3=2, and D=65537; i=0, . . . , L−1; $N_{CCE,p}$ is the number of CCEs, numbered from 0 to $N_{CCE,p}-1$, in CORESET p; $n_{CI}$ is the carrier indicator field value if the wireless device is configured with a carrier indicator field by CrossCarrierSchedulingConfig for the serving cell on which PDCCH is monitored; otherwise, including for any CSS, $$n_{CI} = 0; m_{s,n_{CI}} = 0, \ldots, M^{(L)}_{s,n_{CI}} - 1,$$

where $$M^{(L)}_{s,n_{CI}}$$

is the number of PDCCH candidates the wireless device is configured to monitor for aggregation level L of a search space set s for a serving cell corresponding to $n_{CI}$; for any CSS, $$M^{(L)}_{s,max} = M^{(L)}_{s,0};$$

for a USS, $$M^{(L)}_{s,max}$$

is the maximum of $$M^{(L)}_{s,n_{CI}}$$

over all configured $n_{CI}$ values for a CCE aggregation level L of search space set s; and the RNTI value used for $n_{RNTI}$ is the C-RNTI.

A wireless device may monitor a set of PDCCH candidates according to configuration parameters of a search space set comprising a plurality of search spaces (SSs). The wireless device may monitor a set of PDCCH candidates in one or more CORESETs for detecting one or more DCIs. A CORESET may be configured based on the example of FIG. 23. Monitoring may include decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common SSs, and/or number of PDCCH candidates in the UE-specific SSs) and possible (or configured) DCI formats. The decoding may be referred to as blind decoding.

FIG. 26 is a table 2600 showing examples of DCI formats which may be used by a base station to transmit control information to a wireless device or used by the wireless device for PDCCH monitoring. Different DCI formats may include different DCI fields and/or have different DCI payload sizes. Different DCI formats may have different signaling purposes. For example, DCI format 0_0 may be used to schedule PUSCH in one cell. DCI format 0_1 may be used to schedule one or multiple PUSCH in one cell or indicate CG-DFI (configured grant-Downlink Feedback Information) for configured grant PUSCH, etc. The DCI format(s) which the wireless device may monitor in a SS may be configured.

Figure 27:
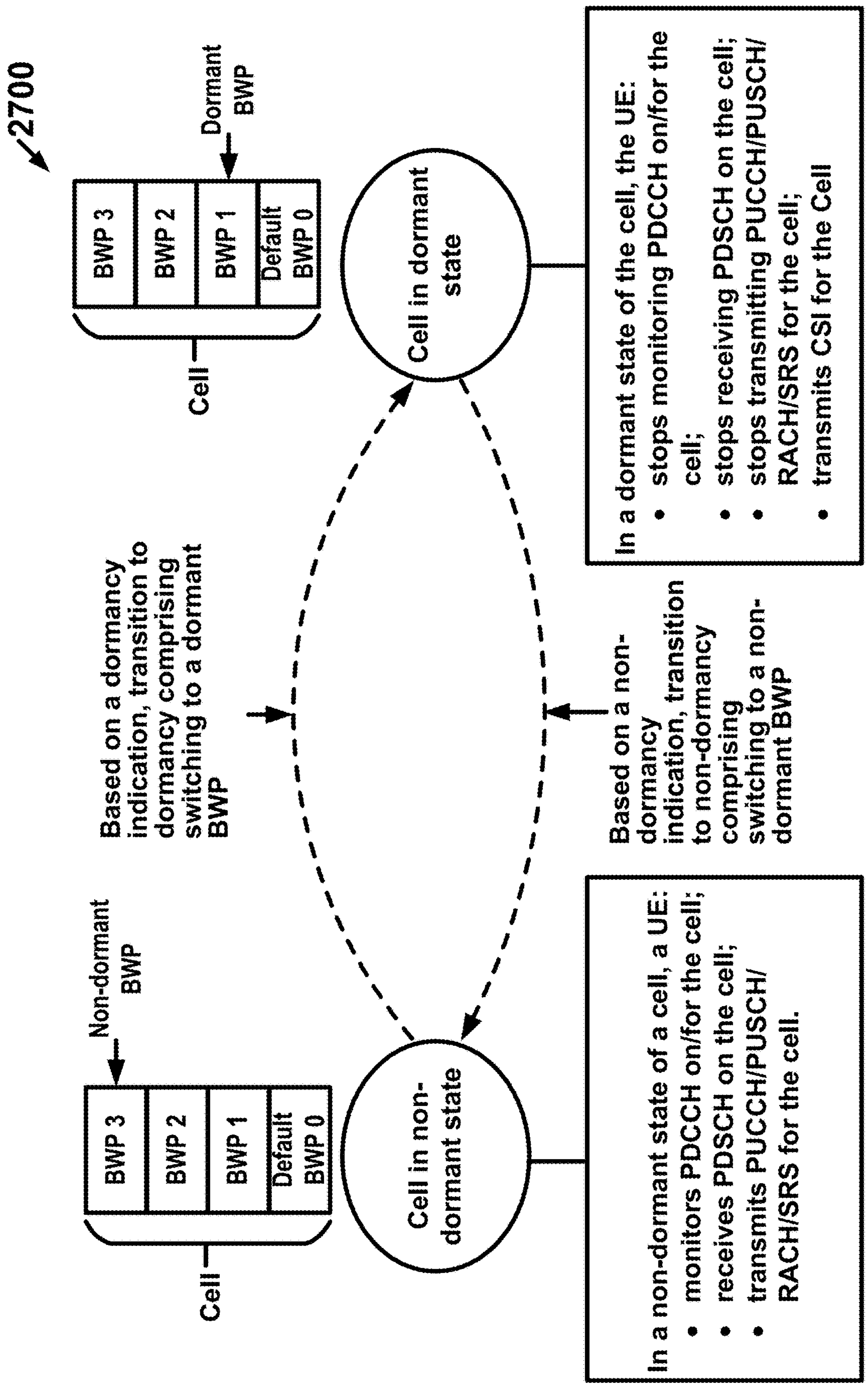
FIG. 27 is a diagram showing an example embodiment of transitioning between a dormant state and a non-dormant state on an SCell.

FIG. 27 shows an example 2700 of transitioning between a dormant state and a non-dormant state on an SCell. A base station may transmit, to a wireless device, one or more RRC messages comprising configuration parameters of a SCell, wherein the SCell comprises a plurality of BWPs. Among the plurality of BWPs, a first BWP (e.g., BWP 3 in FIG. 27) may be configured as a non-dormant BWP, and/or a second BWP (e.g., BWP 1 in FIG. 27) may be configured as a dormant BWP. A default BWP (e.g., BWP 0 in FIG. 27) may be configured in the plurality of BWPs. The non-dormant BWP may be a BWP which the wireless device may activate in response to transitioning the SCell from a dormant state to a non-dormant state. The dormant BWP may be a BWP which the wireless device may switch to in response to transitioning the SCell from a non-dormant state to a dormant state. The configuration parameters may indicate one or more search spaces and/or CORESETs configured on the non-dormant BWP. The configuration parameters may indicate no search spaces or no CORESETs configured on the dormant BWP. The configuration parameter may indicate CSI reporting configuration parameters for the dormant BWP.

A dormant BWP may be different from a default BWP such as default DL BWP 1732 of FIG. 17 or the default BWP as described with respect to FIG. 25 above. The configuration parameters may indicate one or more search spaces or one or more CORESETs configured on the default BWP. When a BWP inactivity timer expires or a DCI is received indicating switching to the default BWP, a wireless device may switch to the default BWP as an active BWP. The wireless device, if the default BWP is active, may perform at least one of: monitoring PDCCH on the default BWP of the SCell, receiving PDSCH on the default BWP of the SCell, transmitting PUSCH on the default BWP of the SCell, transmitting SRS on the default BWP of the SCell, and/or transmitting CSI report (e.g., periodic, aperiodic, and/or semi-persistent) for the default BWP of the SCell. When receiving a dormancy/non-dormancy indication indicating a dormant state for a SCell, the wireless device may switch to the dormant BWP as an active BWP of the SCell. In response to switching to the dormant BWP, the wireless device may perform at least one of: refraining from (e.g., stop) monitoring PDCCH on the dormant BWP of the SCell (or for the SCell if the SCell is cross-carrier scheduled by another cell), refraining from (e.g., stop) receiving PDSCH on the dormant BWP of the SCell, refraining from (e.g., stop) transmitting PUSCH on the dormant BWP of the SCell, refraining from (e.g., stop) transmitting SRS on the dormant BWP of the SCell, and/or (continue) transmitting CSI report (e.g., periodic, aperiodic, and/or semi-persistent) for the dormant BWP of the SCell.

As shown in FIG. 27, a base station may transmit, to a wireless device, a DCI via a PDCCH resource, the DCI comprising a dormancy/non-dormancy indication indicating whether a dormant state or a non-dormant state for the SCell. In response to the dormancy/non-dormancy indication indicating a dormant state for the SCell, the wireless device may: transition the SCell to the dormant state if the SCell was in a non-dormant state before receiving the DCI, or maintain the SCell in the dormant state if the SCell was in the dormant state before receiving the DCI. Transitioning the SCell to the dormant state may comprise switching to the dormant BWP (e.g., configured by the base station) of the SCell. In response to the dormancy/non-dormant indication indicating a non-dormant state for the SCell, the wireless device may: transition the SCell to the non-dormant state if the SCell was in a dormant state before receiving the DCI, or maintain the SCell in the non-dormant state if the SCell was in the non-dormant state before receiving the DCI. Transitioning the SCell to the non-dormant state may comprise switching to a non-dormant BWP (e.g., configured by the base station) of the SCell.

In response to transitioning the SCell from a dormant state to a non-dormant state, the wireless device may switch to the non-dormant BWP (e.g., BWP 3 as shown in FIG. 27), configured by the base station, as an active BWP of the SCell. Based on the switching to the non-dormant BWP as the active BWP of the SCell, the wireless device may perform at least one of: monitoring PDCCH on the active BWP of the SCell (or monitoring PDCCH for the SCell when the SCell is configured to be cross-carrier scheduled by another cell), receiving PDSCH on the active BWP of the SCell, and/or transmitting PUCCH/PUSCH/RACH/SRS on the active BWP (e.g., if the active BWP is an uplink BWP).

In response to transitioning the SCell from a non-dormant state to a dormant state, the wireless device may switch to the dormant BWP (e.g., BWP 1 of the SCell as shown in FIG. 27), configured by the base station. Based on the switching to the dormant BWP of the SCell, the wireless device may perform at least one of: refraining from monitoring PDCCH on the dormant BWP of the SCell (or refraining from monitoring PDCCH for the SCell when the SCell is configured to be cross-carrier scheduled by another cell), refraining from receiving PDSCH on the dormant BWP of the SCell, refraining from transmitting PUCCH/PUSCH/RACH/SRS on the dormant BWP (e.g., if the dormant BWP is an uplink BWP), and/or transmitting CSI report for the dormant BWP of the SCell based on the CSI reporting configuration parameters configured on the dormant BWP of the SCell. Accordingly, energy savings may be achieved by the wireless device due to reduced monitoring and transmission of certain signals while the cell is in the dormant state.

In the 3GPP NR system, the main services and functions of the MAC (sub)layer (as described above with respect to MAC 212/222 of FIG. 2, FIG. 3, and FIG. 4) of a wireless device may include: mapping between logical channels and transport channels; multiplexing/demultiplexing of MAC SDUs belonging to one or different logical channels into/from transport blocks (TB) delivered to/from the physical layer on transport channels; scheduling information reporting; error correction through hybrid automatic repeat request (HARQ) (e.g., one HARQ entity per cell in case of carrier aggregation (CA)); priority handling between UEs by means of dynamic scheduling; priority handling between logical channels of one UE by means of logical channel prioritization; padding. In an example, a single MAC entity may support multiple numerologies, transmission timings and cells. Mapping restrictions in logical channel prioritization control which numerology(ies), cell(s), and transmission timing(s) a logical channel can use. Different kinds of data transfer services are offered by MAC. To accommodate different kinds of data transfer services, multiple types of logical channels are defined, e.g., each supporting transfer of a particular type of information. Each logical channel type is defined by what type of information is transferred. Logical channels (e.g., as described above with respect to FIG. 5A and FIG. 5B) are classified into two groups: Control Channels and Traffic Channels. Control channels are used for the transfer of control plane information only, and traffic channels are used for the transfer of user plane information only.

The services and functions provided by the MAC (sub) layer (or MAC layer) of a wireless device and a base station may be enabled based on communication (i.e., transmission and/or reception) of MAC PDUs, as described above with respect to FIG. 4A and FIG. 4B. The base station may transmit one or more MAC PDUs to the wireless device. In an example, a MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. The bit order of a parameter field within a MAC PDU may be represented with the first and most significant bit in the leftmost bit and the last and least significant bit in the rightmost bit.

A MAC SDU may be a bit string that is byte aligned (e.g., aligned to a multiple of eight bits) in length. A MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. A MAC subheader may be placed immediately in front of a corresponding MAC SDU, MAC CE, or padding. A MAC entity may ignore a value of reserved bits in a DL MAC PDU.

A MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

When a MAC subheader corresponds to a MAC SDU, a variable-sized MAC CE, or padding, the MAC subheader may comprise: an R (reserve) field with a one bit length; an F field with a one-bit length (and indicates a size of the Length field with); an LCID field with a multi-bit length (and indicates a logical channel ID identifying the logical channel instance of the corresponding MAC SDU/MAC CE/padding for the DL-SCH or UL-SCH); an L field with a multi-bit length (and indicates a length of the corresponding MAC SDU or variable-sized MAC CE in bytes), or a combination thereof.

FIG. 28A shows an example of a DL MAC PDU. Multiple MAC CEs, such as MAC CE 1 and 2, may be placed together. A MAC subPDU, comprising a MAC CE, may be placed before: a MAC subPDU comprising a MAC SDU, or a MAC subPDU comprising padding. In an example, each MAC CE/MAC SDU has a corresponding MAC subheader. As will further described below, the MAC subheader has several formats depending on whether a MAC SDU, a fixed-sized MAC CE, or a variable-sized MAC CE is to be transmitted. FIG. 28B shows an example of a UL MAC PDU. Multiple MAC CEs, such as MAC CE 1 and 2, may be placed together. In an embodiment, a MAC subPDU comprising a MAC CE may be placed after all MAC subPDUs comprising a MAC SDU. In addition, the MAC subPDU may be placed before a MAC subPDU comprising padding.

Figure 29A:
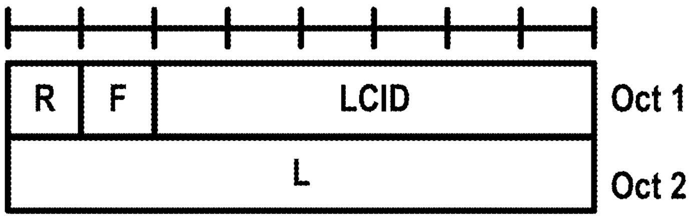
FIG. 29A shows an example of a MAC subheader with an R field (reserved bit), an F field (flag bit), a logical channel identification (LCID) field, and an L field.
Figure 29B:
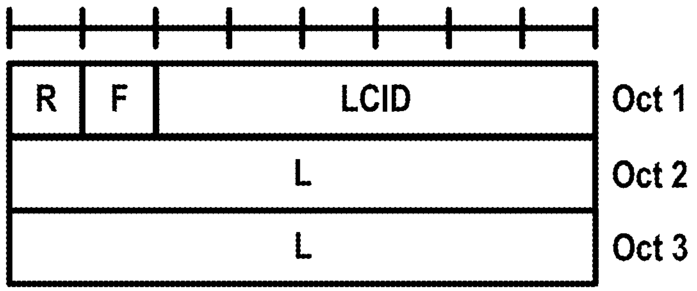
FIG. 29B shows example of a MAC subheader with an R field, a F field, an LCID field, and an L field.
Figure 29C:
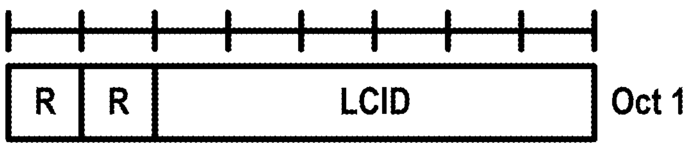
FIG. 29C shows an example for such a MAC subheader with an R field and an LCID field and no L field.

FIG. 29A shows an example of a MAC subheader with an R field, an F field, an LCID field, and an L field. In the example MAC subheader of FIG. 29A, the LCID field may be six bits in length, and the L field may be eight bits in length. FIG. 29B shows example of a MAC subheader with an R field, a F field, an LCID field, and an L field. In the example MAC subheader shown in FIG. 29B, the LCID field may be six bits in length, and the L field may be sixteen bits in length. When a MAC subheader corresponds to a fixed sized MAC CE or padding, the MAC subheader may comprise: a R field with a two-bit length and an LCID field with a multi-bit length. FIG. 29C shows an example for such a MAC subheader with an R field and an LCID field and no L field. In the example MAC subheader shown in FIG. 29C, the LCID field may be six bits in length, and the R field may be two bits in length.

FIG. 30A shows a table 3000A comprising an example of the one or more MAC CEs, identified by a corresponding codepoint/index of the LCID, that may be transmitted by the MAC entity of the wireless device to the MAC entity of the base station one or more MAC CEs. For example, the one or more MAC CEs may comprise at least one of: a short buffer status report (BSR) MAC CE (with LCID index of 61), a long BSR MAC CE (with LCID index of 62), a C-RNTI MAC CE (with LCID index of 58), a configured grant confirmation MAC CE (with LCID index of 55), a single entry PHR MAC CE (with LCID index of 57), a multiple entry PHR MAC CE (with LCID index of 56), etc. A MAC CE may have an LCID in the MAC subheader corresponding to the MAC CE. Different MAC CE may have different LCID in the MAC subheader corresponding to the MAC CE.

FIG. 30B shows a table 3000B comprising an example of one or more MAC CEs, identified by a corresponding codepoint/index of the LCID, that may be transmitted by the MAC entity of the base station to the MAC entity of the wireless device. The one or more MAC CEs comprise at least one of: a SP ZP CSI-RS Resource Set Activation/Deactivation MAC CE (with LCID index of 48), a PUCCH spatial relation Activation/Deactivation MAC CE (with LCID index of 49), a SP SRS Activation/Deactivation MAC CE (with LCID index of 50), a SP CSI reporting on PUCCH Activation/Deactivation MAC CE (with LCID index of 51), a TCI State Indication for UE-specific PDCCH MAC CE (with LCID index of 52), a TCI State Indication for UE-specific PDSCH MAC CE (with LCID index of 53), an Aperiodic CSI Trigger State Subselection MAC CE (with LCID index of 54), a SP CSI-RS/CSI-IM Resource Set Activation/Deactivation MAC CE (with LCID index of 55), a DRX command MAC CE (with LCID index of 60), a Long DRX command MAC CE (with LCID index of 59), an SCell activation/deactivation MAC CE (1 Octet) (with LCID index of 58), an SCell activation/deactivation MAC CE (4 Octet) (with LCID index of 57), etc. In an example, a MAC CE, such as a MAC CE transmitted by a MAC entity of a base station to a MAC entity of a wireless device, may have an LCID in the MAC subheader corresponding to the MAC CE. Different MAC CE may have different LCID in the MAC subheader corresponding to the MAC CE.

In carrier aggregation (CA), two or more component carriers (CCs) may be aggregated, as described above with respect to FIG. 10B. A wireless device may simultaneously receive or transmit on one or more CCs, depending on capabilities of the wireless device, using the technique of CA. A wireless device may support CA for contiguous CCs and/or for non-contiguous CCs. CCs may be organized into cells. For example, CCs may be organized into one primary cell (PCell) and one or more secondary cells (SCells). If configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. The serving cell may denote a PCell. A base station may transmit, to a wireless device, one or more messages comprising configuration parameters of a plurality of one or more SCells, depending on capabilities of the wireless device.

If configured with CA, a base station and/or a wireless device may employ an activation/deactivation mechanism of an SCell to improve battery or power consumption of the wireless device. If a wireless device is configured with one or more SCells, a base station may activate or deactivate at least one of the one or more SCells, as described above with respect to FIG. 27. After configuration of an SCell (by the wireless device or by the base station for the wireless device), the SCell may remain deactivated unless an SCell state associated with the SCell is set to “activated” or “dormant.” A wireless device may activate/deactivate an SCell in response to receiving an SCell Activation/Deactivation MAC CE. A base station may transmit, to a wireless device, one or more messages comprising an SCell timer (e.g., sCelDeactivationTimer). A wireless device may deactivate an SCell in response to an expiry of the SCell timer.

Figure 31A:
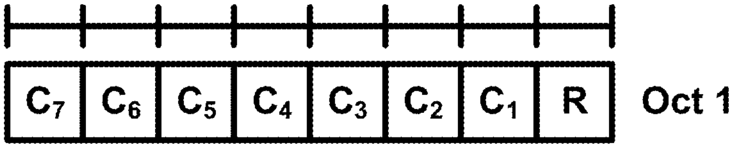
FIG. 31A shows an example of a secondary cell (SCell) Activation/Deactivation MAC CE of one octet.

FIG. 31A shows an example of an SCell Activation/Deactivation MAC CE of one octet. A first MAC PDU subheader with a first LCID (e.g., LCID with index/codepoint of 58 in FIG. 30B) may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g., seven) and a second number of R-fields (e.g., one).

Figure 31B:
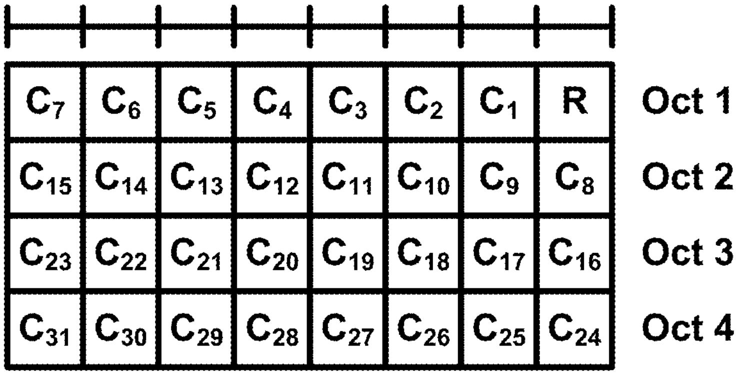
FIG. 31B shows an example of an SCell Activation/Deactivation MAC CE of four octets.

FIG. 31B shows an example of an SCell Activation/Deactivation MAC CE of four octets. A second MAC PDU subheader with a second LCID (e.g., LCID with index/codepoint of 57 in FIG. 30B) may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

As shown in FIG. 31A and/or FIG. 31B, a $C_i$ field may indicate an activation/deactivation status of an SCell with an SCell index i if an SCell with SCell index i is configured. If the $C_i$ field is set to one, an SCell with an SCell index i may be activated. If the $C_i$ field is set to zero, an SCell with an SCell index i may be deactivated. If there is no SCell configured with SCell index i, the wireless device may ignore the $C_i$ field. The R field may indicate a reserved bit and may, e.g., be set to zero.

If a wireless device receives an SCell Activation/Deactivation MAC CE (e.g., shown in FIG. 31A or FIG. 31B) activating an SCell, the wireless device may activate the SCell. In response to the activating the SCell, the wireless device may perform operations including: SRS transmissions on the SCell; CQI/PMI/RI/CRI reporting for the SCell; PDCCH monitoring on the SCell; PDCCH monitoring for the SCell; and/or PUCCH transmissions on the SCell. In response to activating the SCell, the wireless device may start or restart a first SCell timer (e.g., sCellDeactivationTimer) associated with the SCell. The wireless device may start or restart the first SCell timer in the slot in which the SCell Activation/Deactivation MAC CE activating the SCell has been received. In response to activating the SCell, the wireless device may (re-)initialize one or more suspended configured uplink grants of a configured grant Type 1 associated with the SCell according to a stored configuration. In response to the activating the SCell, the wireless device may trigger power headroom report (PHR), as will be further described below.

If a wireless device receives an SCell Activation/Deactivation MAC CE deactivating an activated SCell, the wireless device may deactivate the activated SCell. If a first SCell timer (e.g., sCellDeactivationTimer) associated with an activated SCell expires, the wireless device may deactivate the activated SCell. In response to deactivating the activated SCell, the wireless device may stop the first SCell timer associated with the activated SCell. In response to deactivating the activated SCell, the wireless device may clear one or more configured downlink assignments and/or one or more configured uplink grants of a configured uplink grant Type 2 associated with the activated SCell. In response to deactivating the activated SCell, the wireless device may: suspend one or more configured uplink grants of a configured uplink grant Type 1 associated with the activated SCell; and/or flush HARQ buffers associated with the activated SCell.

If an SCell is deactivated, a wireless device might not perform operations including: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell. When at least one first PDCCH on an activated SCell indicates an uplink grant or a downlink assignment, a wireless device may restart a first SCell timer (e.g., sCellDeactivationTimer) associated with the activated SCell. If at least one second PDCCH on a serving cell (e.g., a PCell or an SCell configured with PUCCH, i.e., PUCCH SCell) scheduling the activated SCell indicates an uplink grant or a downlink assignment for the activated SCell, a wireless device may restart the first SCell timer (e.g., sCellDeactivationTimer) associated with the activated SCell. If an SCell is deactivated, and there is an ongoing random access procedure on the SCell, a wireless device may abort (or stop) the ongoing random access procedure on the SCell.

To utilize uplink radio resource efficiently, a MAC layer in a base station includes dynamic resource schedulers that allocate physical layer uplink resources for a plurality of wireless devices being served. A wireless device may measure data that is buffered in the wireless device's logical channel queues and transmit an uplink buffer status report (BSR) on the data to the base station to provide support for quality of service (QoS)-awake packet scheduling at the base station. In addition to BSR transmissions, the amount of transmission power available at each wireless device may also be relevant for the base station's uplink scheduler. For example, the base station may avoid scheduling a higher data rate for a wireless device than the available uplink transmission power at the wireless device. Therefore, for uplink, a wireless device may transmit, to the base station, a power headroom report (PHR) indicating the power headroom (PH) that is available to the UE, e.g., when the wireless device is scheduled to transmit on the UL-SCH. This PHR may be used by the base station to allocate the uplink resources among the multiple UEs so that the resources are utilized by the multiple UEs efficiently. That is, the base station may determine based on the PHR how much uplink bandwidth per subframe wireless device can use, which allows the base station to avoid allocating resources that the wireless device may not use.

FIG. 32A shows what two example PHR 3201A and PHR 3201B transmitted by a wireless device would indicate to a base station. A PHR may indicate a difference between a maximum (per-carrier) transmission power for component carrier c ($P_{CMAX,C}$) (or calculated or nominal UE maximum transmission power) that may be transmitted by wireless device per activated serving cell (e.g., PCell, SCell, PSCell, or SPCell) and a transmit power measured (or estimated) for uplink transmission (e.g., estimated assuming that there would have been no upper limit such as $P_{CMAX,C}$ on the transmit power). Because PHR is not a measure of the difference between the maximum per-carrier transmit power $P_{CMAX,C}$ and an actual carrier transmit power, the PHR may be negative indicating that at the time of generating the PHR, the base station has scheduled a higher data rate than the wireless device can support given the available transmission power. Since the base station may configure the modulation-and-coding scheme and resource size used by the wireless device for uplink transmission in the time duration corresponding to the PHR, the base station may determine valid combinations of modulation-and-coding scheme and resource size allocation (e.g., assuming the downlink path loss is constant). For example, as shown in FIG. 32A, PHR 201A may include $P_{CMAX,C}$ 3206 and a power headroom (PH) 3202A that is a difference between $P_{CMAX,C}$ 3206 and estimated UE uplink (e.g., PUSCH) transmission power 3204A. As also shown in FIG. 32A, PHR 3201B may include $P_{CMAX,C}$ 3206 and a power headroom (PH) 3202B that is a difference between $P_{CMAX,C}$ 3206 and estimated UE uplink (e.g., PUSCH) transmission power 3204B. Since, UE uplink transmission power 3204B is higher than $P_{CMAX,C}$ 3206, PHR 3201B may indicate power headroom PH 3202B that is negative. Similarly, if UE uplink transmission power 3204A is lower than $P_{CMAX,C}$ 3206, PHR 3201A may indicate power headroom PH 3202A that is positive.

FIG. 32B shows an example MAC subheader 3212 and a corresponding MAC CE 3210 for transmitting a PHR from a wireless device to a base station. The PHR may be transmitted (and reported) by the wireless device to the base station by configuring a PH value in a PHR MAC CE (e.g., MAC CE 3210) and transmitting the PHR MAC CE through an UL transmission resource. MAC CE 3210 includes a PH 3214 and $P_{CMAX}$ 3216 for a serving cell (carrier). MAC CE 3210 may include an MPE 3218 that indicates the power backoff to meet the MPE FR2 requirement for a serving cell operating on FR2, if PHR functionality is configured by the base station with MPE reporting based on the parameter mpe-Reporting-FR2 and the serving cell operates on FR2.

The PHR transmitted by the wireless device may be one of three types: a Type 1 PHR, a Type 2 PHR, or a Type 3 PHR.

The Type 1 PHR may indicate the difference between the nominal (or calculated) UE maximum transmission power ($P_{CMAX,C}$ on carrier c) that may be transmitted by the wireless device for each activated serving cell (e.g., PCell, SCell, PSCell, or SPCell) and the estimated (or measured) power for UL data transmission (UL-SCH). The Type 1 PHR may indicate the PH assuming PUSCH-only transmission on the carrier. Although the value of $P_{CMAX,C}$ may be explicitly configured by the base station, it may be separately configured for a normal uplink carrier and a supplementary uplink carrier with both belonging to the same cell (that is, having the same associated downlink component carrier). Therefore, $P_{CMAX,C}$ 3216 used by the wireless device in generating the PHR is included in MAC CE 3210.

The Type 2 PHR may indicate the difference between the nominal (or calculated) UE maximum transmission power ($P_{CMAX,C}$ on carrier c) that may be transmitted by the wireless device and the estimated (or measured) power for PUCCH transmission and UL data transmission (UL-SCH) on the SPCell (e.g., PCell or PSCell) of another MAC layer (e.g., when dual connectivity is configured, LTE MAC or E-UTRA MAC in E-UTRAN New Radio Dual Connectivity (EN-DC)). In other words, Type 2 PHR indicates a PH based on simultaneous PUSCH and PUCCH reporting.

The Type 3 PHR may indicate the difference between the nominal (or calculated) UE maximum transmission power ($P_{CMAX,C}$ on carrier c) that may be transmitted by the wireless device for each activated serving cell (PCell, SCell, PSCell, or SpCell) and power estimated (or measured) for sounding reference signal (SRS) transmission (on the component carrier). In other words, Type 3 PHR may be used to handle SRS switching, that is, SRS transmissions on an uplink carrier where the wireless device is not configured to transmit PUSCH. This Type 3 PHR may enable the base station to evaluate the uplink quality of alternative uplink carriers and to (re)configure the wireless device to use this carrier for uplink transmission.

As will be further described below, the PHR may be transmitted via a PHR MAC CE. For example, referring to FIG. 30A, LCID in MAC subheader 3212 may be an index/codepoint value (e.g., 57) that indicates corresponding MAC CE 3210 is a single entry PHR MAC CE. For carrier aggregation or dual connectivity, multiple PHRs (for multiple corresponding serving cells) can be contained in a single MAC CE. For example, referring to FIG. 30A, LCID in MAC subheader 3212 may be an index/codepoint value (e.g., 54 or 56) that indicates corresponding MAC CE 3210 is a multiple entry PHR MAC CE (e.g., a four octet multiple entry PHR or a one octet multiple entry PHR).

PH 3214 may be a field (of MAC CE 3210 that is a PHR MAC CE) that indicates the PH level. For example, a value of field PH 3214 may be a 6 bit value as shown in table 3220. A value of PH 3214 may correspond to one or more measured quantity values of PH in dB. As shown, each possible value of PH 3214 may correspond to one or more measured quantity values of PH in dB that do not overlap with measured quantity values in dB corresponding to other possible values of PH. For example, a PH of 63 may correspond to a measured quantity value of 38 or more dB and a PH of 3 may correspond to a measured quantity value of −30 dB.

$P_{CMAX,C}$ 3216 may be a field (of MAC CE 3210 that is a PHR MAC CE) that is used for calculating the field PH 3214, as described above in FIG. 32A, and may be, e.g., a six bit value. As shown in table 3222, a value of $P_{CMAX,C}$ 3216 indicates a nominal UE transmit power level, which corresponds to one or more measured quantity values in dBm. Like in table 3220, table 3222 show that different values of $P_{CMAX,C}$ 3216 corresponds to one or more different (non-overlapping) measured quantity values in dBm.

MPE 3218 may be a field (of MAC CE 3210 that is a PHR MAC CE) that, if used (e.g., based on mpe-Reporting-Fr2 parameter being configured and the serving cell operating in FR2), indicates the applied power backoff to meet MPE requirements.

As shown in table 3224, a value of MPE 3218 may be, e.g., two bits, and corresponds to a measured P-MPR value in dB. Like in table 3220, table 3224 show that different values of MPE 3218 correspond to one or more different (non-overlapping) measured quantity values in dB.

FIG. 33A shows an example of a Single Entry PHR MAC CE. The Single Entry PHR MAC CE may have a fixed size comprising two octets, and as shown includes: a reserved (R) field (e.g., a bit set to "0"); a PHR field (of Type 1 for a PCell); and a $P_{CMAX,f,c}$ field. These fields are as described above with respect to FIG. 32B.

FIG. 33B shows an example of a Multiple Entry PHR MAC CE (including one octet for c) where the highest serving cell index (ServCellIndex) of Serving Cell with configured uplink is less than 8, and FIG. 33C shows an example of Multiple Entry PHR MAC CE where the highest ServCellIndex of Serving Cell with configured uplink is equal to or higher than 8 (e.g., including four octet for c). The Multiple Entry PHR MAC CE may be identified by a MAC PDU subheader with LCID defined for the Multiple Entry PHR (e.g., as described in FIG. 30A). It may have a variable size, and may include a bitmap (corresponding to a number of carriers c), a Type 2 PH field, and an octet containing the associated $P_{CMAX,f,c}$ field (if reported) for SpCell of the other MAC entity; a Type 1 PH field and an octet containing the associated $P_{CMAX,f,c}$ field (if reported) for the PCell. The Multiple Entry PHR MAC CEs of FIG. 33B and FIG. 33C may further include, in ascending order based on the ServCellIndex, one or multiple of Type X PH fields and octets containing the associated $P_{CMAX,f,c}$ fields (if reported) for Serving Cells other than PCell indicated in the bitmap, where X is either 1 or 3. A single octet bitmap is used for indicating the presence of PH per Serving Cell when the highest ServCellIndex of Serving Cell with configured uplink is less than 8, otherwise four octets are used.

The presence of Type 2 PH field for SpCell of the other MAC entity may be configured by a RRC parameter phr-Type2OtherCell with value "True."

The MAC entity of the wireless device may determine whether PH value for an activated serving cell is based on real transmission or a reference format by considering the downlink control information which has been received until and including the PDCCH occasion in which the first UL grant for a new transmission is received since a PHR has been triggered.

Referring to FIG. 33B and FIG. 33C, the PHR MAC CEs may include the following fields:

- a $C_i$ field: that indicates the presence of a PH field for the serving cell with ServCellIndex i (e.g., C field set to "1" may indicate that a PH field for the Serving Cell with ServCellIndex i is reported and a "0" may indicate that a PH field for the Serving Cell with ServCellIndex i is not reported);
- a reserved field (R): set to "0";
- a virtual (V) field: indicating if the PH value is based on a real transmission or a reference format. For Type 1 PH, V=0 may indicate real transmission on PUSCH, and V=1 may indicate that a PUSCH reference format is used. For Type 2 PH, V=0 may indicate real transmission on PUCCH, and V=1 may indicate that a PUCCH reference format is used. For Type 3 PH, V=0 may indicate real transmission on SRS, and V=1 may indicate that an SRS reference format is used. Furthermore, for Type 1, Type 2, and Type 3 PH, V=0 may indicate the presence of the octet containing the associated $P_{CMAX,f,c}$ field, and V=1 may indicate that the octet containing the associated $P_{CMAX,f,c}$ field is omitted;

- a PH field: indicating the power headroom level as described in FIG. 32B;
- a P field: indicating whether the wireless device (e.g., MAC entity) applies power backoff due to power management. The wireless device may set P=1 if the corresponding $P_{CMAX,f,c}$ field would have had a different value if no power backoff due to power management had been applied;
- a $P_{CMAX,f,c}$ field: that indicates the $P_{CMAX,f,c}$ or p used for calculation of the preceding PH field, as described in FIG. 32B.

A wireless device may receive configuration parameters for PHR via one or more messages (e.g., via RRC message). For example, the base station may transmit these configuration parameters to control PHR (e.g., when and/or what type of PHR is generated and transmitted) by the wireless device. For example, the configuration parameters may include one or more of the following configuration parameters for PHR:

- phr-PeriodicTimer: that indicates a value in number of subframes for periodic PHR reporting. The value may be one of a set of values (e.g., sf10 from sf10, sf20, sf50, sf100, sf200, sf500, sf1000, infinity, where sf10 corresponds to 10 subframes, and so on). For example, when a periodic power headroom reporting timer expires, the power headroom reporting procedure may be triggered.
- phr-ProhibitTimer: indicates a value in number of subframes for prohibiting power headroom reporting. The value may be one of a set of values (e.g., sf10 from sf0, sf10, sf20, sf50, sf100, sf200, sf500, sf1000, where sf10 corresponds to 10 subframes, and so on). For example, when a power headroom reporting prohibit timer is running, the power headroom reporting procedure may not be triggered.
- phr-Tx-PowerFactorChange: indicates a value in dB for triggering PHR reporting. The value may be one of a set of values (e.g., dB1 corresponds to 1 dB, dB3 corresponds to 3 dB and so on). The same value may apply for each serving cell (although the associated functionality may be performed independently for each cell).
- phr-Type2OtherCell: indicates if the UE is to report a PHR type 2 for a second cell (e.g., the SpCell) of a second MAC entity/layer. For example, this parameter may be set to "True" to indicate the PHR type 2 is to be transmitted, and set to "False" if the UE is not configured with an E-UTRA MAC entity.
- twoPHRMode: indicates if the power headroom is to be reported as two PHRs (e.g., each PHR may be associated with a SRS resource set) is enabled or not
- mpe-ProhibitTimer: indicates a value in number of subframes for MPE reporting. The value may be one of a set of values (e.g., sf10 from sf10, sf20, sf50, sf100, sf200, sf500, sf1000, infinity, where sf10 corresponds to 10 subframes, and so on).
- mpe-Reporting-FR2: indicates whether the UE reports MPE P-MPR in the PHR MAC control element
- mpe-ResourcePool: includes a list of SSB/CSI-RS resources for P-MPR reporting. Each resource may be configured with a serving cell index where the resource is configured for the UE.
- mpe-Threshold: indicates a value of the P-MPR threshold in dB for reporting MPE P-MPR when FR2 is configured. The same value may apply for each serving cell (although the associated functionality may be performed independently for each cell).
- multiplePHR: indicates if power headroom is reported using the Single Entry PHR MAC control element or Multiple Entry PHR MAC control element. For example, multiplePHR may be a Boolean value where "True" means to use Multiple Entry PHR MAC control element and "False" means to use the Single Entry PHR MAC control element (or vice versa). The network (e.g., BS) may configure this field to "True" for MR-DC and UL CA for NR, and to "False" in all other cases.
- numberOfN: indicates a number of reported P-MPR values in a PHR MAC CE.
- phr-ModeOtherCG: indicates a mode (e.g., real or virtual) used for the PHR of the activated cells that are part of another Cell Group (e.g., MCG or SCG), if dual connectivity (DC) is configured. If the UE is configured with only one cell group (e.g., no DC), the UE may ignore the field.

The PHR may be triggered to be transmitted based on one or more conditions (or events) being satisfied, as will be described below. For example, PHR may be triggered to be reported periodically (e.g., because of expiration of a periodic timer) or when triggered based on a threshold. For example, the reporting of the power headroom via the PHR may be periodically triggered by the expiration of a periodic timer, for instance, phr-Periodic Timer, which can be configured with values ranging from about 10 ms to infinity. The power headroom reporting may be triggered based on a threshold such as path loss changes. For instance, a NR PHR may be triggered when phr-ProhibitTimer expires or has expired and the path loss has changed more than phr-Tx-PowerFactorChange dB for at least one activated serving cell of any MAC entity which is used as a pathloss reference since the last transmission of a PHR in this MAC entity when the MAC entity has UL resources for new transmission. The path loss variation for one cell assessed above can be between the pathloss measured at present time on the current pathloss reference and the pathloss measured at the transmission time of the last transmission of PHR on the pathloss reference in use at that time, irrespective of whether the pathloss reference has changed in between.

The PHR may be triggered upon configuration or reconfiguration of the PHR functionality by upper layers (e.g., RRC), which is not used to disable the PHR function. For example, the PHR may be triggered upon activation of an SCell of any MAC entity with configured uplink or addition of the PSCell (i.e., PSCell is newly added or changed). For example, the PHR may be triggered when phr-ProhibitTimer expires or has expired, when the MAC entity has UL resources for new transmission, and for any of the activated serving cells of any MAC entity with configured uplink, there are UL resources allocated for transmission or there is a PUCCH transmission on this cell, and the required power backoff due to power management (as allowed by $P\text{-}MPR_c$) for this cell has changed more than phr-Tx-PowerFactor-Change dB since the last transmission of a PHR when the MAC entity had UL resources allocated for transmission or PUCCH transmission on this cell. For example, the PHR may be triggered upon switching of activated BWP from dormant BWP to non-dormant DL BWP of an SCell (e.g., of any MAC entity with configured uplink). The wireless device (e.g., the MAC entity) may be configured to avoid triggering a PHR when the required power backoff due to power management decreases only temporarily (e.g. for up to a threshold (e.g., a few tens of milliseconds) amount of time) and it can avoid reflecting such temporary decrease in the values of $P_{CMAX,f,c}$/PH when a PHR is triggered by other triggering conditions. If a HARQ process is configured with cg-RetransmissionTimer and if the PHR is already included in a MAC PDU for transmission on configured grant by this HARQ process, but not yet transmitted by lower layers, it is up to the wireless device's implementation how to handle the PHR content.

As will be further described below, based on triggering a PHR, the wireless device may generate the PHR and transmit the PHR via a MAC CE. For example, the PHR may be generated to include at least a PH value and a nominal (or calculated) UE maximum transmission power ($P_{CMAX,C}$ on carrier c) that may be transmitted by the wireless device, as described with respect to FIG. 32A and FIG. 32B.

Figure 34B:
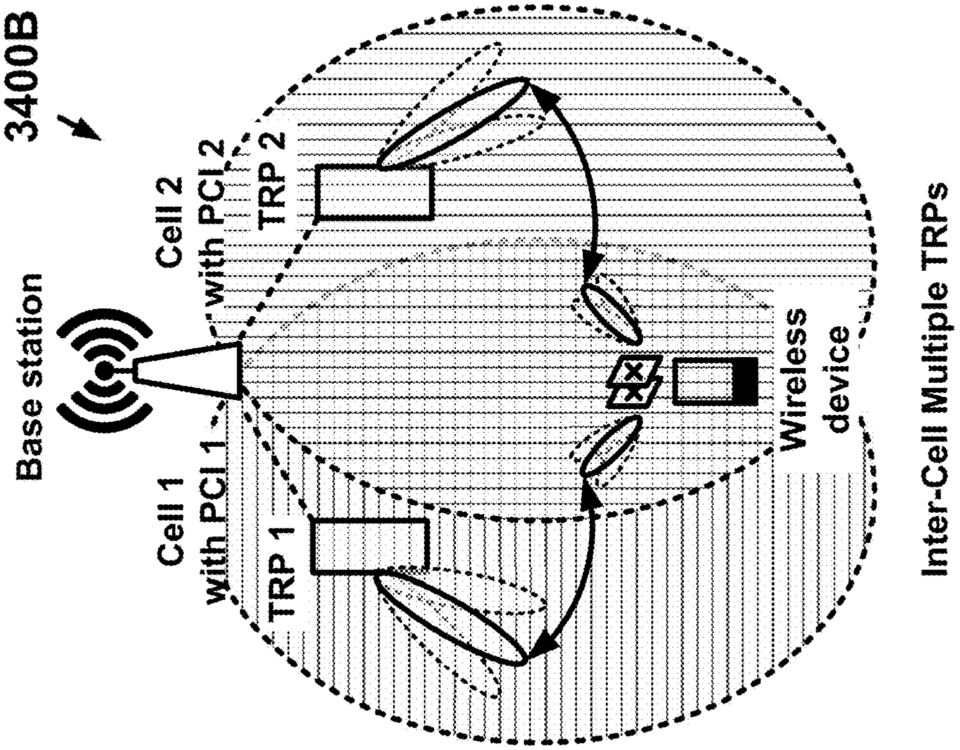
FIG. 34B is a diagram showing an example of communication between a base station and a wireless device based on inter-cell TRPs.
Figure 34A:
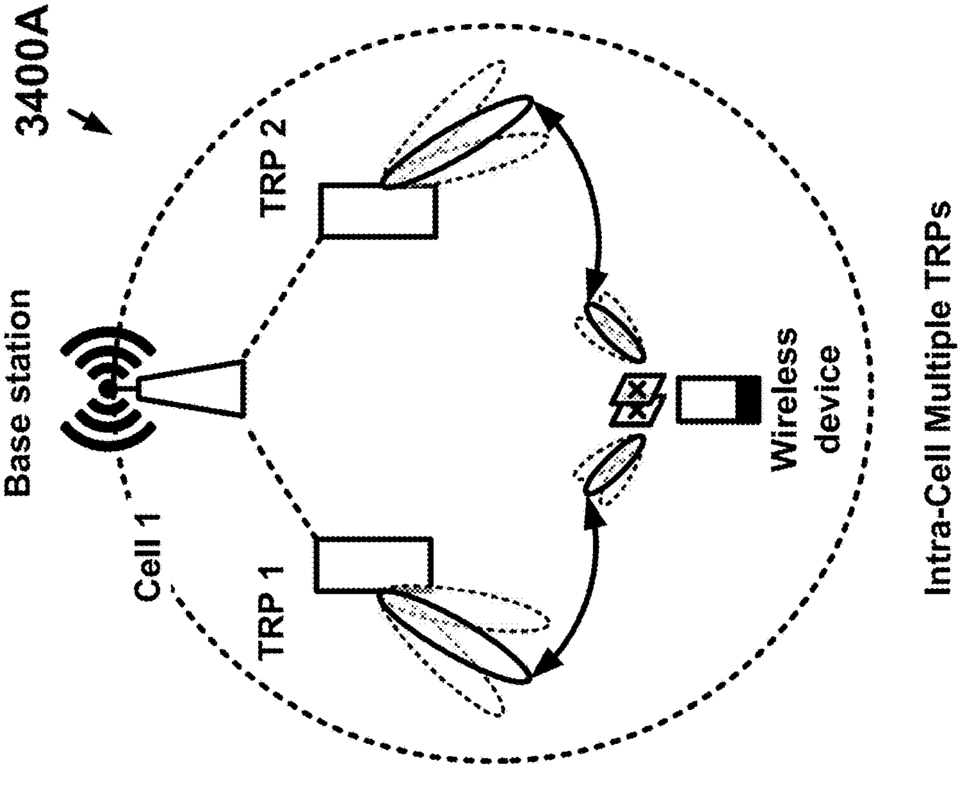
FIG. 34A is a diagram showing an example of communication between a base station and a wireless based on intra-cell transmission/reception points (TRPs)s.

A base station may be equipped with multiple transmission reception points (TRPs) to improve spectrum efficiency or transmission robustness. The base station may transmit DL signals/channels via intra-cell multiple TRPs (e.g., as shown in FIG. 34A) and/or via inter-cell multiple TRPs (e.g., as shown in FIG. 34B). A base station may be equipped with more than one TRP. A first TRP may be physically located at a different place from a second TRP. The first TRP may be connected with the second TRP via a backhaul link (e.g., wired link or wireless link), and the backhaul link being ideal backhaul link with zero or neglectable transmission latency, or the backhaul link being non-ideal backhaul link. A first TRP may be implemented with antenna elements, RF chain, and/or baseband processor independently configured/managed from a second TRP.

FIG. 34A shows an example of a communication between a base station (equipped with multiple TRPs) and a wireless device (equipped with single panel or multiple panels) based on intra-cell TRPs. Transmission and reception with multiple TRPs may improve system throughput and/or transmission robustness for a wireless communication in a high frequency (e.g., above 6 GHz). The multiple TRPs may be associated with a same physical cell identifier (PCI). Multiple TRPs on which PDCCH/PDSCH/PUCCH/PUSCH resources of a cell are shared may be referred to as intra-cell TRPs (or intra-PCI TRPs).

A TRP of multiple TRPs of the base station may be identified by at least one of: a TRP identifier (ID), a virtual cell index, or a reference signal index (or group index). In an example, in a cell, a TRP may be identified by a control resource set (coreset) group (or pool) index (e.g., CORESETPoolIndex as shown in FIG. 23) of a coreset group from which a DCI is transmitted from the base station on a coreset. A TRP ID of a TRP may comprise a TRP index indicated in the DCI. A TRP ID of a TRP may comprise a TCI state group index of a TCI state group. A TCI state group may comprise at least one TCI state with which the wireless device receives the downlink TBs, or with which the base station transmits the downlink TBs.

A base station may transmit, to a wireless device, one or more RRC messages comprising configuration parameters of a plurality of CORESETs on a cell (or a BWP of the cell). Each of the plurality of CORESETs may be identified with a CORESET index and may be associated with (or configured with) a CORESET pool (or group) index. One or more CORESETs, of the plurality of CORESETs, having a same CORESET pool index may indicate that DCIs received on the one or more CORESETs are transmitted from a same TRP of a plurality of TRPs of the base station. The wireless device may determine receiving beams (or spatial domain filters) for PDCCHs/PDSCHs based on a TCI indication (e.g., DCI) and a CORESET pool index associated with a CORESET for the DCI.

A wireless device may receive multiple PDCCHs scheduling fully/partially/non-overlapped PDSCHs in time and frequency domain, if the wireless device receives one or more RRC messages (e.g., PDCCH-Config IE) comprising a first CORESET pool index (e.g., CORESETPoolIndex) value and a second COESET pool index in ControlResourceSet IE. The wireless device may determine the reception of full/partially overlapped PDSCHs in time domain only if PDCCHs that schedule two PDSCHs are associated with different ControlResourceSets having different values of CORESETPoolIndex.

A wireless device may be configured to determine (or assume) that the ControlResourceSet is assigned with CORESETPoolIndex as 0 for a ControlResourceSet without CORESETPoolIndex. If the wireless device is scheduled with full/partially/non-overlapped PDSCHs in time and frequency domain, scheduling information for receiving a PDSCH is indicated and carried only by the corresponding PDCCH. The wireless device is expected to be scheduled with the same active BWP and the same SCS. A wireless device can be scheduled with at most two codewords simultaneously if the wireless device is scheduled with full/partially overlapped PDSCHs in time and frequency domain.

If PDCCHs that schedule two PDSCHs are associated with different ControlResourceSets having different values of CORESETPoolIndex, the wireless device is allowed to the following operations: for any two HARQ process IDs in a given scheduled cell, if the wireless device is scheduled to start receiving a first PDSCH starting in symbol j by a PDCCH associated with a value of CORESETpoolIndex ending in symbol i, the wireless device can be scheduled to receive a PDSCH starting earlier than the end of the first PDSCH with a PDCCH associated with a different value of CORESETpoolIndex that ends later than symbol i; in a given scheduled cell, the wireless device can receive a first PDSCH in slot i, with the corresponding HARQ-ACK assigned to be transmitted in slot j, and a second PDSCH associated with a value of CORESETpoolIndex different from that of the first PDSCH starting later than the first PDSCH with its corresponding HARQ-ACK assigned to be transmitted in a slot before slot j.

If a wireless device is configured by a higher layer parameter PDCCH-Config that contains two different values of CORESETPoolIndex in ControlResourceSet, then if either: 1) tci-PresentInDCI is set to 'enabled'; or 2) tci-PresentInDCI is not configured in RRC connected mode, and if the offset between the reception of the DL DCI and the corresponding PDSCH is less than the threshold timeDurationForQCL, then the wireless device may assume that the DM-RS ports of PDSCH associated with a value of CORESETPoolIndex of a serving cell are quasi co-located with the RS(s) with respect to the QCL parameter(s) used for PDCCH quasi co-location indication of the CORESET associated with a monitored search space with the lowest CORESET-ID among CORESETs, which are configured with the same value of CORESETPoolIndex as the PDCCH scheduling that PDSCH, in the latest slot in which one or more CORESETs, associated with the same value of CORESETPoolIndex as the PDCCH scheduling that PDSCH within the active BWP of the serving cell, are monitored by the wireless device. Additionally, if the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint indicates two TCI states, then the wireless device may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states.

FIG. 34B shows an example of a communication between a base station (equipped with multiple TRPs) and a wireless device (equipped with single panel or multiple panels) based on inter-cell TRPs (or inter-PCI TRPs). Different from FIG. 34A, the multiple TRPs are associated with different PCIs, and may be associated with (or belong to) different physical cells (Cell 1 with PCI 1 and Cell 2 with PCI 2), which may be referred to as inter-cell TRPs (or inter-PCI TRPs). A cell may be a serving cell or a non-serving (neighbor) cell of the wireless device. When operating the inter-cell TRPs for a wireless device, a base station may configure Cell 2 with PCI 2 as a part of Cell 1 with PCI 1 (e.g., a second TRP with a second PCI different from a first PCI of a first TRP), in which case, the wireless device may receive $1^{st}$ SSBs from Cell 1 with PCI 1 and receive $2^{nd}$ SSBs from Cell 2 with PCI 2. The $1^{st}$ SSBs and the $2^{nd}$ SSBs may have different configuration parameters, wherein the configuration parameters may be implemented based on example embodiments described above with respect to FIG. 18, FIG. 19, and/or FIG. 20. With the inter-cell TRPs, the wireless device may receive PDCCHs/PDSCHs and/or transmit PUCCH/PUSCHs on Cell 1 with PCI1 and Cell 2 with PCI 2 with different TCI states (e.g., one being associated with one of the $1^{st}$ SSBs, another being associated with one of the $2^{nd}$ SSBs, etc.).

A serving cell may be a cell (e.g., PCell, SCell, PSCell, etc.) on which the wireless device receives SSB/CSI-RS/PDCCH/PDSCH and/or transmits PUCCH/PUSCH/SRS etc. The serving cell is identified by a serving cell index (e.g., ServCellIndex or SCellIndex configured in RRC message).

A non-serving (or neighbor) cell may be a cell on which the wireless device does not receive PDCCH/PDSCH and/or does not transmit PUCCH/PUSCH/SRS etc. The non-serving cell has a physical cell identifier (PCI) different from a PCI of a serving cell. The non-serving cell may not be identified by a serving cell index (e.g., ServCellIndex or SCellIndex). The wireless device may rely on a SSB of a non-serving cell for Tx/Rx beam (or spatial domain filter) determination (for PDCCH/PDSCH/PUCCH/PUSCH/CSI-RS/SRS for a serving cell, etc.) if a TCI state of the serving cell is associated with (e.g., in TCI-state IE of 3GPP TS 38.331) a SSB of the non-serving cell. The base station does not transmit RRC messages configuring resources of PDCCH/PDSCH/PUCCH/PUSCH/SRS of a non-serving cell for the wireless device.

As shown in FIG. 34B, for a specific wireless device, Cell 1 may be a serving cell and is associated with a first TRP (TRP 1). Cell 2 may be a non-serving (or neighbor) cell and is associated with a second TRP. A base station may transmit, to a wireless device, one or more RRC messages including configuration parameters of Cell 1. The configuration parameters of Cell 1 may indicate a plurality of additional PCI configurations (e.g., SSB-MTC-AdditionalPCI IE) for a plurality of (non-serving or neighbor) cells for cell 1, with each additional PCI configuration corresponding to a (non-serving or neighbor) cell having a PCI different from the PCI value of the serving cell, and comprising: an additional PCI index (AdditionalPCIIndex) identifying the additional PCI configuration, a PCI of the non-serving cell, a SSB periodicity indication, position indications of (candidate) SSBs in a SSB burst, a transmission power indication of SSBs, etc. The configuration parameter of Cell 1 may further indicate a plurality of TCI states. Each TCI state of the plurality of TCI states may be associated with one or more TCI parameters comprising a TCI state identifier identifying the TCI state, one or more QCL information parameters comprising a SSB index identifying the SSB and a QCL type indicator indicating a QCL type of a plurality of QCL types, e.g., if the SSB is transmitted via Cell 1 (or in another serving cell). If a SSB of a TCI state is transmitted via a non-serving (neighbor) cell, the TCI state may be further associated with an additional PCI index (AdditionalPCIIndex) indicating a (non-serving or neighbor) cell configured in the SSB-MTC-AdditionalPCI IE. Similar to intra-cell multiple TRPs, the wireless device may receive downlink signals and/or transmit uplink signals based on a TCI state (activated/indicated) associated with a TRP. The difference between intra-cell multiple TRPs and inter-cell multiple TRPs is that a reference RS of a TCI state for a serving cell may come from (or be transmitted via) a (non-serving or neighbor) cell for inter-cell multiple TRPs configuration. A SSB may be implemented based on example embodiments described above with respect to FIG. 18, FIG. 19, and/or FIG. 20.

In the example of FIG. 34B, Cell 1 is a serving cell for a wireless device. Cell 2 is a (non-serving or neighbor) cell associated with Cell 1 for the wireless device. Cell 2 may be a serving cell for a second wireless device. Cell 1 may be a (non-serving or neighbor) cell for the second wireless device. Different wireless devices may have different serving cells and non-serving/neighbor cells.

The base station may use both TRPs for transmissions via Cell 1 to a wireless device. The base station may indicate (by DCI/MAC CE) a first TCI state associated with an SSB/CSI-RS transmitted via Cell 1 (or another serving cell) for a first transmission (via PDCCH/PDSCH/PUSCH/PUCCH/SRS resources of Cell 1) to the wireless device. In addition, the base station may indicate (by the same DCI/MAC CE or another DCI/MAC CE) a second TCI state associated with a second SSB transmitted via Cell 2 (which is the non-serving/neighbor) cell indicated by AdditionalPCIIndex in TCI configuration parameters) for a second transmission (via PDCCH/PDSCH/PUSCH/PUCCH/SRS resources of Cell 1) to the wireless device. The second SSB transmitted via Cell 2 is different from the first SSB transmitted via Cell 1. Using two TCI states from two TRPs (one is from a serving cell and another is from a non-serving/neighbor cell) may avoid executing time-consuming handover (HO) between Cell 1 to Cell 2 and improve coverage if the wireless device is moving at the edge of Cell 1 and Cell 2.

In the examples of FIG. 34A and FIG. 34B, a wireless device may be provided two TCI states, each TCI state corresponding to a TRP of multiple TRPs. A TCI state may be referred to as a channel-specific TCI state, if the TCI state is used for a specific channel (e.g., PDSCH/PDCCH/PUCCH/PUSCH), where different channels may be associated with different channel-specific TCI states. A TCI state may be referred to as a unified TCI state, if the TCI state is used for multiple channels (e.g., PDSCH/PDCCH/PUCCH/PUSCH), where different channels may be associated with the same unified TCI state. The base station may transmit RRC messages indicating whether a TCI state is a unified TCI state for the wireless device.

Based on FIG. 34A and FIG. 34B, a base station may perform data/signaling transmissions based on intra-cell multiple TRPs (e.g., which may be referred to as Intra-cell M-TRP or Intra-PCI M-TRP) for a wireless device, e.g., when the wireless device is close to the center of a cell, has more data to deliver and/or requires high reliability (e.g., for URLLC service). The base station may perform data/signaling transmissions based on inter-cell multiple TRPs (e.g., which may be referred to as Inter-cell M-TRP or Inter-PCI M-TRP) for a wireless device, e.g., when the wireless device is at the edge of a cell and is (moving or located) in the coverage of another cell (which may be or may not be a serving cell of the wireless device), as shown in FIG. 34B.

In at least some wireless communications, a base station may enable a power saving operation for a wireless device due to limited battery capacity of the wireless device, e.g., based on BWP management (e.g., as shown in FIG. 25), SCell dormancy mechanism (e.g., as shown in FIG. 27), wake-up/go-to-sleep indication to indicate to the wireless device whether to wake up during the next DRX on duration to monitor the PDCCH, etc. However, a base station, when indicating a power saving operation for a wireless device (e.g., based on example embodiments described above with respect to FIG. 25 and FIG. 27), may not be able to reduce power (and save energy) of network devices of the base station. For example, the base station may be required to transmit some always-on downlink signals periodically (e.g., SSB, MIB, SIB1, SIB2, periodic CSI-RS, etc.) in some time period(s) even when there is no active wireless device transmitting to/receiving from the base station. The base station may be required to transmit these always-on downlink signals when the base station transitions a cell into a dormant state by switching an active BWP to a dormant BWP of the cell, e.g., based on example embodiments described above with respect to FIG. 27.

In at least some wireless communications, if a base station needs to reduce periodicity of the always-on downlink signal transmission for network energy saving, the base station may transmit a RRC message (e.g., SIB1) indicating a longer periodicity for the always-on downlink signal transmission. A base station, before determining to power off (e.g., both RF modules and base band units (BBUs)) for network energy saving, may transmit RRC reconfiguration messages to each wireless device in a source cell (e.g., PCell) to indicate a handover to a neighbor cell (e.g., a second PCell).

FIG. 35 shows an example HO procedure from a source base station (e.g., source gNB or a first PCell of the base station) to a target base station (e.g., target gNB or a second PCell of the target base station) for a wireless device. For network-controlled mobility in RRC_CONNECTED, the PCell may be changed using an RRC connection reconfiguration message 3501 (e.g., RRCReconfiguration) including reconfigurationWithSync (in NR specifications) or mobilityControlInfo in LTE specifications (handover). The SCell(s) may be changed using the RRC connection reconfiguration message 3501 either with or without the reconfigurationWithSync or mobilityControlInfo. The network (e.g., source gNB) may trigger the HO procedure, e.g., based on radio conditions, load, QoS, UE category, and/or the like. The RRC connection reconfiguration message 3501 may be implemented based on example embodiments which will be described later in FIG. 36 and FIG. 37.

As shown in FIG. 35, the network may configure the wireless device to perform measurement reporting (possibly including the configuration of measurement gaps). The measurement reporting is a layer 3 reporting, different from layer 1 CSI reporting. The wireless device may transmit one or more measurement reports 3502 to the source gNB (or source PCell of the source gNB). The network may initiate HO blindly, which means without having received measurement reports 3502 from the wireless device. Before sending the message 3501 (which may be a HO message) to the wireless device, the source gNB may prepare one or more target cells. The source gNB may select a target PCell from the one or more target cells.

As shown in FIG. 35, based on the one or more measurement reports 3502 from the wireless device, the source gNB may provide the target gNB with a list of candidate cells on each frequency for which measurement information is available, for example, in order of decreasing RSRP values (which may indicate quality of connection). The source gNB may also include available measurement information for the cells provided in the list. The target gNB may decide which cells are configured for use after HO, which may include cells other than the ones indicated by the source gNB. As shown in FIG. 35, the source gNB may transmit the information above in a HO request 3503 that is sent to the target gNB. The target gNB may respond with a HO acknowledgement (ACK) message 3504. In an example, in the HO ACK message 3504, the target gNB may indicate access stratum configuration to be used in the target cell(s) for the wireless device.

The source gNB may transparently (for example, does not alter values/content) forward the HO ACK message 3504 (or its information) received from the target gNB to the wireless device. In the HO message 3501 sent to the wireless device, RACH resource configuration may be configured for the wireless device to access a target cell (as a PCell) in the target gNB. When appropriate, the source gNB may initiate data forwarding for (a subset of) the dedicated radio bearers.

As shown in FIG. 35, after receiving the HO message 3501, the wireless device may start a HO timer (e.g., T304) with an initial timer value. The HO timer may be configured in the HO message 3501. Based on the HO message 3501, the wireless device may apply the RRC parameters of a target PCell and/or a cell group (MCG/SCG) associated with the target PCell of the target gNB and perform downlink synchronization to the target gNB (e.g., as described above with respect to FIGS. 17-23). After or in response to performing downlink synchronization (e.g., searching a suitable/detectable SSB from candidate SSBs configured on the target gNB, based on examples of FIG. 19 and/or FIG. 20) to the target gNB, the wireless device may initiate a random access (e.g., contention-free, or contention-based, based on examples of FIG. 13A, FIG. 13B, and/or FIG. 13C) procedure attempting to access the target gNB at the available RACH occasion according to a RACH resource selection, where the available RACH occasion may be configured in the RACH resource configuration (e.g., based on example embodiments of FIG. 37 which will be described later). When allocating a dedicated preamble for the random access in the target gNB, RAN may ensure the preamble is available from the first RACH occasion the wireless device may use.

The wireless device may release RRC configuration parameters of the source PCell and an MCG/SCG associated with the source PCell.

A HO triggered by receiving a RRC reconfiguration message (e.g., RRCReconfiguration) comprising the HO command/message (e.g., by including reconfigurationWith-Sync (in NR specifications) or mobilityControlInfo in LTE specifications (handover)) is referred to as a normal HO, or an unconditional HO, which is contrast with a conditional HO (CHO), which will be described later in FIG. 38.

Figure 37:
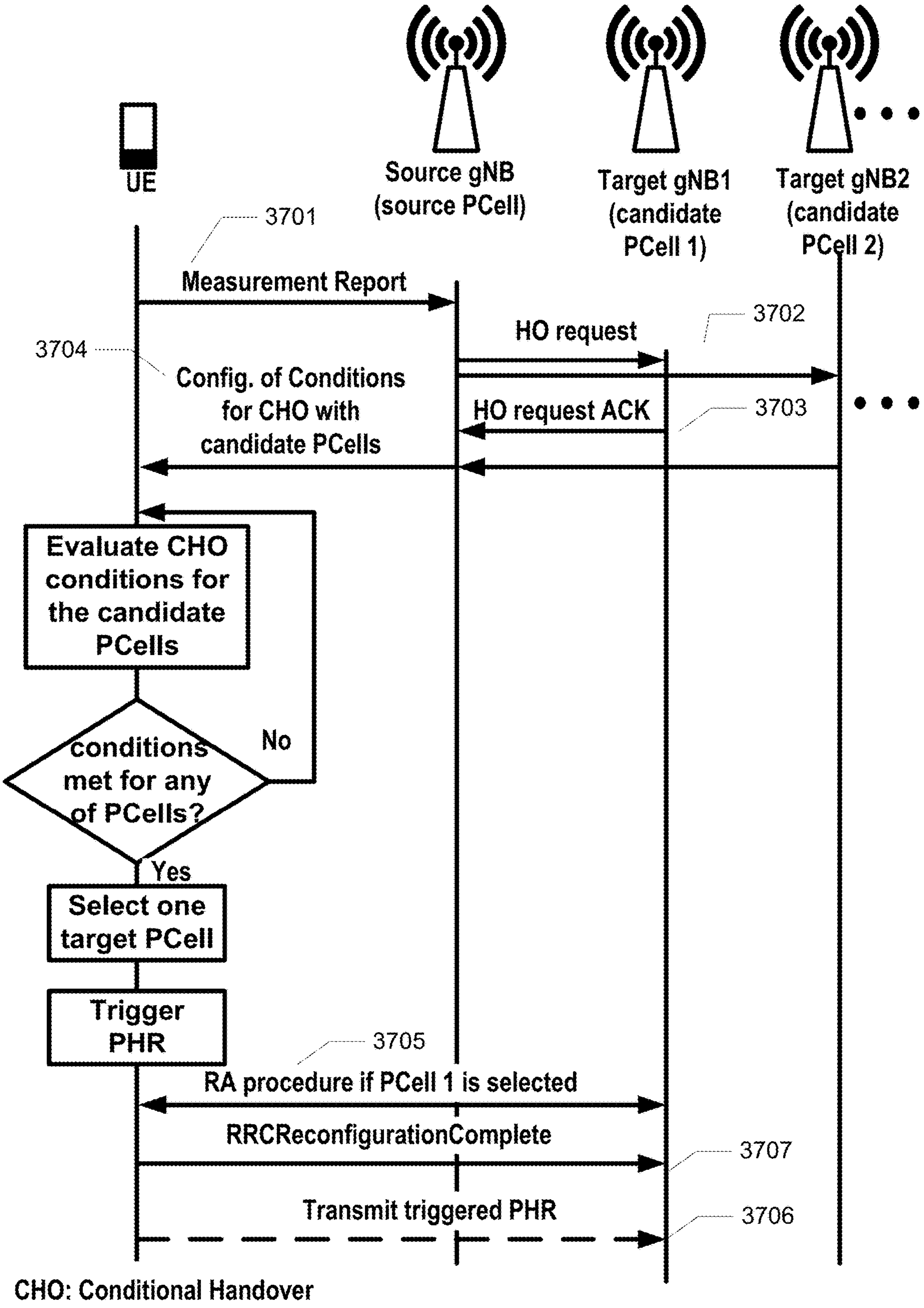
FIG. 37 is a diagram showing an example conditional handover (CHO) procedure.

As shown in FIG. 35, the wireless device may transmit a preamble 3505 to the target gNB via a RACH resource. The RACH resource may be selected from a plurality of RACH resources (e.g., configured in rach-ConfigDedicated IE as shown in FIG. 36 and FIG. 37) based on SSBs/CSI-RSs measurements of the target gNB. The wireless device may select a (best, e.g., highest strength or RSRP) SSB/CSI-RS of the configured SSBs/CSI-RSs of the target gNB. The wireless device then determines a RACH occasion (e.g., time domain resources, etc.) associated with the selected SSB/CSI-RS and determines the preamble associated with the selected SSB/CSI-RS.

The target gNB may receive the preamble 3505 transmitted from the wireless device. The target gNB may transmit a random access response (RAR) 3506 to the wireless device, where the RAR 3506 comprises the preamble 3505 transmitted by the wireless device. The RAR 3506 may further comprise a TAC to be used for uplink transmission via the target PCell. In response to receiving the RAR 3506 comprising the preamble, the wireless device may complete the random access procedure. In response to completing the random access procedure, the wireless device may stop the HO timer (T304). The wireless device may transmit an RRC reconfiguration complete message 3507 to the target gNB, after completing the random access procedure, or before completing the random access procedure. The wireless device, after completing the random access procedure towards the target gNB, may apply first parts of CQI reporting configuration, SR configuration and SRS configuration that do not require the wireless device to know a system frame number (SFN) of the target gNB. The wireless device, after completing the random access procedure towards the target PCell, may apply second parts of measurement and radio resource configuration that require the wireless device to know the SFN of the target gNB (e.g., measurement gaps, periodic CQI reporting, SR configuration, SRS configuration), upon acquiring the SFN of the target gNB.

Based on HO procedure (e.g., as shown in FIG. 35), for network energy saving purpose, a base station may instruct each wireless device in a source cell to perform a 4-step or 2-step RACH-based (contention free) HO to a neighbor cell. After the wireless devices complete the HO procedure to neighbor cells, the base station may turn off (RF parts and BBUs, etc.) for energy saving.

The RRC reconfiguration message 3501, received from the source base station, may include configuration parameters for PHR functionality (e.g., comprised in mac-Cell-GroupConfig, and these parameters are described above with respect to FIG. 32A and FIG. 32B). The wireless device (e.g., the RRL layer of the wireless device) may reset the MAC entity in response to these configuration parameters received in the RRC reconfiguration message 3501. Based on the RRC reconfiguration message 3501 being processed by the RRC layer (e.g., upper layer of the wireless device), PH functionality may be configured or reconfigured according to these configuration parameters, as will be further described below with respect to FIG. 45. The MAC entity being reset may cause a triggered PHR procedure (e.g., for the old PCell and/or SCells) to be cancelled. As described with respect to FIG. 32B, the wireless device may trigger PHR for the target PCell in response to the parameters of the PHR functionality being configured or reconfigured (e.g., by the upper layers). After triggering the PHR, the wireless device may obtain a PH value and transmit the PHR via a PHR MAC CE 3508, as will be further described below with respect to FIG. 45. The MAC entity may obtain uplink resources such as an uplink grant (e.g., from the target PCell after the wireless device completes the handover to the target PCell); therefore, the wireless device may transmit the PHR MAC CE 3508 after successful RAR transmission or after transmission of RRCReconfigurationComplete, after which the wireless device may establish an RRC connection with the target PCell.

FIG. 36 shows an example embodiment of RRC message for HO. In the example of FIG. 36, a base station may transmit, and/or a wireless device may receive, a RRC reconfiguration message (e.g., RRCReconfiguration-IEs) indicating an RRC connection modification. It may convey information for measurement configuration, mobility control, radio resource configuration (including RBs, MAC main configuration and physical channel configuration) and AS security configuration. The RRC reconfiguration message may comprise a configuration of a master cell group (masterCellGroup). The master cell group may be associated with a SpCell (SpCellConfig). If the SpCellConfig comprises a reconfiguration with Sync (reconfigurationWith-Sync), the wireless device determines that the SpCell is a target PCell for the HO. The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. A dedicated RACH resource may comprise one or more RACH occasions, one or more SSBs, one or more CSI-RSs, one or more RA preamble indexes, etc. The RRCReconfiguration message may include configuration parameters of a master cell group (masterCellGroup) that may include a MAC-CellGroupConfig IE that includes configuration parameters for PHR functionality (phr-Config), such as the PHR configuration parameters described above with respect to FIG. 32B.

Executing the HO triggered by receiving a RRC reconfiguration message comprising a reconfigurationWithSync IE may introduce HO latency (e.g., too-late HO), e.g., if a wireless device is moving in a network deployed with multiple small cells (e.g., with hundreds of meters of cell coverage of a cell). An improved HO mechanism, based on measurement event triggering, is proposed to reduce the HO latency. An example of this improved mechanism is shown in FIG. 37.

FIG. 37 shows an example embodiment of a conditional handover (CHO) procedure. As shown, the network (e.g., a base station, a source gNB) may configure the wireless device to perform measurement reporting (possibly including the configuration of measurement gaps) for a plurality of neighbor cells (e.g., cells from a candidate target gNB 1, a candidate target gNB 2, etc.). The measurement reporting is a layer 3 reporting, different from layer 1 CSI reporting. The wireless device may transmit one or more measurement reports 3701 to the source gNB (or source PCell).

As shown in FIG. 37, based on the one or more measurement reports 3701 from the wireless device, the source gNB may provide the target gNB with a list of best cells on each frequency for which measurement information is available, for example, in order of decreasing RSRP. The source gNB may also include available measurement information for the cells provided in the list. The target gNB may decide which cells are configured for use after the CHO, which may include cells other than the ones indicated by the source gNB. As shown in FIG. 37, the source gNB may transmit the above information in a HO request 3702 to the target gNB. The target gNB may respond with a HO request ACK message 3703. In the HO request ACK message 3703, the target gNB may indicate access stratum configuration (e.g., RRC configurations of the target cells) to be used in the target cell(s) for the wireless device.

The source gNB may transparently (for example, does not alter values/content) forward 3704, to the wireless device, the handover information received from the target gNB (e.g., information contained in HO request ACK message 3703 or RRC reconfiguration messages from the target gNB).

The source gNB may configure a CHO procedure different from a normal HO procedure (e.g., as shown in FIG. 35 and/or FIG. 36), by sending a conditional reconfiguration message 3704 (e.g., conditionalReconfiguration IE in a RRC reconfiguration message, which will be described later in FIG. 38). The conditional reconfiguration message 3704 may comprise a list of candidate target PCells, each candidate target PCell being associated with dedicated RACH resources for the RA procedure in case a CHO is executed to the candidate target PCell, a CHO execution condition (or RRC reconfiguration condition) for each of the candidate target PCells, etc. A CHO execution condition may comprise a measurement event A3 where a candidate target PCell becomes amount of offset better than the current PCell (e.g., the PCell of the source gNB), a measurement event A4 where a candidate target PCell becomes better than absolute threshold configured in the conditional reconfiguration message 3704, a measurement event A5 where the current PCell becomes worse than a first absolute threshold and a candidate target PCell becomes better than a second absolute threshold, etc.

In the example of FIG. 38, the wireless device, according to the received conditional reconfiguration message 3704 comprising parameters of a CHO procedure, may evaluate the (RRC) reconfiguration conditions for the list of candidate target PCells and/or the current/source PCell. The wireless device may measure RSRP/RSRQ of SSBs/CSI-RSs of each candidate target PCell of the list of candidate target PCells. Different from the normal HO procedure described in FIG. 35, the wireless device does not execute HO to the target PCell in response to receiving the conditional reconfiguration message 3704 comprising the parameters of the CHO procedure. The wireless device may execute the HO to a target PCell for the CHO only when the (RRC) reconfiguration condition(s) of the target PCell are met (or satisfied). Otherwise, the wireless device may keep evaluating the reconfiguration conditions for the list of the candidate target PCells, e.g., until an expiry of a HO timer, or receiving a RRC reconfiguration indicating an abort of the CHO procedure.

In the example of FIG. 37, in response to a reconfiguration condition of a first candidate target PCell (e.g., PCell 1) being met or satisfied, the wireless device may execute the CHO procedure towards the first candidate target PCell. The wireless device may select one of multiple candidate target PCells when the multiple candidate target PCells have reconfiguration conditions satisfied or met.

Executing the CHO procedure towards the first candidate target PCell may be the same as or similar to executing the HO procedure as shown in FIG. 35. By executing the CHO procedure, the wireless device may release RRC configuration parameters of the source PCell and the MCG associated with the source PCell, apply the RRC configuration parameters of the PCell 1, reset MAC (which may cause PHR functionality to be configured or reconfigured), perform cell group configuration for the received MCG comprised in the RRC reconfiguration message of the PCell 1, and/or perform RA procedure 3705 with the PCell 1, etc. The PHR may be triggered based on the target PCell being selected. Similar to FIG. 35, the PHR may be transmitted 3706, e.g., via a MAC CE, using uplink resources (e.g., an uplink grant configured by the selected candidate PCell 1). Therefore, the PHR may be transmitted 3706, e.g., after the RA procedure 3705 completes and/or after the wireless device transmits a RRCReconfigurationComplete message 3707 to the selected target gNB.

The MCG of the RRC reconfiguration message of the PCell 1 (e.g., comprised in messages 3703 and 3704) may be associated with a SpCell (SpCellConfig) on the target gNB 1. If the sPCellConfig comprises a reconfiguration with Sync (reconfigurationWithSync), the wireless device determines that the SpCell is a target PCell (PCell 1) for the HO. The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. A dedicated RACH resource may comprise one or more RACH occasions, one or more SSBs, one or more CSI-RSs, one or more RA preamble indexes, etc. The wireless device may perform cell group configuration for the received master cell group comprised in the RRC reconfiguration message of the PCell 1 on the target gNB 1 according to the example embodiments described above with respect to FIG. 35.

FIG. 38 shows an example of an RRC message for CHO. As shown, a base station may transmit, and/or a wireless device may receive, a RRC reconfiguration message (e.g., RRCReconfiguration-V1610-IEs) indicating an RRC connection modification. The RRC reconfiguration message may be comprised in a (parent) RRC reconfiguration message (e.g., RRCReconfiguration-IEs) as shown in FIG. 36, where the (parent) RRC reconfiguration message may comprise (L3 beam/cell) measurement configuration (e.g., measConfig IE).

In the example of FIG. 38, the RRC reconfiguration message (e.g., RRCReconfiguration-V1610-IEs) may comprise a conditional reconfiguration IE (conditionalReconfiguration IE). The conditional reconfiguration IE may comprise a list of conditional reconfigurations (condReconfigToAddModList). Each conditional reconfiguration corresponds to a respective candidate target cell (PCell) of a list of candidate target cells. For each conditional reconfiguration of the list of conditional reconfigurations, the base station may indicate one or more measurement events (condExecutionCond) for triggering the CHO on the candidate target PCell, a RRC reconfiguration message (condRRCReconfig) of a candidate target cell (PCell) which is received by the source gNB from the target gNB via X2/Xn interface. The RRC reconfiguration message of the candidate target cell may be implemented based on example embodiments described above with respect to FIG. 36. The RRC reconfiguration message may comprise a configuration of a master cell group (masterCellGroup) for the target gNB. The master cell group may be associated with a SpCell (SpCellConfig). When the sPCellConfig comprises a reconfiguration with Sync (reconfigurationWithSync), the SpCell is a target PCell for executing the CHO. The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. A dedicated RACH resource may comprise one or more RACH occasions, one or more SSBs, one or more CSI-RSs, one or more RA preamble indexes, etc. In an example, the master cell group (masterCellGroup) parameter may include a MAC-CellGroupConfig IE that includes configuration parameters for PHR functionality (phr-Config), such as the PHR configuration parameters described above with respect to FIG. 32B.

In the example of FIG. 38, a measurement event (condExecutionCond) for triggering the CHO on the candidate target PCell is an execution condition that needs to be fulfilled (at the wireless device) in order to trigger the execution of a conditional reconfiguration for CHO. The indication of the measurement event may point to a measurement ID (MeasId) which identifies a measurement configuration of a plurality of measurement configurations (e.g., comprised in measConfig IE) configured by the source gNB. The measurement configuration may be associated with a measurement event (or a conditional event) of a plurality of measurements. A conditional event may comprise a conditional event A3, conditional event A4, and/or conditional event A5, etc. A conditional event A3 is that a candidate target PCell becomes amount of offset better than the current PCell (e.g., the PCell of the source gNB). A conditional event A4 is that a candidate target PCell becomes better than an absolute threshold configured in the RRC reconfiguration message. A conditional event A5 is that the current PCell becomes worse than a first absolute threshold and a candidate target PCell becomes better than a second absolute threshold, etc. In some embodiments, when the conditional reconfiguration for CHO to a selected target PCell (the candidate PCell 1) is executed, the configuration parameters of PHR function (e.g., comprised in mac-CellGroupConfig) may be reconfigured which may trigger a PHR for the selected target PCell. The PHR, for the candidate PCell 1 of target gNB1, may be triggered in response to the conditional reconfiguration for CHO to a selected target PCell being executed based on the RRC reconfiguration message, for CHO, including configuration parameters for PHR functionality (much like in HO procedure in FIG. 35) and/or the candidate target PCell being selected as the PCell (to be activated/used). For example, the conditional reconfiguration for CHO (and/or the target PCell being selected) may cause the PHR functionality to be (re)configured by the upper layers (e.g., RRC layer). The MAC entity may obtain uplink resources such as an uplink grant (e.g., from the target PCell after the wireless device completes the handover to the target PCell); therefore, the wireless device may transmit the PHR MAC CE after successful RAR transmission or after transmission of RRCReconfigurationComplete, after which the wireless device may establish an RRC connection with the target PCell.

Executing CHO by the wireless device's decision based on evaluating reconfiguration conditions (long-term and/or layer 3 beam/cell measurements against one or more configured thresholds) on a plurality of candidate target cells may cause load unbalanced on cells, and/or lead to CHO failure in case that the target cell changes its configuration (e.g., for network energy saving) during the CHO condition evaluation, etc. An improved handover based on layer 1/2 signaling triggering is proposed in FIG. 39. A layer 1 signaling may comprise a DCI transmitted via a PDCCH. A layer 2 signaling may comprise a MAC CE scheduled by a DCI. Layer 1/2 signaling is different from Layer 3 signaling, for HO/CHO, which comprises RRC reconfiguration message. Although the layer 1/2 triggering a PCell change/switching may enhance CHO, its impact on PHR should be considered.

Figure 39:
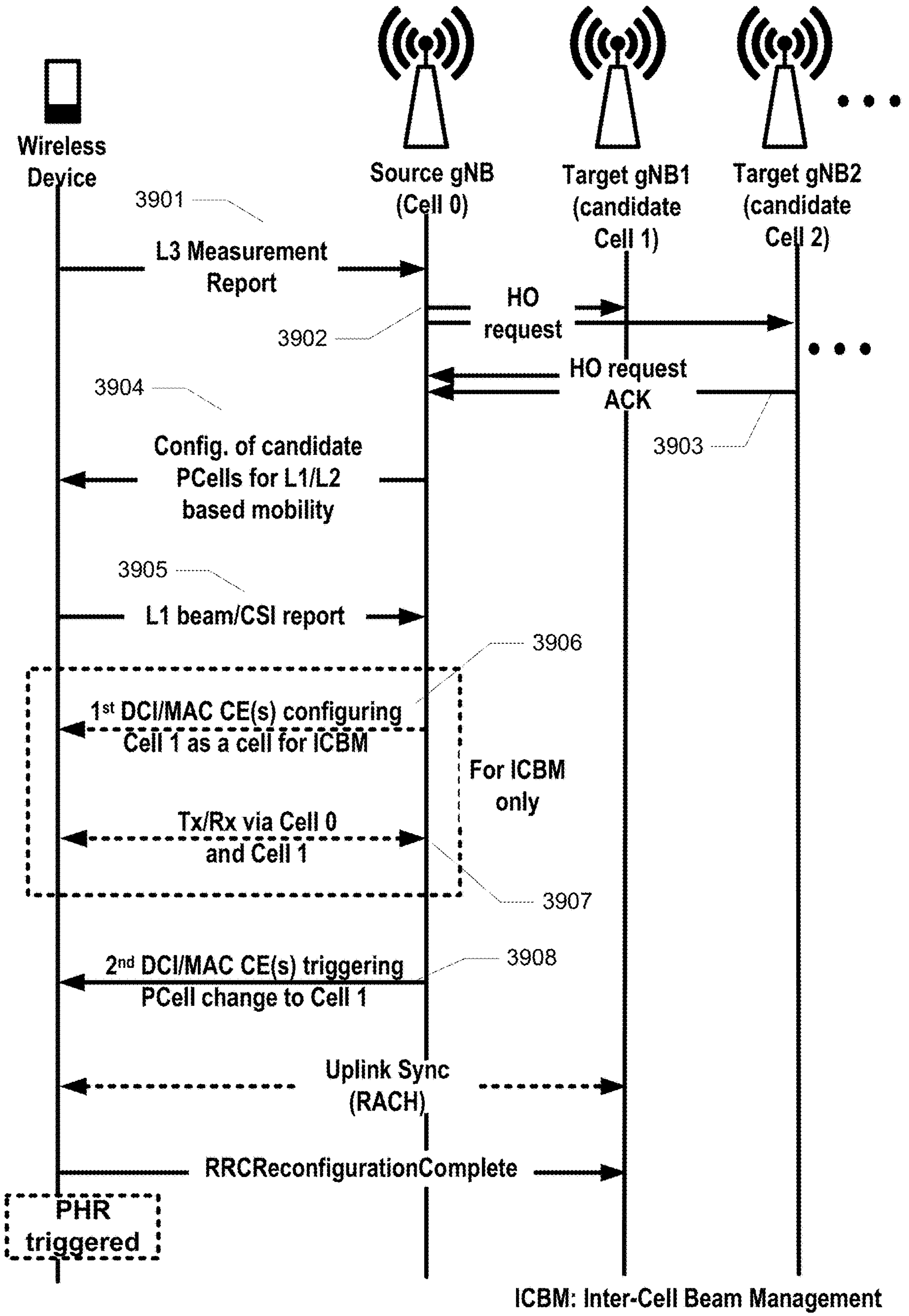
FIG. 39 is a diagram showing an example layer 1/2 triggered HO procedure.

FIG. 39 shows an example of layer 1/2 triggered HO procedure. As shown in FIG. 39, the network (e.g., a base station, a source gNB) may configure the wireless device to perform measurement reporting (possibly including the configuration of measurement gaps) for a plurality of neighbor cells (e.g., cells from a candidate target gNB 1, a candidate target gNB 2, etc.). The measurement reporting is a layer 3 reporting, different from layer 1 CSI reporting. The wireless device may transmit one or more measurement reports 3901 to the source gNB (or source PCell, cell 0 in FIG. 42).

As shown in FIG. 39, based on the one or more measurement reports from the wireless device, the source gNB may provide the target gNB with a list of (highest signal strength/signal quality) cells on each frequency for which measurement information is available, for example, in order of decreasing RSRP. The source gNB may also include available measurement information for the cells provided in the list. The target gNB may decide which cells are configured for use (as a target PCell, and/or one or more SCells) after HO, which may include cells other than the ones indicated by the source gNB. As shown in FIG. 39, the source gNB may transmit the above information in a HO request 3902 to the target gNB (or to multiple target gNBs). The target gNB may respond by sending a HO request ACK message 3903. In the HO request ACK message 3903, the target gNB may indicate access stratum configuration (e.g., RRC configurations of the target cells) to be used in the target cell(s) for the wireless device.

The source gNB may transparently (for example, does not alter values/content) forward 3904, to the wireless device, the handover information received from the target gNB (e.g., information contained in HO request ACK message 3903 or RRC reconfiguration messages from the target gNB, cell group configuration IE of the target gNB, and/or SpCell configuration IE of a target PCell/SCells of the target gNB).

The source gNB may configure a Layer 1/2 signaling based HO (PCell switching/changing, mobility, etc.) procedure different from a normal HO procedure (e.g., as shown in FIG. 35 and/or FIG. 36) and/or a CHO procedure (e.g., as shown in FIG. 37 and/or FIG. 38), by comprising a Layer 1/2 candidate PCell configuration message (e.g., a newly defined candidates-L1L2-Config IE) in a RRC reconfiguration message 3904 from the source gNB. The Layer 1/2 candidate PCell configuration message may comprise a list of candidate target PCells, each candidate target PCell being associated with dedicated RACH resources for the RA procedure in case a Layer 1/2 signaling based HO is trigged by a Layer 1/2 signaling and executed to the candidate target PCell, etc. There may be multiple options for parameter configurations of a candidate target PCell.

As a first option for the parameter configuration, for each candidate target PCell, the RRC reconfiguration message 3904 from the source gNB may comprise a (capsuled) RRC reconfiguration message (e.g., RRCReconfiguration), of a candidate target gNB, received by the source gNB from a candidate target gNB via X2/Xn interface. The (capsuled) RRC reconfiguration message, of the candidate target gNB, may reuse the same signaling structure of the RRC reconfiguration message 3904 from the source gNB, as shown in FIG. 36.

As a second option for the parameter configuration, for each candidate target PCell, the RRC reconfiguration message 3904 from the source gNB may comprise a (capsuled) cell group configuration message (e.g., CellGroupConfig), of a candidate target gNB, received by the source gNB from a candidate target gNB via X2/Xn interface. The (capsuled) cell group configuration message, of the candidate target gNB, may reuse the same signaling structure of the cell group configuration message of the source gNB, as shown in FIG. 36. The second option may reduce signaling overhead of the parameter configuration of a candidate target PCell compared with the first option.

As a third option for the parameter configuration, for each candidate target PCell, the RRC reconfiguration message 3904 from the source gNB may comprise a (capsuled) SpCell configuration message (e.g., SpCellConfig), of a candidate target gNB, received by the source gNB from a candidate target gNB via X2/Xn interface. The (capsuled) SpCell configuration message, of the candidate target gNB, may reuse the same signaling structure of the SpCell configuration message of the source gNB, as shown in FIG. 36. The third option may reduce signaling overhead of the parameter configuration of a candidate target PCell compared with the second option.

For each candidate target PCell, the source gNB may indicate cell common and/or UE specific parameters (e.g., SSBs/CSI-RSs, BWPs, RACH resources, PDCCH/PDSCH/PUCCH/PUSCH resources etc.).

In the example of FIG. 39, the wireless device, according to the received RRC reconfiguration message 3904 comprising parameters of a Layer 1/2 signaling based HO procedure, may send a Layer 1/2 measurement report 3905 (CSI/beam) for the list of candidate target PCells and/or the current PCell. The layer 1/2 measurement report 3905 may comprise layer 1 RSRP, layer 1 RSRQ, PMI, RI, layer 1 SINR, CQI, etc.

The Layer 1/2 measurement report 3905 may be transmitted with a periodicity configured by the source gNB.

The layer 1/2 measurement report 3905 may be triggered when the measurement of the CSI/beam of a candidate target PCell is greater than a threshold, or (amount of offset) greater than the current PCell, etc.

In the example of FIG. 39, the base station may perform an inter-cell beam management (ICBM) procedure before transmitting a Layer 1/2 signaling triggering the HO procedure comprising switching PCell from the source gNB to a target gNB. The ICBM procedure may allow the base station and the wireless device to use resources (time/frequency/spatial) of the target gNB (or a PCell/SCell of the target gNB) without executing HO procedure to the target gNB, therefore reducing frequently executing the HO procedure. The ICBM procedure may allow the base station and the wireless device to synchronize time/frequency/beam to a target PCell of the target gNB before executing the HO, which may reduce HO latency. The ICBM may be implemented based on example embodiments of FIG. 40 which will be described later.

In the example of FIG. 39, in response to the ICBM procedure being configured, the source gNB may transmit, to the wireless device, a first DCI/MAC CE 3906 configuring/indicating a first candidate target cell (e.g., Cell 1) of the candidate target cells (PCells/SCells) as a neighbor or non-serving cell, in addition to the current PCell (e.g., Cell 0), for the wireless device. The base station may select the first candidate target cell from the candidate target cells, based on the layer 1/2 measurement report 3905 from the wireless device.

The first DCI/MAC CE 3906 (e.g., activating TCI states) may indicate that a reference RS (e.g., SSB/CSI-RS) associated with a first TCI state is from the first candidate target cell (Cell 1) (e.g., by associating the reference RS with an additional PCI different from a PCI of the Cell 0), in addition to a reference RS associated with a second TCI state being from the current PCell (Cell 0). Association between a reference signal and a TCI state may be implemented based on example embodiments described above with respect to FIG. 34B. Activating, by a DCI/MAC CE, a TCI state with a RS of a neighbor (non-serving) cell as a reference RS, may allow the base station to use a beam of the neighbor cell to transmit downlink signals/channels or to receive uplink signals/channels, and/or use a beam of the current cell for the transmissions/receptions, without performing HO to the neighbor cell for the transmissions/receptions.

In the example of FIG. 39, the wireless device, in response to receiving the first DCI/MAC CE 3906, may apply 3907 the first TCI state and the second TCI state for downlink reception and/or uplink transmission.

Applying 3907 the first TCI state and the second TCI state for downlink reception may comprise: receiving (from Cell 1) PDCCH/PDSCH/CSI-RS with a reception beam/filter same as that for receiving the reference signal, transmitted from Cell 1, according to (or associated with) the first TCI state, and receiving (from cell 0) PDCCH/PDSCH/CSI-RS with a reception beam/filter same as that for receiving the reference signal, transmitted from Cell 0, according to (or associated with) the second TCI state.

Applying 3907 the first TCI state and the second TCI state for uplink transmission may comprise: transmitting (via Cell 1) PUCCH/PUSCH/SRS with a transmission beam/filter same as that for receiving the reference signal, transmitted from Cell 1, according to (or associated with) the first TCI state, and transmitting (via cell 0) PUCCH/PUSCH/SRS with a transmission beam/filter same as that for receiving the reference signal, transmitted from Cell 0, according to (or associated with) the second TCI state.

In the example of FIG. 39, the base station may skip performing the ICBM procedure before transmitting the Layer 1/2 signaling triggering the HO procedure. The base station may skip performing the ICBM procedure, e.g., when beamforming is not used in the target PCell, or the wireless device does not support ICBM, or the base station does not support ICBM.

In the example of FIG. 39, the source base station may determine to handover the wireless device from the source gNB (Cell 0) to the target gNB (Cell 1). The source base station may determine the handover based on a load/traffic condition, a CSI/beam report of the target gNB, a location/trajectory of the wireless device, a network energy saving strategy (e.g., the source base station determines to turn of the Cell 0 and/or one or more SCells for power saving), etc.

In the example of FIG. 39, the source base station may transmit a second DCI/MAC CE 3908 indicating a PCell changing from the current PCell (Cell 0) to a new cell.

The new cell may be one of the neighbor (non-serving) cells used in the ICBM procedure (e.g., indicated by the first DCI/MAC CE). The new cell may be cell 1 in the example of FIG. 39. If the ICBM procedure is supported and/or configured, the wireless device, before executing HO procedure indicated by the source base station, has already synchronized with the target gNB regarding which beam should be used for transmission/reception via the target gNB, which is different from layer 3 signaling based CHO (as shown in FIG. 35 and/or FIG. 36) where the wireless device needs to synchronize to the target gNB upon executing the HO/CHO.

The new cell may be one of a plurality of neighbor (non-serving) cells comprised in L1 beam/CSI report, e.g., with the best measurement report, with the distance closest to the wireless device, etc., when the ICBM procedure is not configured/supported/indicated.

In the example of FIG. 39, in response to receiving the second DCI/MAC CE, the wireless device may change the PCell from cell 0 to cell 1. The wireless device may apply the (stored/received) RRC parameters (comprised in RRCReconfiguration, CellGroupConfig, and/or SpCellConfig IE) of the target PCell (cell 1) as the current PCell.

If the ICBM is configured/supported/indicated before receiving the 2nd DCI/MAC CE, the wireless device may skip downlink (time/frequency/beam) synchronization (e.g., monitoring MIB/SSB/SIBs and/or selecting a SSB as a reference for downlink reception and/or uplink transmission) in case the wireless device has already synchronized with the target PCell based on the ICBM procedure.

The wireless device may skip performing RA procedure towards the target PCell before transmitting to and/or receiving from the target PCell, e.g., when the target PCell is close to the source PCell, or the uplink TA is same or similar for the source PCell and the target PCell, or the dedicated RACH resource is not configured in the RRC reconfiguration message of the target PCell.

The wireless device may perform downlink synchronization (SSB/PBCH/SIBs monitoring) and/or uplink synchronization (RA procedure) for the layer 1/2 signaling based HO (e.g., when ICBM is not configured/indicated/supported) as it does for layer 3 signaling based HO/CHO based on example embodiments described above with respect to FIG. 35, FIG. 36, FIG. 37, and/or FIG. 38.

Figure 40:
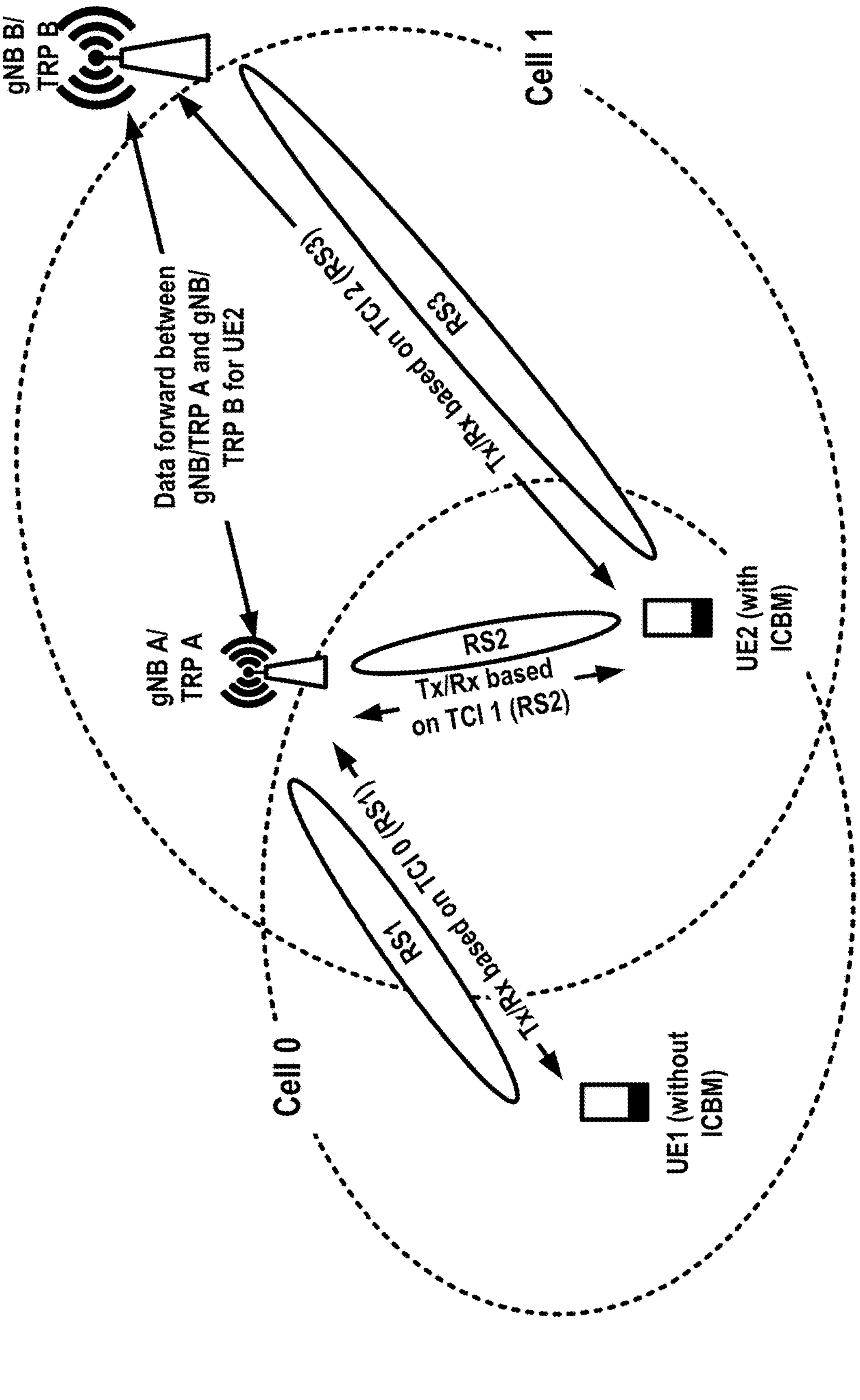
FIG. 40 shows an example inter-cell beam management (ICBM) procedure.

FIG. 40 shows an example of ICBM procedure. In the example of FIG. 40, a first wireless device (UE1) may be in the coverage of Cell 0 deployed under a first node (e.g., gNB A or TRP A). UE1 is not in the coverage of Cell 1 deployed under a second node (e.g., gNB B or TRP B). Cell 0 and Cell 1 have different PCIs. UE1 may use the RSs (e.g., RS1) transmitted from Cell 0 as a reference RS for a TCI state (which is used for beam/spatial domain filter determination for downlink reception and/or uplink transmission (Tx/Rx based TCI state 0 associated with RS1)). UE1 does not use RSs (e.g., RS2 and/or RS3) transmitted from Cell 1 as the reference RS for the TCI state. UE1 configured with a TCI state, associated with a RS of a serving cell with a first PCI and not associated with a RS of another cell with a second PCI different from the first PCI, may be referred to as a UE without ICBM in this specification.

In the example of FIG. 40, a second wireless device (UE2) may be in the coverage of Cell 0 deployed under a first node (e.g., gNB A or TRP A). UE2 is also in the coverage of Cell 1 deployed under a second node (e.g., gNB B or TRP B). Cell 0 and Cell 1 have different PCIs. UE2 may use the RSs (e.g., RS2) transmitted from Cell 0 as a reference RS for a first TCI state (which is used for beam/spatial domain filter determination for downlink reception and/or uplink transmission via Cell 0 (Tx/Rx based TCI state 1 associated with RS2)). UE2 also uses RSs (e.g., RS3) transmitted from Cell 1 as the reference RS for a second TCI state (which is used for beam/spatial domain filter determination for downlink reception and/or uplink transmission via Cell 1 (Tx/Rx based TCI state 2 associated with RS3)). UE2 configured with a first TCI state, associated with a RS of a serving cell with a first PCI and also configured with a second TCI state associated with a RS of another cell with a second PCI different from the first PCI, may be referred to as a UE with ICBM in this specification.

If gNB B or TRP B receives uplink signals/channels with the second TCI state, it may forward the uplink signals/channels to gNB A or TRPA for processing.

gNB A or TRP A may forward downlink signals/channels to gNB B or TRP B to transmit with the second TCI state to the wireless device.

In the ICBM procedure of FIG. 40, Cell 1 with the second PCI different from the first PCI of Cell 0 may be considered/configured as a part (e.g., a second TRP with a second PCI different from a first PCI of a first TRP) of cell 0 for UE2, e.g., based on example embodiments described above with respect to FIG. 34B. The PDCCH/PDSCH/PUCCH/PUSCH resources are shared between Cell 1 and Cell 0 in a way that is transparent to UE2. However, SSBs/CSI-RSs of Cell 0 does not share the same resources with SSBs/CSI-RSs of Cell 1. SSBs/CSI-RSs of Cell 0 may have configuration parameters (e.g., number of beams, periodicity, transmission power, etc.) different than configuration parameters of SSBs/CSI-RSs of Cell 1.

Cell 1 with the second PCI different from the first PCI of Cell 0 may be considered/configured as a separate cell different from cell 0 for UE2, e.g., if Cell 1 is configured as a candidate target cell based on example embodiments described above with respect to FIG. 36 and/or FIG. 38. Cell resources (SSB/CSI-RS/PDCCH/PDSCH/PUCCH/PUSCH) are not shared between Cell 1 and Cell 0. Cell 1 has configuration parameters, of the cell resources, different from (or independent of) configuration parameters of the cell resources of Cell 0.

A base station may perform a network energy saving operation if carrier aggregation (CA) is supported. In CA operation, a wireless device may be configured with a set of secondary cells (Scell) in addition to a primary cell (PCell). In at least some wireless communications, PCell/SCell configurations are UE-specific configured. A CC configured as a PCell for a wireless device may be (separately and/or independently) configured as an SCell for another wireless device. From the network power consumption perspective, it is beneficial to turn off some CCs and keep a common CC serving as PCell for UEs in RRC_CONNECTED state when the cell load is low. To achieve this goal, a base station may request the wireless device to perform PCell switching for an first (ongoing) cell (also referred to as CC) serving as PCell, that is not the common CC serving as PCell for the purpose of network power savings. After switching the wireless device (and one or more other wireless device configured with the first cell as the PCell) to a new PCell, the base station (e.g., gNB) may deactivate the old PCell (e.g., first PCell) or send/transition it to a dormant state. In at least some wireless communications, PCell switching is achieved by L3-based HO/CHO (as shown in FIG. 35 and/or FIG. 37). However, the RRC reconfiguration may have long latency and is not fast enough to react to dynamic traffic load of wireless devices. To improve network energy saving, dynamic PCell switching based on UE-specific DCI, or group common DCI may be used.

Figure 41:
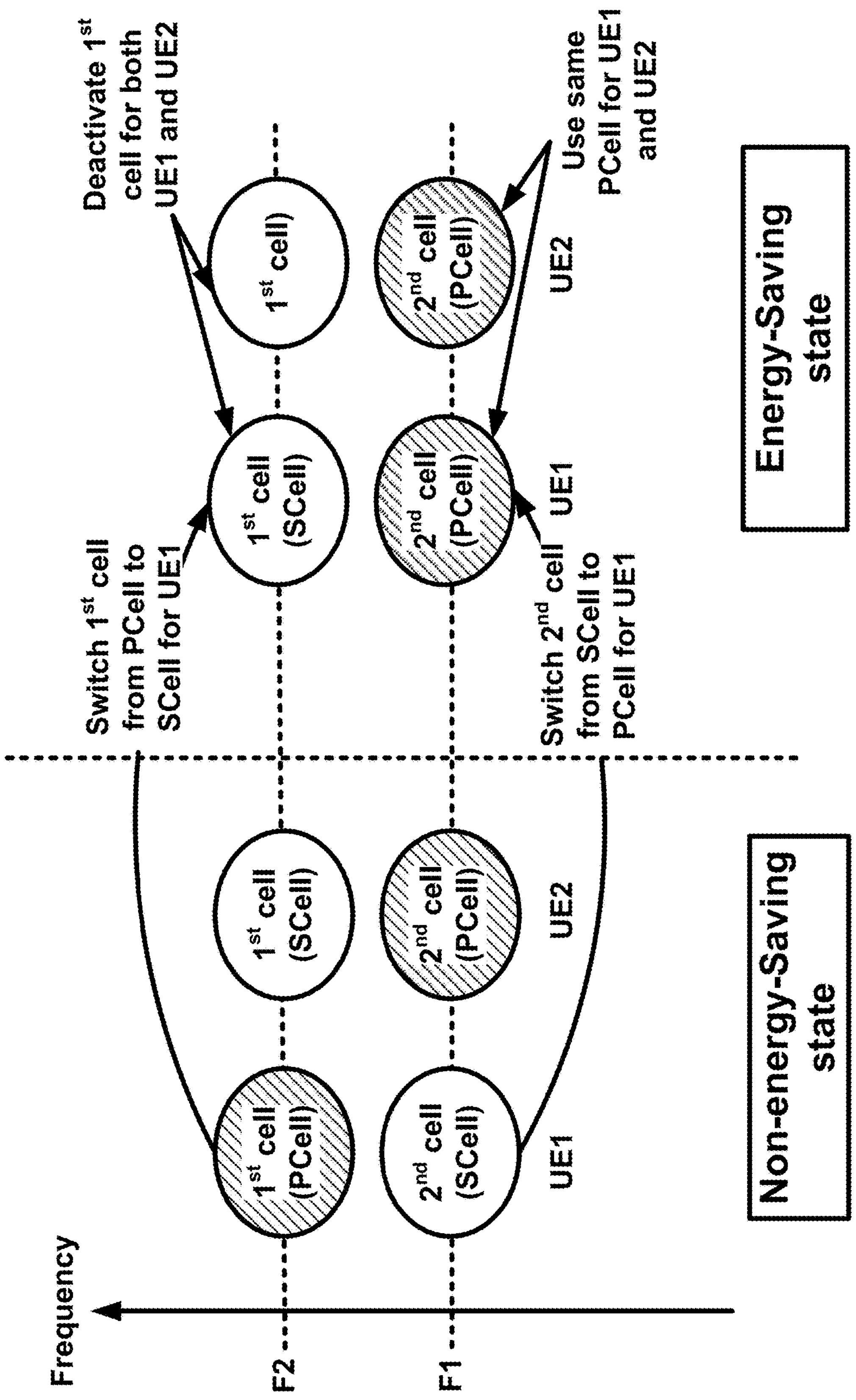
FIG. 41 is a diagram showing an example of dynamic PCell switching for network energy saving.

FIG. 41 is a diagram showing an example of dynamic PCell switching for network energy saving. A first wireless device (e.g., UE1) may be configured with a plurality of cells comprising a PCell (e.g., 1st cell located in frequency point F2) and a SCell (e.g., 2nd cell located in frequency point F1). A second wireless device (e.g., UE2) may be configured with a plurality of cells comprising a PCell (e.g., 2nd cell located in frequency point F1) and a SCell (e.g., 1st cell located in frequency point F2). The PCell of UE1 may be served/configured as a SCell for UE 2. The PCell of UE2 may be served/configured as a SCell for UE1.

A PCell is a cell where the base station may transmit NAS related information (e.g., mobility) and/or security related information to a wireless device. The PCell is also a cell where the base station may maintain a RRC connection with the wireless device. Via the PCell (instead of a SCell), the wireless device performs an initial (RRC) connection establishment procedure or initiates a (RRC) connection re-establishment procedure.

In a non-energy-saving state (e.g., referred to default state/mode, full-power state/mode), the base station may use $1^{st}$ cell as PCell and/or use $2^{nd}$ cell as SCell to communicate with UE1. In the non-energy-saving state, the base station may use $2^{nd}$ cell as PCell and/or use $1^{4}$ cell as SCell to communicate with UE2. Using different PCells to serve different wireless devices may balance signaling overhead for different cells. To achieve dynamic PCell switching for network energy saving, the base station may transmit a L1 signaling (e.g., a group common DCI or a UE-specific DCI/MAC CE) indicating a PCell switching for UE1 and/or other UEs. The L1 signaling may indicate to UE1 that PCell is switched from $1^{st}$ cell to $2^{nd}$ cell for UE1 and/or SCell is switched from $2^{nd}$ cell to $1^{st}$ cell. In response to receiving the L1 signaling, UE1 may switch the PCell and the SCell. After switching the PCell and the SCell, UE1 and UE2 now are served with the same cell (e.g., $2^{nd}$ cell) as the PCell. The same PCell for a plurality of wireless devices served by the base station (e.g., wireless devices UE1 and UE2) may be referred to as a group common PCell. Based on UE1 and UE2 being served with the same PCell, the base station may deactivate (e.g., transition to dormancy or turn off) $1^{st}$ cell without (RRC) connection being lost with UE1 and UE2.

If the base station is medium or heavily loaded (e.g., with more than 5 or 10 wireless devices connected to the base station), for enabling the network energy saving, the base station may use a group common DCI indicating, for a plurality of wireless devices, a PCell changing/switching to a common PCell. If the base station is lightly loaded (e.g., with one or two wireless devices connected to the base station), for enabling the network energy saving, the base station may use the UE-specific DCI/MAC CE (to each wireless device) indicating a PCell changing/switching, e.g., based on example embodiments described above with respect to FIG. 39, e.g., if the current PCell of each wireless device is not a common PCell of the base station. Based on example of FIG. 41, dynamic PCell switching may allow the base station to turn off some cells without RRC connection being lost with wireless devices.

In at least some wireless communications, a base station may transmit, to a wireless device, L3 signaling (e.g., one or more RRC messages) to indicate a PCell switching/changing for HO from a source base station (or cell) to a neighbor base station (or cell) (e.g., described in reference to FIG. 35). A base station may transmit L3 signaling (e.g., one or more RRC messages) to indicate multiple candidate target PCells for a CHO procedure in which the wireless device may execute the CHO procedure towards a candidate cell (of the candidate target PCells) upon reconfiguration conditions of that candidate cell being met or satisfied (e.g., describe in reference to FIG. 37). As described with respect to FIG. 39, L1 or L2 signaling may be introduced for (lower-latency) control signaling to trigger PCell switching in a CHO procedure. However, the effect on PHR transmission should be considered when introducing this L1/L2 signaling. For example, the L1 or L2 signaling for PCell switching may not trigger PHR because PHR functionality is not (re)configured by higher layers (and/or the MAC layer is not reset). Instead, as described with respect to FIG. 32B, PHR triggering may be delayed and, e.g., only triggered once another condition is met such as a periodic timer (phr-PeriodicTimer) expiring. For example, as shown in FIG. 39, due to the delay, PHR might not be triggered until, e.g., after RRCReconfigurationComplete is transmitted by the wireless device to the target gNB1.

A base station may transmit, to a group of wireless devices, a group common (GC) DCI to indicate a PCell switching/changing from a current PCell to a target PCell (or a GC PCell) for network energy saving (e.g., according to FIG. 41). The PCell switching/changing may further comprise activating a BWP (or a group common (GC)/energy saving (ES) BWP which may be configured or preconfigured) of the target PCell (if the target PCell comprises multiple BWPs) as the active BWP of the target PCell to use when the wireless device completes the PCell switching to the target PCell. Implementing enhanced (low-latency) PCell switching using L1 or L2 signaling, however, may result in delayed PHR transmission. For example, because PCell switching is not sent via a L3 signaling (such as an RRC message), the MAC entity might not be reset and/or the PHR functionality might not be configured or reconfigured, which results in the PHR not being triggered by the MAC entity when the PCell is switched from a first cell (e.g., an old PCell) to a second cell (e.g., a target PCell). Instead, as described with respect to FIG. 32B, PHR triggering may be delayed and, e.g., only triggered once another condition is met such as a periodic timer (phr-PeriodicTimer) expiring.

Figure 42:
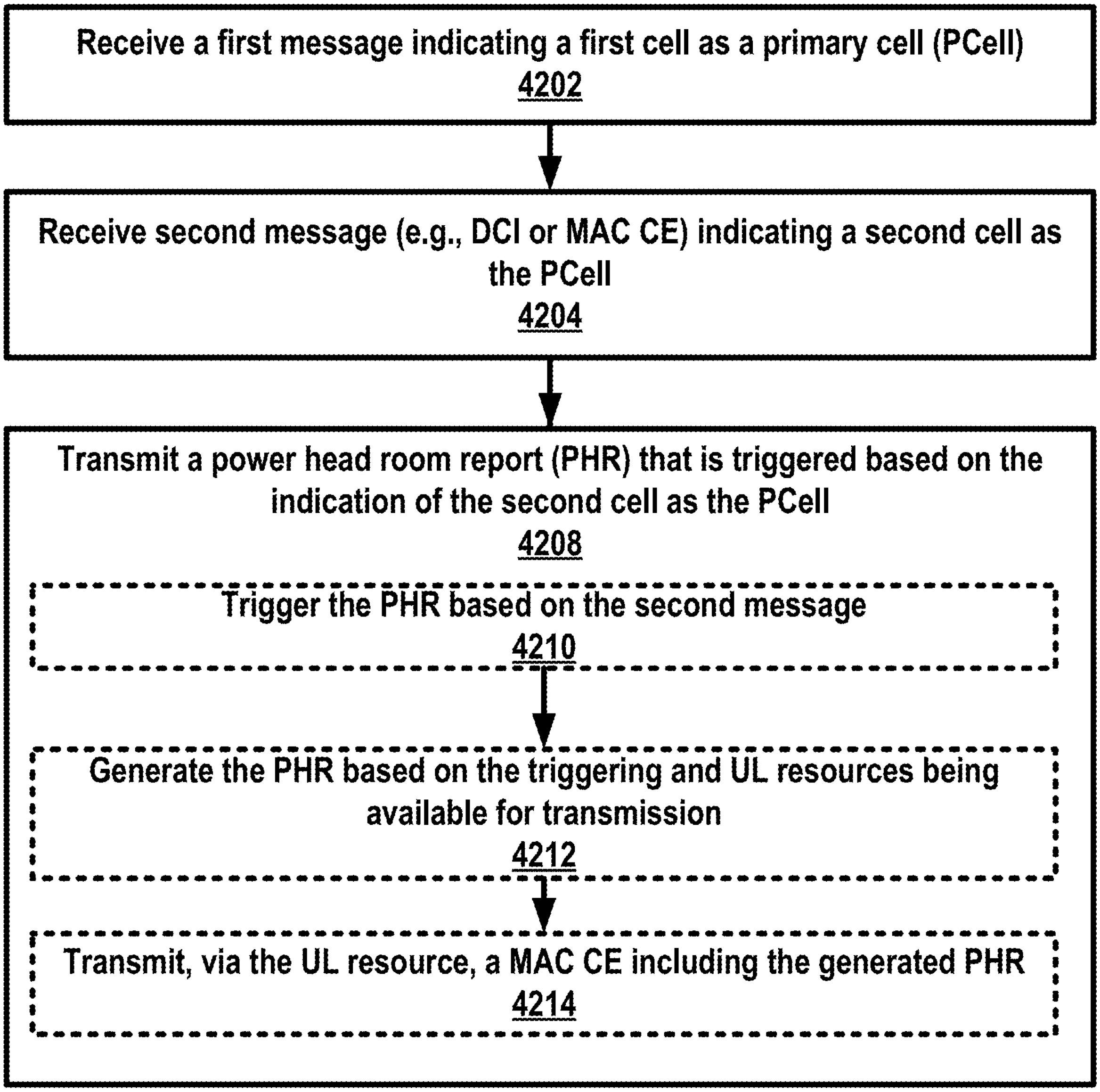
FIG. 42 is a flow diagram of a method for triggering PHR based on fast PCell switching (e.g., based on L1 or L2 signaling).

FIG. 42 shows a method 4200 for triggering PHR based on fast PCell switching (e.g., based on L1 or L2 signaling), employing various novel features described herein.

At step 4202, a wireless device may receive (and a base station may transmit) a first message indicating a first cell as a primary cell (PCell). The first message may comprise one or more RRC messages that include configuration parameters (e.g., a CellGroupConfig IE in an RRC message) indicating the first cell as a PCell for a cell group. The PCell may be a cell, of the cell group, for maintaining RRC connection between the base station and the wireless device. The one or more RRC messages may include an RRC message for establishing an RRC connection (e.g., an RRC reconfiguration message as described in FIG. 35 and FIG. 36 or an RRC reconfiguration message for CHO as described in FIG. 37, FIG. 38, and FIG. 39). The first message may be a MAC CE or a DCI for configuring, e.g., a second cell as a cell for ICBM, as described above with respect to FIG. 34B, FIG. 39, and FIG. 40.

The first message (e.g., an RRC configuration or RRC reconfiguration message) may include configuration parameters for a cell group (e.g., a master cell group (MCG) or a secondary cell group (SCG)). These configuration parameters may configure a primary cell (SpCell or PCell), one or more secondary cells (SCells), a MAC entity associated with the cell group, and/or a set of logical channels associated with RLC entities. In some embodiments, the first message (or a second message) may include configuration parameters for PHR functionality (e.g., MAC-CellGroupConfigIE includes a phr-Config IE). As described above, a MAC layer (e.g., a MAC entity) of the wireless device may configure (or reconfigure) PHR functionality based on the one or more PHR configuration parameters. Example configuration parameters for PHR are described above with respect to FIG. 32B. For example, these PHR configuration parameters may include one or more of the following: a periodicity value (phr-PeriodicTimer) for periodic PHR, a prohibit timer (phr-ProhibitTimer) for a PHR, a PHR Tx power factor change (phr-Tx-PowerFactorChange) for triggering the PHR, a PHR mode (e.g., real or virtual) indication (phr-ModeOtherCG) for another cell group (CG) when DC is configured, a MPE report indication (mpe-Reporting-FR2), a MPE threshold (mpe-Threshold), a prohibit timer (mpe-Prohibit-Timer) for a MPE report, an indication for multiple PHR (multiplePHR) indicating if a PH value is reported using a Single Entry PHR MAC CE or Multiple Entry PHR MAC CE, a PHR mode indication (twoPHRMode) indicating if the PH is reported as two PHRs (each PHR associated with an SRS resource set) is enabled or not, a PHR type indication (phr-Type2OtherCell) for a SpCell of on a SpCell of the other MAC entity (i.e. E-UTRA MAC entity in EN-DC, NE-DC, and NGEN-DC cases) and etc. Configuration parameters for PHR may be received in another message (e.g., a second RRC message) separate from the first message.

The base station may transmit, via the PCell (not via a SCell of the cell group), NAS (according to example embodiments described above with respect to FIG. 1A and/or FIG. 1B) related information (e.g., mobility) and/or security related information to a wireless device. The base station may maintain, via the PCell, an RRC connection with the wireless device. The wireless device may perform, via the PCell, an initial (RRC) connection establishment procedure or initiate a (RRC) connection re-establishment procedure (such as those described above in FIGS. 35-40).

Based on receiving the first message, the wireless device may communicate with the base station via the PCell and one or more (activated) SCells of the cell group. For example, the first message may activate the one or more SCells. A MAC CE (different from the first message) may be received (from the base station) indicating that the wireless device is to activate (and/or deactivate) one or more SCells. For example, this MAC CE may have a MAC CE subheader including an LCID having an index of 57 (associated with a downlink MAC CE for SCell activation/deactivation). Communicating with the base station may include the wireless device receiving MIBs/SIBs/CSI-RSs/PDCCHs/PDSCHs and/or transmitting RACHs/PUSCHs/PUCCHs/SRSs.

The base station may determine to enable an energy saving (ES) operation for the base station (as described in FIG. 41) and configure a group common (GC) PCell (or a GC target PCell) of the cell group (or another cell group different from the cell group) for the ES operation. In response to enabling the ES operation, the base station may transmit a second RRC message including configuration parameters indicating a third cell (which may be the same second cell as described below at block 4204), of the cell group, as the GC PCell for a plurality of wireless devices used in the ES operation. The third cell may have different configuration parameters (e.g., periodicity/power of SSBs/CSI-RSs, bandwidth, antenna ports, etc.) from the first cell. The third cell may be a configured SCell of the cell group. The third cell may be a neighbor cell or a non-serving cell (e.g., based on example embodiment described above with respect to FIG. 40) not belonging to the cell group.

At step 4204, the wireless device may receive (and the base station may transmit) a second message indicating a second cell as the PCell. The second cell may be one of the group of cells configured at block 4202.

The second message may include a Layer 1 (e.g., a DCI) or a Layer 2 (e.g., a MAC CE) message, which may have lower latency to process than a Layer 3 (e.g., RRC) message.

The second message may be a (UE-dedicated) DCI (e.g., as described above in FIG. 39), which may be scrambled by an RNTI dedicatedly configured for the wireless device.

The second message may be a GC DCI (e.g., a group common DCI as described above with respect to FIG. 41), which may be scrambled by an RNTI dedicatedly configured to indicate the transitioning of a PCell for a plurality of wireless devices including the wireless device.

The second message may comprise a field that indicates an index of the second cell which was configured, e.g., in block 4202.

The second message may comprise a field that indicates an ID (e.g., a PCI or a cell index) of the second cell.

For a CHO procedure as described in FIG. 39, the second message may include a DCI (dedicated to the wireless device) or a MAC CE for indicating PCell switching (which may also be referred as PCell changing or PCell updating) from the first cell to the second cell. The MAC CE may have a format that is used jointly with a MAC CE format for SCell activation/deactivation, as shown in table 3000B of FIG. 30B showing example downlink MAC CE formats. The second cell may be different from the first cell.

For a network energy saving procedure as described in FIG. 41, the second message may include a GC DCI (directed to a plurality of wireless devices including the wireless device) indicating PCell switching (which may also be referred as PCell changing or PCell updating) to the second cell (as a common PCell). The GC DCI may indicate whether the base station is to enter an energy-saving state (during which the number of cells serving as PCells to a group of wireless devices may be reduced) or a non-energy-saving state in which the base station does not transmit GC DCI for PCell switching. Based on the GCI DCI indicating to switch to a common PCell (e.g., in the energy-saving state), the wireless device may determine to switch from the first cell to the second cell. For example, the second cell may be a default cell (configured by the base station) to be used as a common PCell during the network energy saving procedure. The second cell may be the third cell configured in the second RRC message, as described above.

Based on the second message, the wireless device may switch from the first cell to the second cell as the PCell (e.g., switch from using the first cell as the PCell to using the second cell as the PCell).

Switching from the first to the second cell as the PCell may comprise applying RRC/MAC/PHY layer parameters of the second cell, performing downlink synchronization, uplink synchronization, and/or beam (TCI) alignment etc.

Switching the first to the second cell as the PCell might not comprise: resetting MAC entity, releasing RRC/MAC/PHY layer parameters of the first cell, or both. The wireless device, after switching to the second cell as the PCell, may maintain the MAC entity (without reset) and/or maintain RRC/MAC/PHY layer parameters of the first cell (without releasing) which may reduce latency when the base station switches the PCell back from the second cell to the first cell.

The wireless device may determine whether the second cell (indicated by the second message) is the same as the first cell (e.g., having the same index, ID, or PCI) and ignore the second message if they are the same. For example, in a network energy saving scenario as described above in FIG. 41, a GC DCI is broadcast to a group of wireless devices to switch to a common PCell, which may already be an active PCell of one or more wireless device of the group of wireless devices.

The second RRC message may further indicate an ES/GC BWP (which may be same as an initial/first active BWP, a default BWP, or may be another BWP different from the initial/first active BWP and the default BWP) of a plurality of BWPs configured on the GC PCell, for the ES operation.

The initial/first active BWP and/or the default BWP may be implemented based on example embodiments described above with respect to FIG. 25. The second RRC message may be a RRC reconfiguration message. The configuration of the second cell may be implemented based on example embodiments of FIG. 35, FIG. 36, and/or FIG. 49. The base station, by configuring the second RRC message appropriately for each wireless device, may ensure that wireless devices are configured with the same GC PCell (if triggered by a GC DCI), to allow the base station to maintain the GC PCell and turn off other SCells for network energy saving.

After receiving the second RRC message indicating the second cell (the GC PCell) of the cell group, the wireless device may maintain RRC connection with the first cell as the PCell, comprising continuing the communicating with the base station via the first cell. The wireless device may perform BWP switching on the first cell comprising multiple BWPs, e.g., based on example features described above with respect to FIG. 9 and/or FIG. 25.

In response to receiving the second message (e.g., L1/2 signaling) indicating the PCell switching from the first cell (old/current/source PCell) to the second cell as the PCell (new/target PCell), the wireless device may cancel a triggered (or pending) PHR procedure (if any) on the first cell. The wireless device may perform the PCell switching from the first PCell to the second PCell without resetting the MAC entity and/or without reconfiguring the MAC entity. Switching PCell without resetting the MAC entity and/or without reconfiguring the MAC entity may reduce latency of data delivery when switching the PCell between two cells. Cancelling the triggered PHR procedure on the old PCell without resetting the MAC entity may improve power consumption of the wireless device.

The second message (e.g., L1/2 signaling) indicating the PCell switching (and/or a RRC message) may indicate whether to reset the MAC entity. In response to the second message indicating to reset the MAC entity, the wireless device may cancel the triggered (or pending) PHR procedure (if any) on the first cell. In response to the second message (e.g., L1/2 signaling) indicating not to reset the MAC entity, the wireless device may maintain the triggered (or pending) PHR procedure on the first cell (e.g., old/source PCell). Resetting the MAC entity based on indication from the base station may allow the base station to flexibly control whether to reset the MAC entity based on configuration of the target PCell. The configuration of the target PCell may comprise the target PCell being under a distributed unit (DU) same as the DU of the source PCell. The configuration of the target PCell may comprise the target PCell being under the different DU and the same centralized unit (CU) as the source PCell. The configuration of the target PCell may comprise the target PCell being under the different DU and the different CU as the source PCell.

At step 4208, the wireless device may transmit a power headroom report (PHR) that is triggered based on the indication of the second cell as the PCell. Step 4208 may include one or more of blocks 4210-4214.

At step 4210, the wireless device (e.g., the MAC entity of the wireless device) may trigger the PHR based on the second message, e.g., based on the indication of the second cell as the PCell. The PHR may be triggered based on the second cell being different from the first cell. The wireless device may consider PHR triggering based on the second message being a DCI, a GC DCI, or a MAC CE, and the second message indicating the PCell switching/changing. The wireless device (e.g., the MAC entity) may trigger the PHR without resetting the MAC entity.

The wireless device may pass/send the second message to an upper layer (e.g., the MAC layer, the RRC or RLC layer) of the wireless device, which configures or reconfigures PHR functionality based on the second message indicating the second cell as the PCell (e.g., indicating PCell switching). As described above with respect to FIG. 32B, based on the (re)configuring of the PHR functionality, the MAC entity of the wireless device may trigger the PHR.

The MAC entity of the wireless device may process the second message without it being passed to upper layers (e.g., the second message may be a MAC CE or a DCI that informs the MAC entity/layer of the PCell switching). For example, the wireless device may be configured to trigger PHR based on the second message without requiring overhead of upper layers in configuring/reconfiguring the PHR functionality.

Based on this enhanced PHR triggering, PHR triggering delay can be avoided. For example, as described above with respect to FIG. 39, instead of other conditions such as a configured PHR timer expiring for triggering PHR, which may happen much later than when the second message is received at block 4204 to indicate a PCell switching to the second cell, the PHR may be triggered right after or soon after the second message is received and processed by the MAC entity.

At step 4212, the wireless device may generate the PHR based on the triggering and UL resources being available for an uplink transmission. If the MAC entity (of the wireless device) has allocated UL resources (e.g., configured by the base station such as by the second cell) for a new transmission, the MAC entity may start phr-PeriodicTimer if it is the first UL resource allocated for a new transmission since the last MAC reset.

The wireless device may generate the PHR based on determining that at least one PHR has been triggered (e.g., the PHR triggered at block 4210) and not cancelled and the allocated UL resources being available/sufficient for transmitting: the MAC CE for PHR which the MAC entity is configured to transmit; and the MAC subheader corresponding to the MAC CE for PHR.

If a Multiple Entry PHR format is used (e.g., the PHR parameter multiplePHR is set as "True"), for each activated serving cell with configured uplink associated with a MAC entity of which the active DL BWP is not a dormant BWP, the wireless device (e.g., the MAC entity) may generate a Type 1 or Type 3 power headroom for an uplink carrier for NR serving cell and E-UTRA serving cell, respectively. The wireless device may generate the PHR to include, e.g., a PH value, a $P_{CMAX}$,c, and/or an MPE value, as described above with respect to FIGS. 32A and 32B. If the MAC entity is configured with mpe-Reporting-FR2-r17, the wireless device may generate an Enhanced Multiple entry PHR. If this MAC entity is configured with twoPHRMode, the wireless device may generate an Enhanced Multiple Entry PHR for multiple TRP MAC CE. Otherwise, if neither parameter is configured, the wireless device may generate a Multiple Entry PHR MAC CE.

If a Single Entry PHR format is used (e.g., the PHR parameter multiplePHR is set as "False"), the wireless device (e.g., the MAC entity) may obtain two values of the Type 1 PHR from the physical layer for the corresponding uplink carrier of the PCell if this MAC entity is configured with twoPHRMode, otherwise (when this MAC entity is not configured with twoPHRMode) the MAC entity may obtain obtain the value of the Type 1 PH from the physical layer for the corresponding uplink carrier of the PCell (e.g., the new/target PCell indicated in the second message of 4204 in FIG. 42). The MAC entity may obtain the value for the corresponding $P_{CMAX,f,c}$ field from the physical layer. The MAC entity may obtain the value for the corresponding MPE field from the physical layer if mpe-Reporting-FR2 is configured and the cell operates on FR2. The MAC entity may obtain the value for the corresponding $MPE_i$ field from the physical layer and the value for the corresponding $Resource_i$ field from the physical layer if mpe-Reporting-FR2-r17 is configured and this cell operates on FR2 and this cell is associated to this MAC entity. The MAC entity may instruct the multiplexing and assembly procedure to generate and transmit the Enhanced Single entry PHR if this MAC entity is configured with mpe-Reporting-FR2-r17 or the Enhanced Single Entry PHR for multiple TRP MAC CE if this MAC entity is configured with twoPHRMode or the Single Entry PHR MAC CE otherwise based on the values reported by the physical layer. The wireless device may generate the PHR to include, e.g., a PH value, a $P_{CMAX}$,c, and/or an MPE value, as described above with respect to FIGS. 32A and 32B.

The MAC entity may start or or restart the mpe-Prohibit-Timer and/or cancel triggered MPE P-MPR reporting for Serving Cells included in the PHR MAC CE if this PHR report is an MPE P-MPR report. The MAC entity may start or restart phr-Periodic Timer and/or phr-ProhibitTimer. In an embodiment, the MAC entity may cancel any triggered PHR(s) which did not lead to a PHR being generated for transmission.

All triggered PHRs may be cancelled if there is an ongoing small data transmission (SDT) procedure, and the UL grant(s) can accommodate all pending data available for transmission but is not sufficient to additionally accommodate the PHR MAC CE and its corresponding MAC subheader.

A PHR may be a Type 1 PHR based on an actual or reference PUSCH transmission. The PHR may be a Type 2 PHR based on a PUCCH transmission. The PHR may be a Type 3 PHR based on an actual SRS transmission.

A wireless device may determine that a Type 1 PHR for an activated serving cell is based on an actual PUSCH transmission. For PUSCH transmission occasion i on active UL BWP b of carrier f of serving cell c, the wireless device may compute the Type 1 PHR as:

$$PH_{type1b,f,c}(i,j,q_d,l) = P_{CMAX,f,c}(i) - \{P_{O\_PUSCH,b,f,c}(j) + 10\log_{10}(2^{\mu}\cdot M^{PUSCH}_{RB,b,f,c}(i)) + \alpha_{b,f,c}(j)\cdot PL_{b,f,c}(q_d) + \Delta_{TF,b,f,c}(i) + f_{b,f,c}(i,l)\}$$

[dB], where $$M^{PUSCH}_{RB,b,f,c}(i)$$

is bandwidth of the PUSCH resource assignment expressed in number of resource blocks for PUSCH transmission occasion i on active UL BWP b of carrier f of serving cell c. $\alpha_{b,f,c}(j)$ is a power compensation factor configured by the base station. $\Delta_{TF,b,f,c}(i)$ is a value of power adjustment for transmission format of the PUSCH. $f_{b,f,c}(i,l)$ is the PUSCH power control adjustment state l for active UL BWP b of carrier f of serving cell c. $P_{O\_PUSCH,b,f,c}(j)$ is a target PUSCH received power configured by the base station. $PL_{b,f,c}(q_d)$ =referenceSignalPower—RSRP, where referenceSignalPower is provided by the base station and RSRP is measured on a reference serving cell. The RSRP may be a L3-RSRP with filtering based on a filter configuration configured by the base station. The wireless device may determine a value of $P_{CMAX,f,c}(i)$ based on a P-MPR, a MPR, a A-MPR, a power value of a power class of the wireless device, and/or a maximum Effective Isotropic Radiated Power ($EIRP_{max}$) of the wireless device.

The wireless device may determine that a Type 1 PHR for an activated serving cell is based on a reference PUSCH transmission (e.g., for the new/target PCell indicated by the second message in 4204 of FIG. 42). For PUSCH transmission occasion i on active UL BWP b of carrier f of serving cell c, the wireless device may compute the Type 1 PHR as: $PH_{type1b,f,c}(i,j,q_d,l)=\tilde{P}_{CMAX,f,c}(i)-\{P_{O\_PUSCH,b,f,c}U(j)+\alpha_{b,f,c}(j)\cdot PL_{b,f,c}(q_d)+f_{b,f,c}(i,l)\}$ [dB], where $\tilde{P}_{CMAX,f,c}(i)$ is computed assuming MPR=0 dB, A-MPR=0 dB, P-MPR=0 dB. $\Delta T_C$=0 dB. MPR, A-MPR, P-MPR and $\Delta T_C$ are determined based on above examples. $P_{O\_PUSCH,b,f,c}(\ )$ and $\alpha_{b,f,c}(j)$ are obtained using $P_{O\_NOMINAL\_PUSCH,f,c}(0)$ and p0-PUSCH-AlphaSetId=0, $PL_{b,f,c}(q_d)$ is obtained using pusch-PathlossReferenceRS-Id=0, and l=0. pusch-PathlossReferenceRS-Id is configured in cell parameters of the new/target PCell.

A wireless device may determine that a Type 3 PHR for an activated serving cell is based on an actual SRS transmission. For SRS transmission occasion i on active UL BWP b of carrier f of serving cell c and if the wireless device is not configured for PUSCH transmissions on carrier f of serving cell c, the wireless device may compute a Type 3 PHR as $PH_{type3b,f,c}(i,q_s)=P_{CMAX,f,c}(i)-\{P_{O\_SRS,b,f,c}(q_s)+10\log_{10}(2^{\mu}\cdot M_{SRS,b,f,c}(i))+\alpha_{SRS,b,f,c}(q_s)\cdot PL_{b,f,c}(q_d)+h_{b,f,c}(i)\}$ [dB], where $M_{SRS,b,f,c}(i)$ is SRS bandwidth expressed in number of resource blocks for SRS transmission occasion i on active UL BWP b of carrier f of serving cell c. $P_{O\_SRS,b,f,c}(q_s)$ is a power compensation factor configured by the base station. $h_{b,f,c}(i)$ is the SRS power control adjustment state l for active UL BWP b of carrier f of serving cell c. $P_{O\_SRS,b,f,c}(q)$ is a target SRS received power configured by the base station. The wireless device may determine a value of $P_{CMAX,f,c}(i)$ based on a P-MPR, a MPR, a A-MPR, a power value of a power class of the wireless device, and/or a maximum Effective Isotropic Radiated Power ($EIRP_{max}$) of the wireless device.

A wireless device may determine that a Type 3 PHR for an activated serving cell is based on a reference SRS transmission (e.g., for the new/target PCell indicated in the second message of 4204 in FIG. 42). For SRS transmission occasion i on UL BWP b of carrier f of serving cell c, and if the wireless device is not configured for PUSCH transmissions on UL BWP b of carrier f of serving cell c, the wireless device may compute a Type 3 PHR as $PH_{type3b,f,c}(q_s)=\tilde{P}_{CMAX,f,c}(i)-\{P_{O\_SRS,b,f,c}(q_s)+\alpha_{SRS,b,f,c}(q_s)\cdot PL_{b,f,c}(i)+h_{b,f,c}(i)\}$ [dB], where $q_s$ is a SRS resource set corresponding to SRS-ResourceSetId=0 for UL BWP b and $P_{O\_SRS,b,f,c}(q_s)$, $\alpha_{SRS,f,c}(q_s)$, $PL_{b,f,c}(q_d)$ and $h_{b,f,c}(i)$ are obtained from SRS-ResourceSetId=0 for UL BWP b. $\tilde{P}_{CMAX,f,c}(i)$ is computed assuming MPR=0 dB, A-MPR=0 dB, P-MPR=0 dB and $\Delta T_C$=0 dB.

At step 4214, the wireless device may transmit, via the UL resource, the MAC CE including the PHR generated at block 4212. For example, the MAC CE may be generated as described above with respect to FIG. 32A and FIG. 32B. The MAC CE may be of a format as described above with respect to FIG. 33A, FIG. 33B, and FIG. 33C depending on the configuration parameters for PHR indicated/configured by the base station (e.g., in the first message at block 4202). For example, after block 4212, the (MAC entity of the)

wireless device may generate a Multiple Entry MAC CE based on the PHR parameter of multiplePHR being configured with a value of "True." Otherwise, with the PHR parameter of multiplePHR being configured with a value of "False," the wireless device may generate a Singel Entry PHR format. The wireless device may instruct the multiplexing and assembly procedure to generate the PHR MAC CE.

Based on the PHR MAC CE (which may be a Single Entry PHR MAC CE or a Multiple Entry PHR MAC CE) being scheduled to be transmitted next according to priority of logical channels, the MAC entity may instruct the multiplexing and assembly procedure to multiplex to and transmit the PHR MAC CE in a MAC PDU, as described above with respect to FIG. 4A, FIG. 4B, and FIG. 28B.

A wireless device may perform a method comprising multiple operations. The wireless device may receive one or more radio resource control (RRC) messages comprising configuration parameters of a source cell and a candidate cell. A first power headroom report (PHR) may be triggered for the source cell. A medium access control (MAC) control element (CE) may be received, indicating to switch from the source cell to a first candidate cell, of the plurality of candidate cells, as a primary cell (PCell). In response to the MAC CE, the first PHR for the source cell may be cancelled, and a second PHR for the first candidate cell may be triggered. The second PHR may be transmitted after switching from the source cell to the first candidate cell, and may be transmitted via the first candidate cell. The wireless device may switch from the source cell to the first candidate cell as the PCell, and may trigger the second PHR without a MAC entity, of the wireless device, being reset. The wireless device may determine whether to reset the MAC entity based on the one or more RRC messages. The wireless device may reset a MAC entity based on the one or more RRC messages indicating to reset the MAC entity, or it may not reset the MAC entity based on the one or more RRC messages indicating not to reset the MAC entity. The first candidate cell may be different from the source cell. The MAC CE may indicate activation of a secondary cell (SCell) associated with the first candidate cell, and the SCell may be activated in response to receiving the MAC CE. The second PHR may comprise at least one of a power headroom value for the first candidate cell or a maximum uplink transmission power for the first candidate cell. Switching from the source cell to the first candidate cell as the PCell may comprise at least one of applying second parameters of the first candidate cell or stopping applying first parameters of the source cell. Switching from the source cell to the first candidate cell as the PCell may comprise maintaining first parameters of the source cell without releasing them. Switching from the source cell to the first candidate cell as the PCell may comprise skipping a random access procedure towards the first candidate cell before transmitting the second PHR. The wireless device may receive an RRC message comprising parameters of a first cell and indicating not to reset a MAC entity of the wireless device after receiving a MAC CE indicating a PCell switching to the first cell. A first MAC CE may be received, indicating to switch from a second cell to the first cell as the PCell, and in response to the first MAC CE and the RRC message indicating not to reset the MAC entity, a first PHR for the second cell may be canceled, and a second PHR for the first cell may be triggered. A wireless device may receive one or more RRC messages comprising first parameters of a serving cell and second parameters of candidate cells. A MAC CE, indicating to switch from the serving cell to a first cell of the candidate cells as a primary PCell, may be received. In response to the MAC CE, the wireless device may switch from the serving cell to the first cell as the PCell, a first PHR for the serving cell, triggered before receiving the MAC CE, may be canceled, and a second PHR may be triggered for the first cell. The second PHR may be transmitted based on the triggering, A wireless device may comprise one or more processors and memory storing instructions that, when executed by the one or more processors, cause the wireless device to perform the described method, additional operations, and/or include additional elements. A system may comprise wireless device configured to perform the described method, additional operations, and/or include additional elements; and a base station configured to perform additional elements. A computer-readable medium may store instructions that, when executed, cause performance of the described method, additional operations, and/or include additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, 6G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, 6G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

We claim:

1. A method comprising:
- receiving, by a wireless device, one or more radio resource control (RRC) messages comprising:
  - first parameters of a serving cell; and
  - second parameters of one or more candidate cells;
- receiving a medium access control (MAC) control element (CE) indicating to switch from using the serving cell as a primary cell (PCell) to using a first candidate cell, of the one or more candidate cells, as a PCell; and
- based on receiving the MAC CE:
  - switching from using the serving cell as a PCell to using the first candidate cell as a PCell;
  - indicating, to an upper layer of the wireless device, the switch indicated in the MAC CE;
  - canceling a triggered power headroom report (PHR) for the serving cell;
  - reconfiguring power headroom functionality of the wireless device; and
  - based on the reconfiguring power headroom functionality, triggering a PHR for the first candidate cell.

2. The method of claim 1, wherein the indicating the switch to the upper layer comprises sending the MAC CE to a radio resource configuration (RRC) layer of the wireless device.

3. The method of claim 1, further comprising:
- triggering a second PHR for the first candidate cell; and
- transmitting the second PHR after switching from the serving cell to the first candidate cell.

4. The method of claim 1, further comprising triggering a second PHR, for the first candidate cell, without resetting a MAC entity of the wireless device.

5. The method of claim 1, wherein the one or more RRC messages comprises an indication to reset a MAC entity of the wireless device, and the method comprises resetting, by the wireless device and based on the MAC CE, the MAC entity of the wireless device.

6. The method of claim 1, further comprising starting a PHR timer based on transmitting a second PHR for the first candidate cell.

7. The method of claim 1, wherein the MAC CE indicates an activation of a secondary cell (SCell) associated with the first candidate cell.

8. The method of claim 1, further comprising activating a secondary cell (SCell) based on receiving the MAC CE.

9. The method of claim 1, further comprising transmitting a second PHR, for the first candidate cell, via the first candidate cell.

10. The method of claim 1, further comprising switching from using the serving cell as a PCell to using the first candidate cell as a PCell by maintaining first parameters of the serving cell without releasing the first parameters.

11. The method of claim 1, further comprising switching from using the serving cell as a PCell to using the first candidate cell as a PCell by skipping a random access (RA) procedure, associated with the first candidate cell, before transmitting a second PHR for the first candidate cell.

12. A method comprising:

receiving, by a wireless device, one or more radio resource control (RRC) messages comprising configuration parameters of a source cell and one or more candidate cells;

triggering a first power headroom report (PHR) for the source cell;

receiving a medium access control (MAC) control element (CE) indicating to switch from using the source cell as a primary cell (PCell) to using a first candidate cell, of the one or more candidate cells, as a PCell; and based on receiving the MAC CE:

indicating, to an upper layer of the wireless device, the switch indicated in the MAC CE;

cancelling the first PHR for the source cell; and triggering a second PHR for the first candidate cell.

13. The method of claim 12, further comprising:

transmitting the second PHR after switching from the source cell to the first candidate cell.

14. The method of claim 12, wherein the triggering the second PHR for the first candidate cell occurs without resetting a MAC entity of the wireless device.

15. The method of claim 12, wherein the one or more RRC messages comprises an indication to reset a MAC entity of the wireless device, and the method comprises resetting, by the wireless device and based on the MAC CE, the MAC entity of the wireless device.

16. The method of claim 12, further comprising switching from using the source cell as a PCell to using the first candidate cell as a PCell by maintaining first parameters of the source cell without releasing the first parameters.

17. The method of claim 12, further comprising switching from using the source cell as a PCell to using the first candidate cell as a PCell by skipping a random access (RA) procedure associated with the first candidate cell before transmitting a second PHR for the first candidate cell.

18. A method comprising:

receiving, by a wireless device, one or more radio resource control (RRC) messages comprising:

parameters of a first cell; and information indicating not to reset a medium access control (MAC) entity of the wireless device after receiving a MAC control element (MAC CE) indicating to switch to using the first cell as a primary cell (PCell);

receiving a first MAC CE indicating to switch from using a second cell as a PCell to using the first cell as a PCell; and based on receiving the first MAC CE and the one or more RRC messages:

cancelling a first power headroom report (PHR) for the second cell; and triggering a second PHR for the first cell.

19. The method of claim 18, further comprising switching from using the second cell as a PCell to using the first cell as a PCell by maintaining first parameters of the second cell without releasing the first parameters.

20. The method of claim 18, further comprising switching from using the second cell as a PCell to using the first cell as a PCell by skipping a random access (RA) procedure associated with the first cell before transmitting the second PHR.

* * * * *